(12) United States Patent
Schmied

(10) Patent No.: US 7,150,259 B2
(45) Date of Patent: Dec. 19, 2006

(54) INTERNAL COMBUSTION ENGINE

(76) Inventor: Walter Schmied, Route 1, Box 459, Bonners Ferry, ID (US) 83805

( * ) Notice: Subject to any disclaimer, the term of this patent is extended or adjusted under 35 U.S.C. 154(b) by 0 days.

(21) Appl. No.: 10/969,362

(22) Filed: Oct. 19, 2004

(65) Prior Publication Data
US 2005/0051117 A1    Mar. 10, 2005

Related U.S. Application Data

(63) Continuation-in-part of application No. 10/627,288, filed on Jul. 25, 2003, which is a continuation-in-part of application No. 10/147,372, filed on May 15, 2002, now Pat. No. 6,598,567, which is a continuation-in-part of application No. 10/136,780, filed on May 1, 2002, now abandoned.

(51) Int. Cl.
*F02B 75/32*    (2006.01)
(52) U.S. Cl. .................. 123/197.5; 123/48 B; 123/42; 123/197.4
(58) Field of Classification Search ............. 123/197.1, 123/197.5, 197.4, 48 R, 48 B, 78 R, 78 B, 123/42
See application file for complete search history.

(56) References Cited

U.S. PATENT DOCUMENTS

| | | | |
|---|---|---|---|
| 1,019,856 A | 3/1912 | Strickland | |
| 2,455,245 A | 11/1948 | Francis | |
| 3,285,503 A | 11/1966 | Bancroft | |
| 3,931,809 A | 1/1976 | Corte et al. | |
| 4,011,842 A * | 3/1977 | Davies et al. | 123/61 R |
| 4,058,088 A | 11/1977 | Brown | |
| 4,096,835 A * | 6/1978 | Lamont | 123/60.1 |
| 4,331,108 A | 5/1982 | Collins | |
| 4,838,214 A | 6/1989 | Barrett | |
| 5,103,775 A | 4/1992 | Hue | |
| 5,456,219 A | 10/1995 | Clarke | |
| 5,526,778 A | 6/1996 | Springer | |
| 5,647,307 A | 7/1997 | Clarke et al. | |
| 5,782,213 A * | 7/1998 | Pedersen | 123/55.2 |
| 6,032,622 A | 3/2000 | Schmied | |
| 6,314,923 B1 | 11/2001 | Tompkins | |

FOREIGN PATENT DOCUMENTS

| | | |
|---|---|---|
| EP | 0 119 721 B1 | 1/1988 |
| GB | 413960 | 7/1934 |
| GB | 678361 | 9/1952 |

* cited by examiner

*Primary Examiner*—Marguerite McMahon
(74) *Attorney, Agent, or Firm*—Christensen O'Connor Johnson Kindness PLLC

(57) ABSTRACT

A power transfer assembly (2000) for transferring energy within a combustion engine (1010) externally of the engine. The power transfer assembly includes a crankshaft (2006) adapted to convert reciprocating motion to rotating motion. The power transfer assembly further includes an outdrive (2004, 2020, and/or 2026) adapted to transfer the rotating motion of the crankshaft to an external device requiring power. The outdrive is non-rigidly interfaced with the outdrive such that the crankshaft is permitted to freely rotate relative to the outdrive about at least one axis (2014) and freely move linearly in at least one direction (2027) relative to the outdrive during operation.

17 Claims, 32 Drawing Sheets

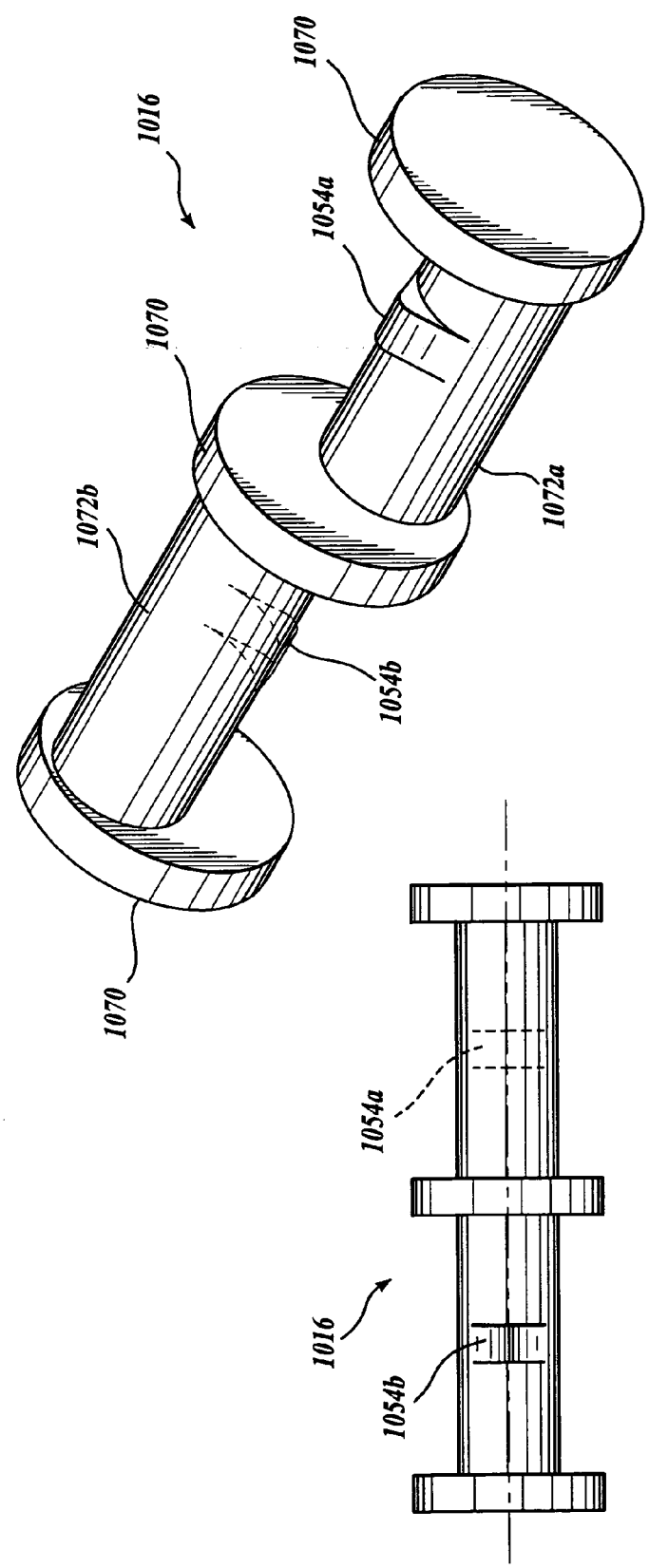
Fig. 12.
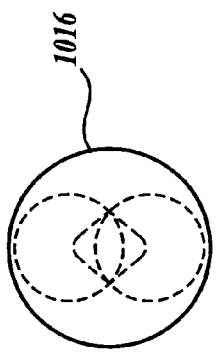
Fig. 15.
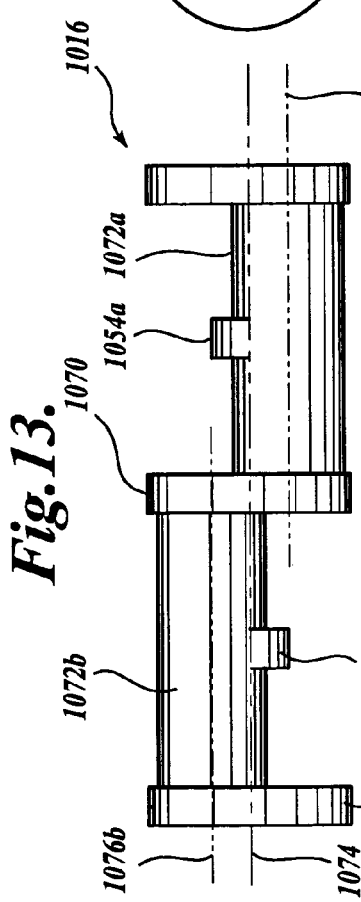
Fig. 13.
Fig. 14.

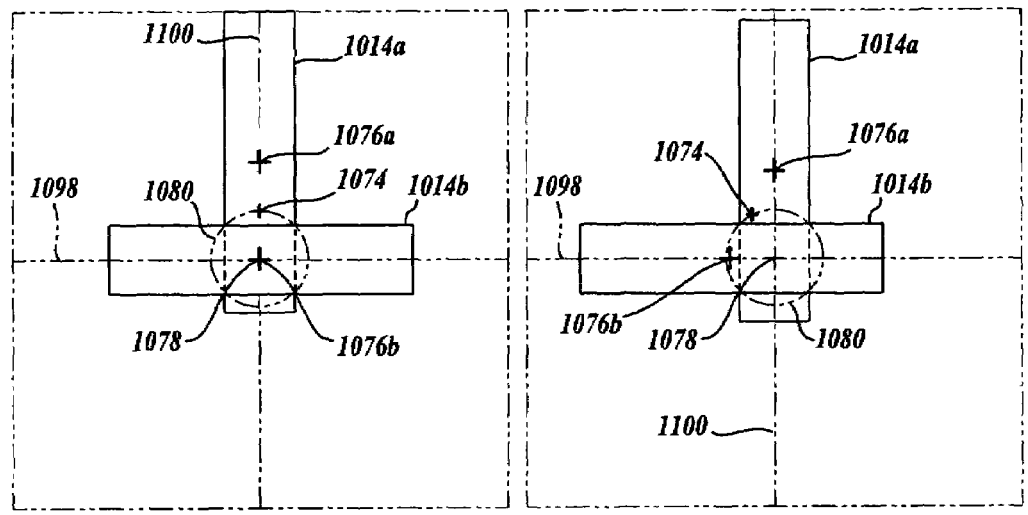
*Fig.16.*            *Fig.18.*
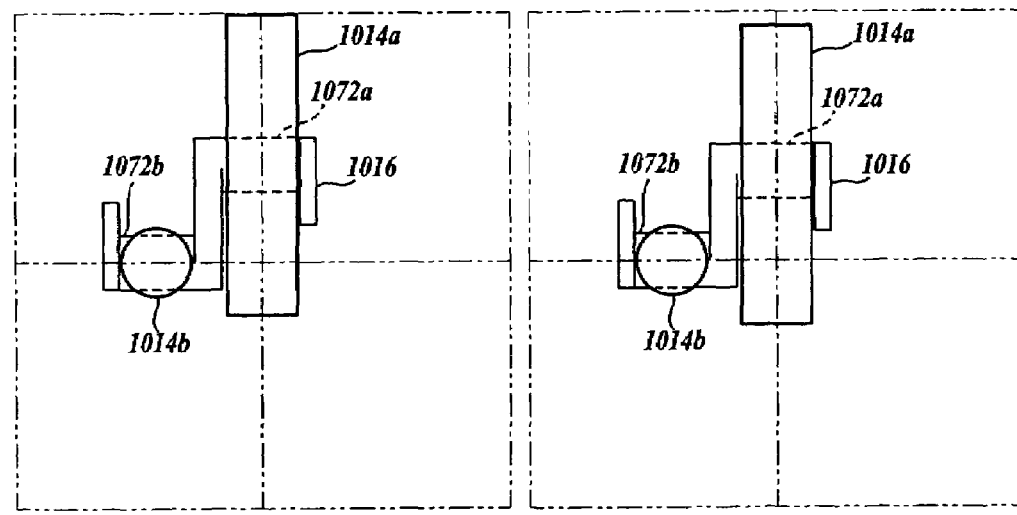
*Fig.17.*            *Fig.19.*

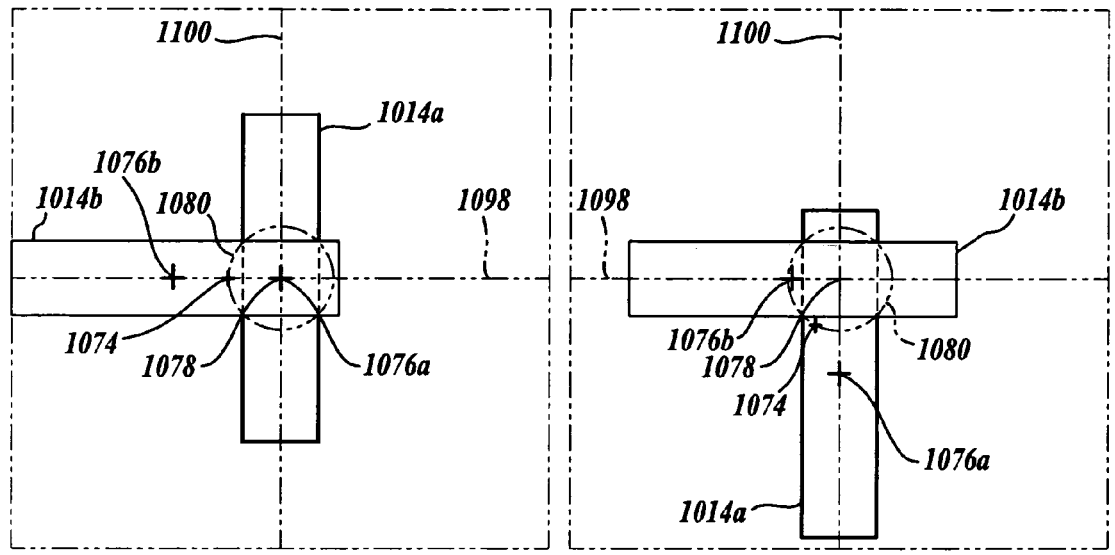
*Fig.20.*  *Fig.22.*
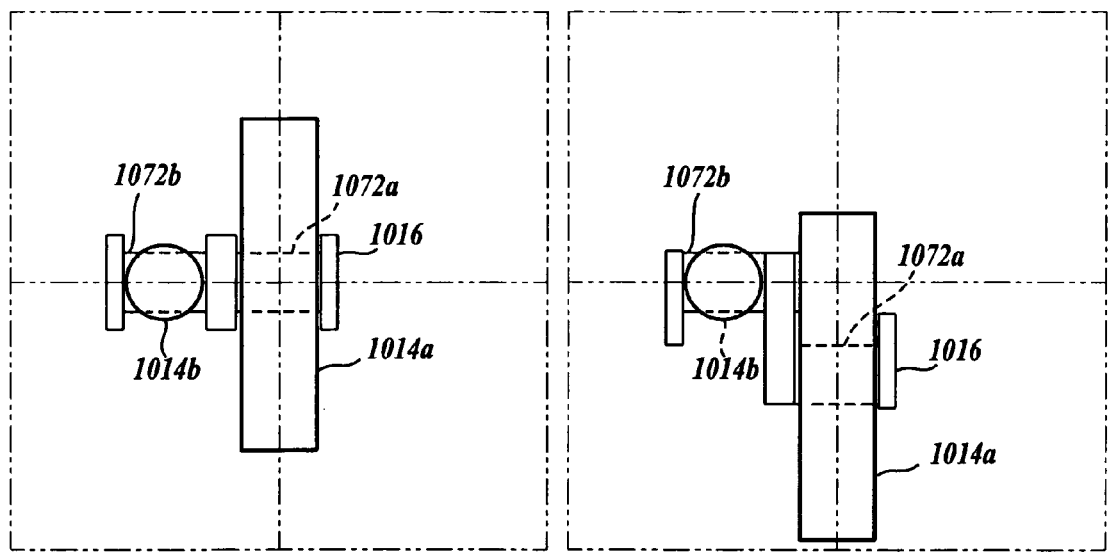
*Fig.21.*  *Fig.23.*

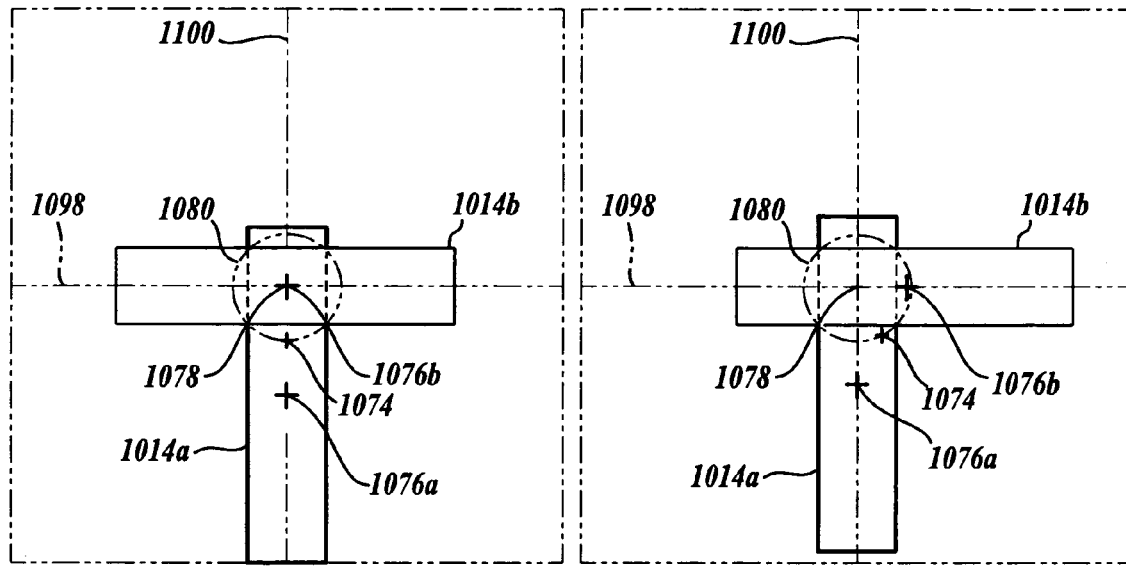
*Fig.24.*  *Fig.26.*
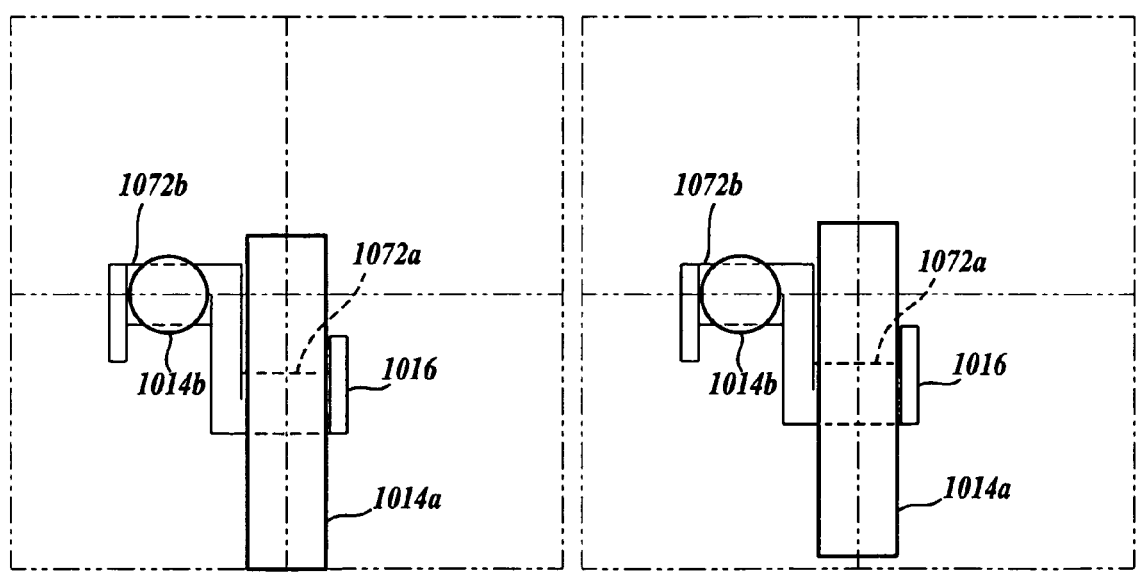
*Fig.25.*  *Fig.27.*

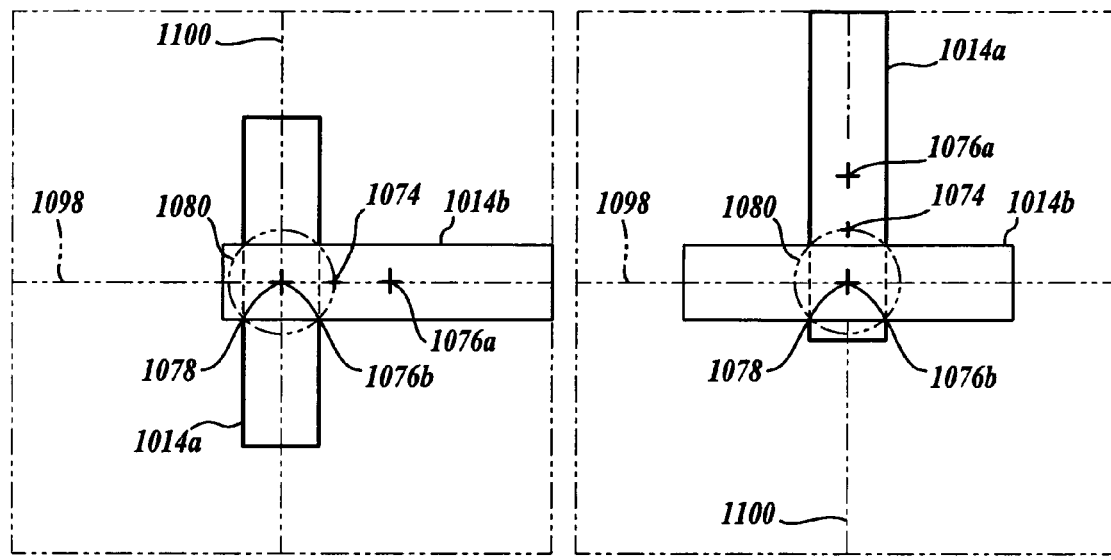
*Fig.28.*          *Fig.30.*
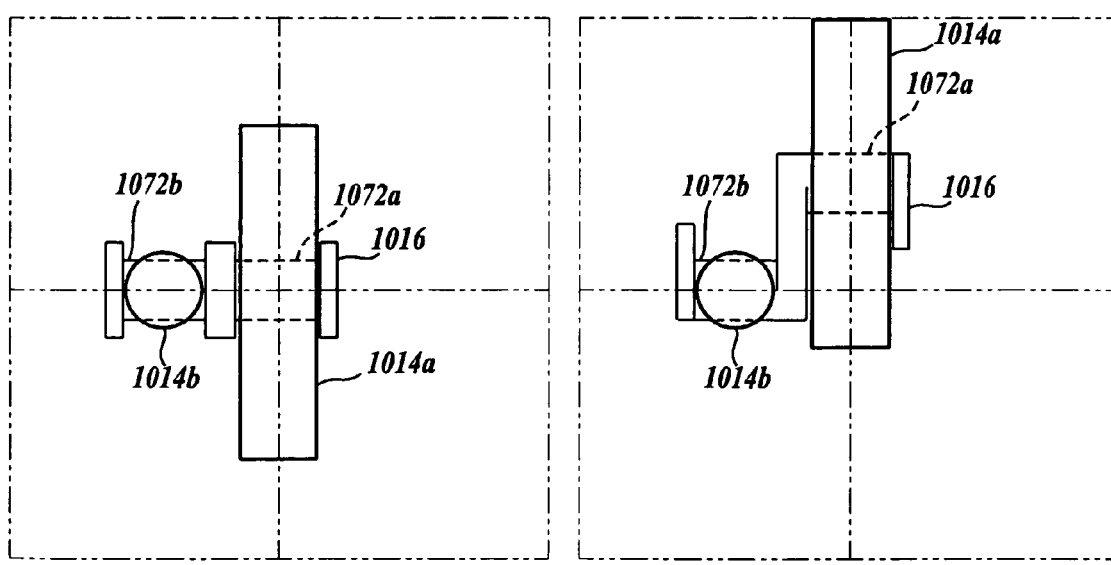
*Fig.29.*          *Fig.31.*

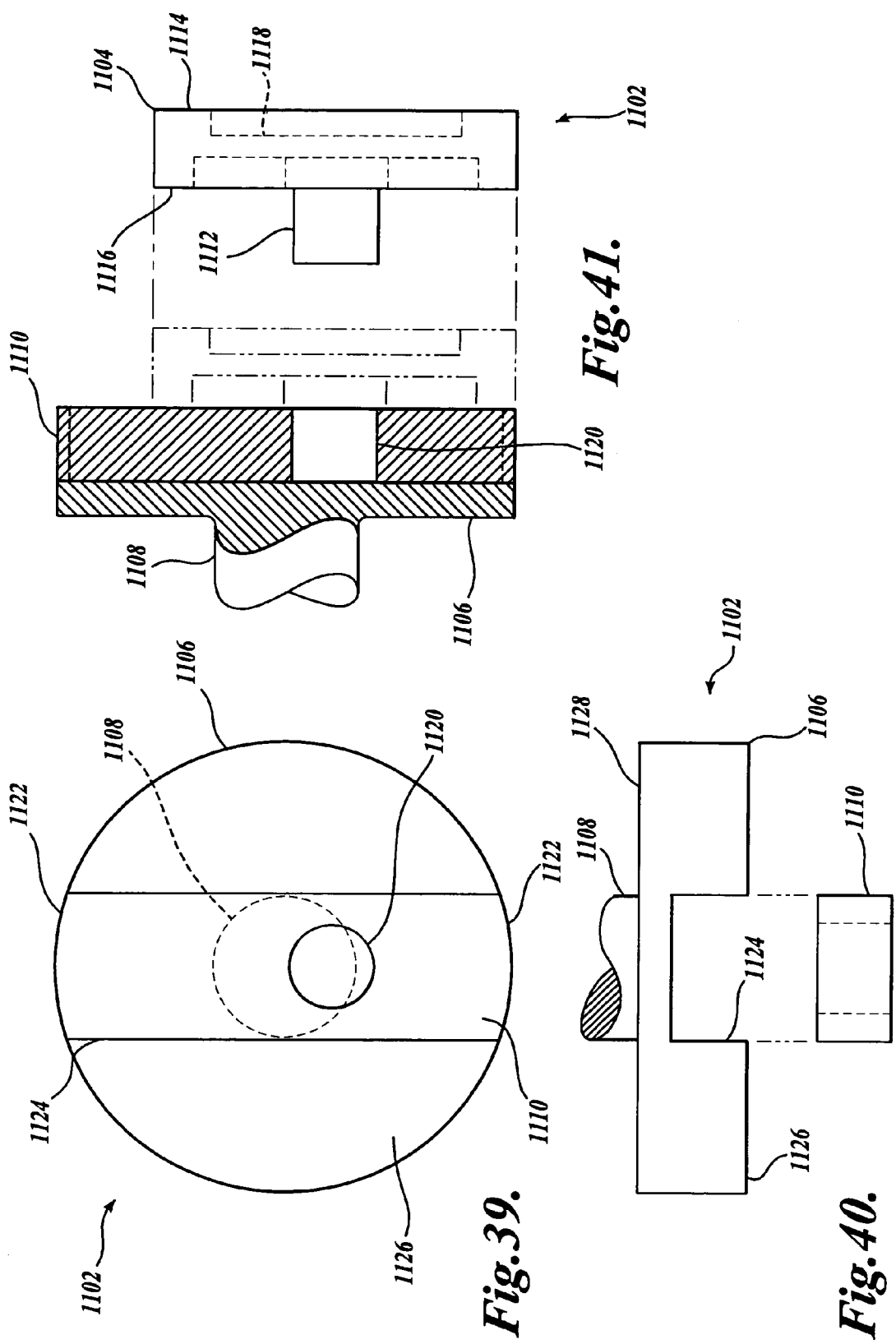

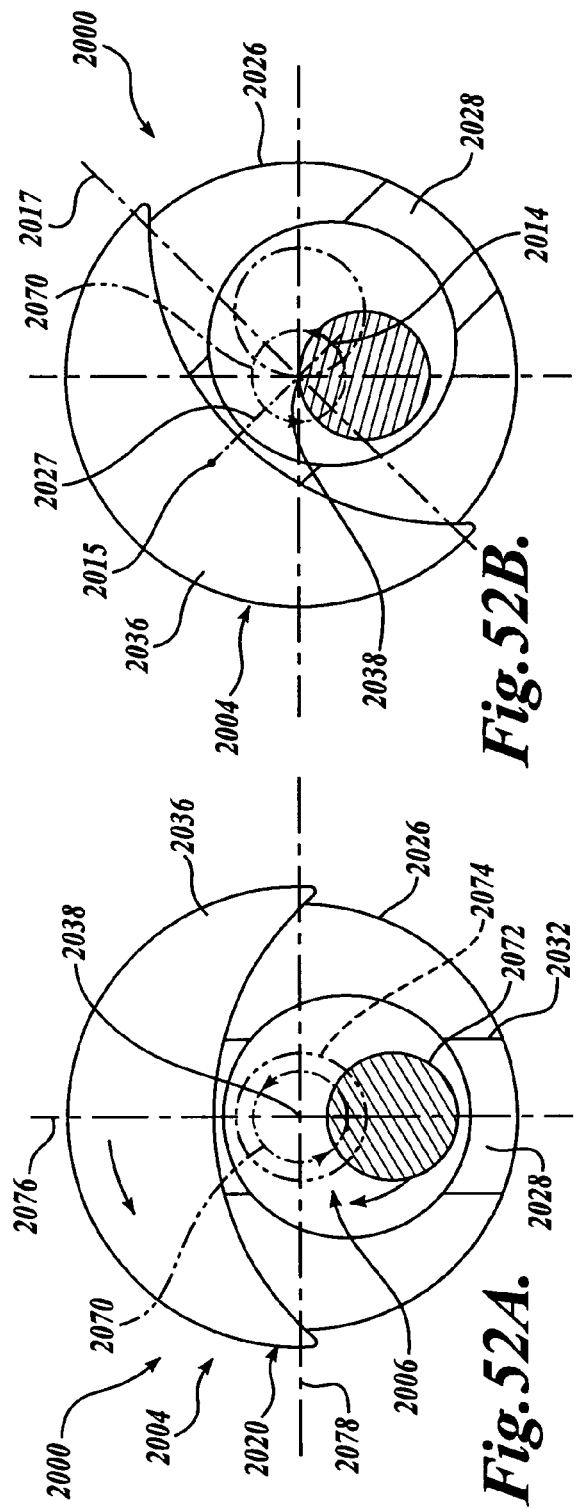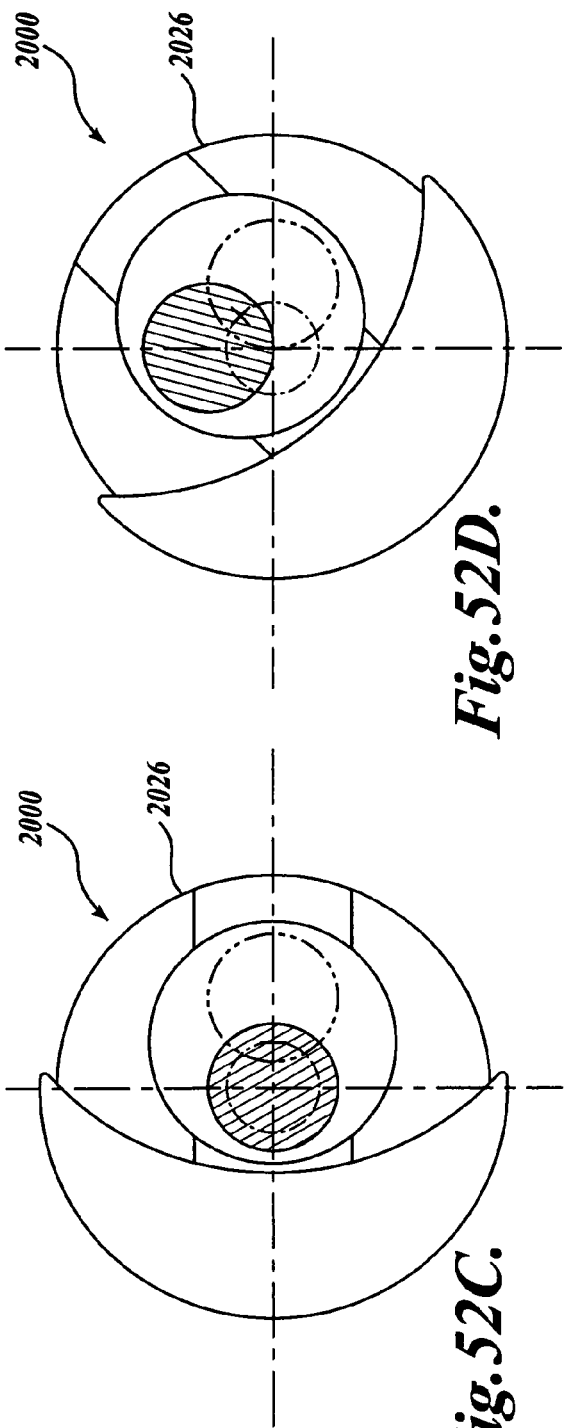

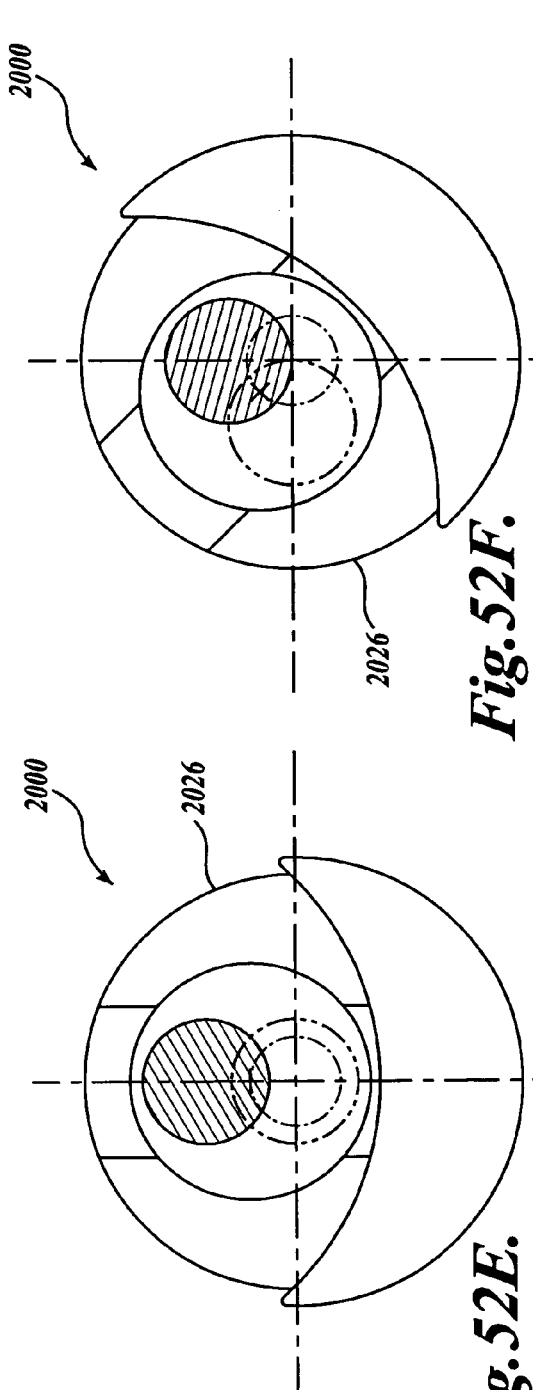
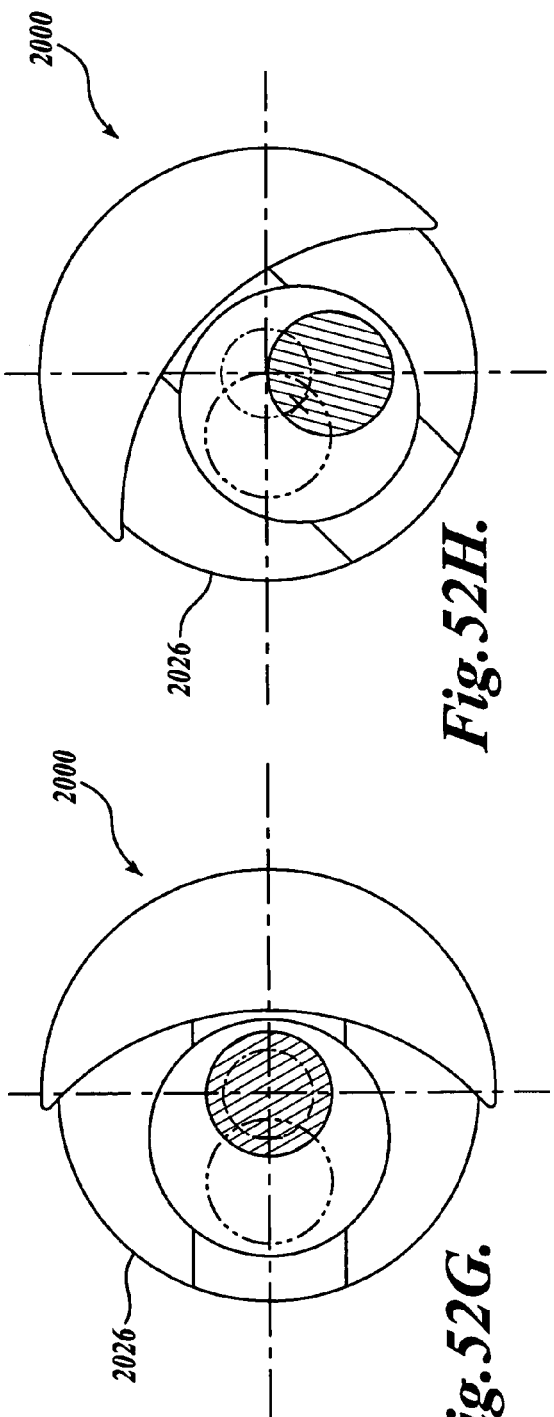
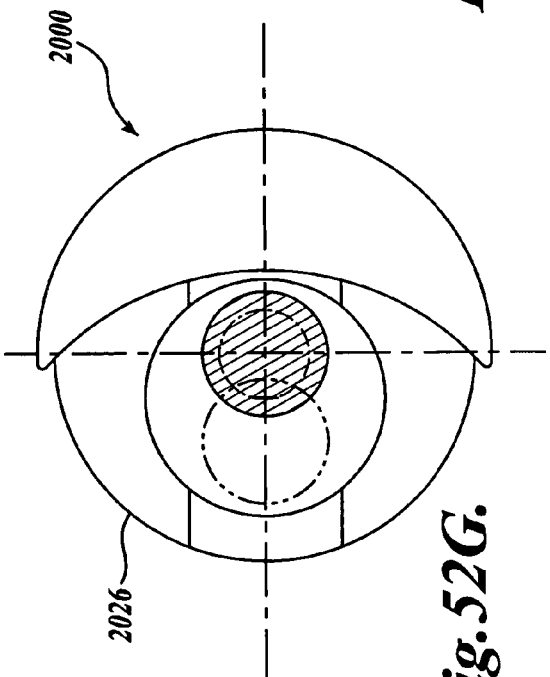
Fig. 52E. Fig. 52F. Fig. 52G. Fig. 52H.

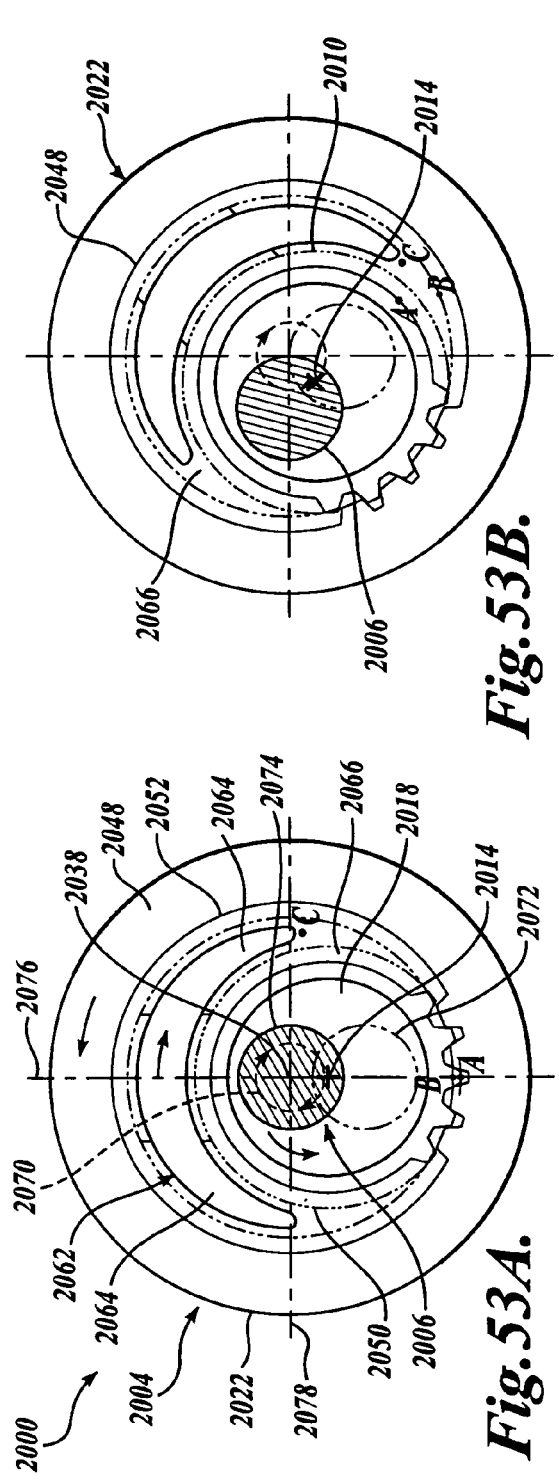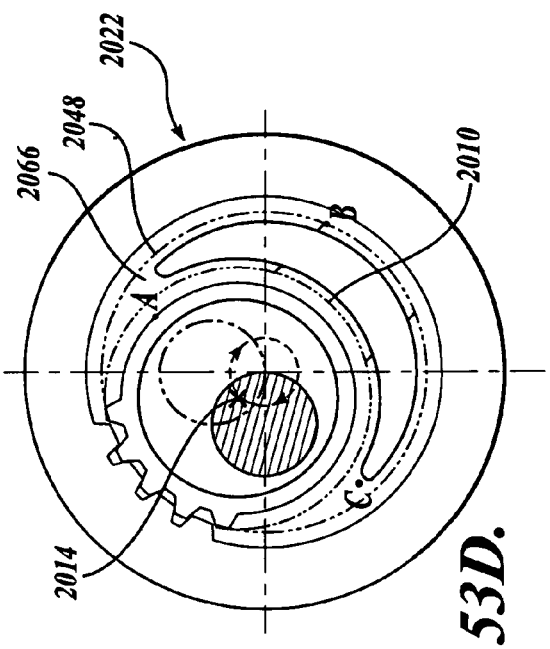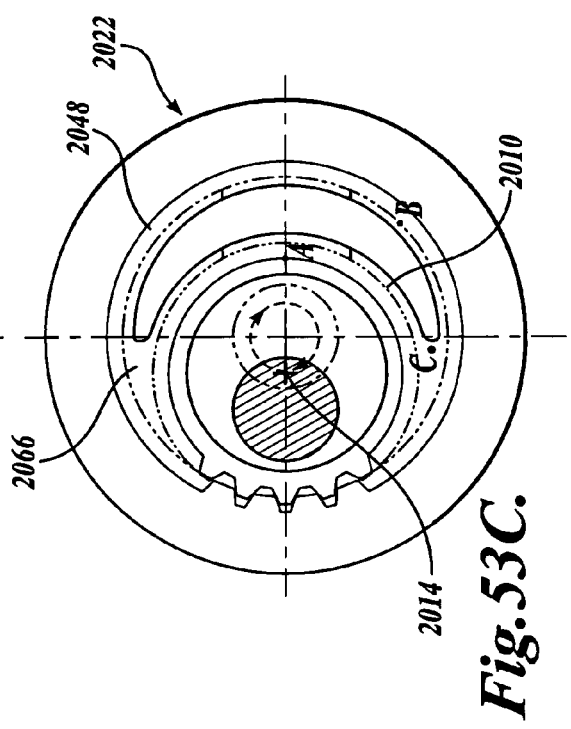
*Fig.53A.* *Fig.53B.* *Fig.53C.* *Fig.53D.*

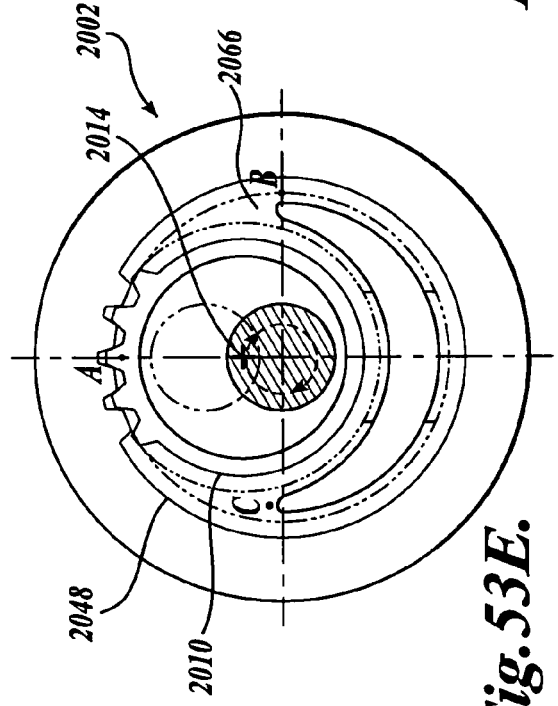
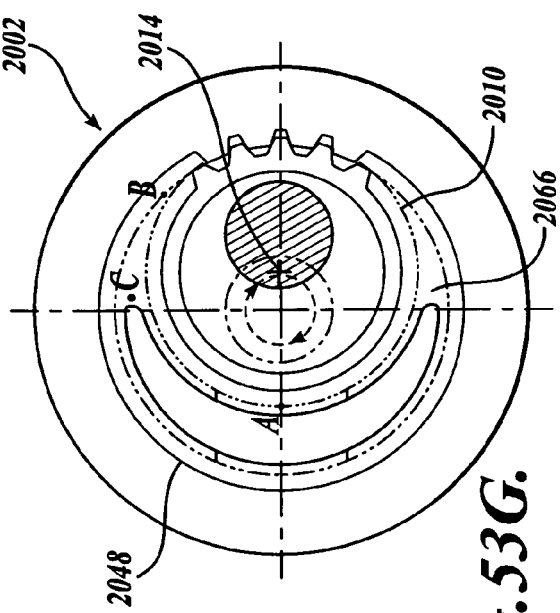
Fig.53E.
Fig.53G.
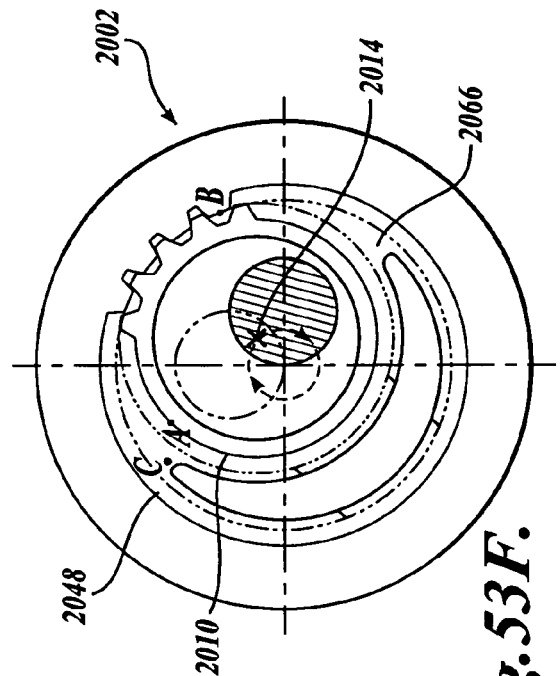
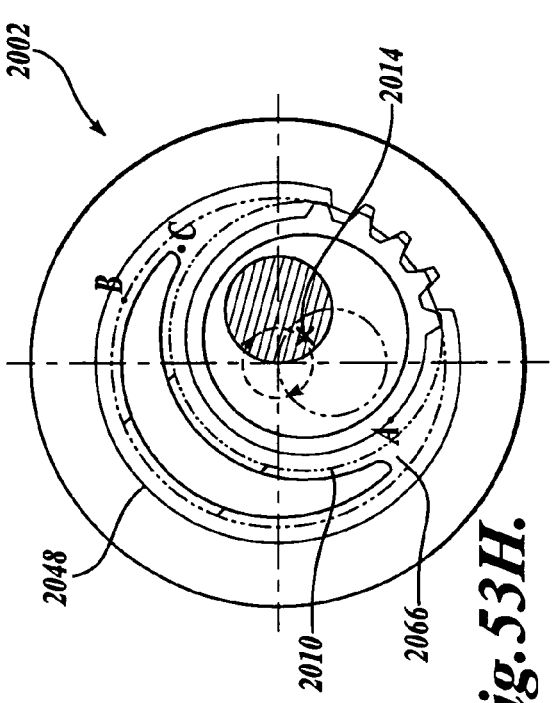
Fig.53F.
Fig.53H.

INTERNAL COMBUSTION ENGINE

CROSS-REFERENCES TO RELATED APPLICATIONS

This application is a continuation in part of U.S. patent application Ser. No. 10/627,288, filed Jul. 25, 2003, which is a continuation in part of U.S. patent application Ser. No. 10/147,372, filed May 15, 2002, now U.S. Pat. No. 6,598,567, issued Jul. 29, 2003, which is a continuation in part of U.S. patent application Ser. No. 10/136,780, filed May 1, 2002, now abandoned, priority from the filing date of which is hereby claimed under 35 U.S.C. §120 and the disclosures of which are hereby expressly incorporated by reference.

FIELD OF THE INVENTION

The present invention is directed generally to combustion engines and, more particularly, to combustion engines having a power transfer assembly for transferring an energy of combustion generated within the combustion engine externally of the combustion engine for use by a device requiring power.

BACKGROUND OF THE INVENTION

As is well known in the art, an internal combustion engine is a machine for converting heat energy into mechanical work. In an internal combustion engine, a fuel-air mixture that has been introduced into a combustion chamber is compressed as a piston slides within the chamber. A high voltage for ignition is applied to a spark plug installed in the combustion chamber to generate an electric spark to ignite the fuel-air mixture. The resulting combustion pushes the piston downwardly within the chamber, thereby producing a force that is convertible to a rotary output through the use of a crankshaft.

The crankshaft of the engine rotates at a high rate. Due to uneven forces acting upon the crankshaft, the crankshaft often vibrates when rotated. To counteract the uneven forces acting upon the crankshaft, counterweights are often rigidly coupled to, or as more often the case, formed integrally with the crankshaft, to balance the uneven forces acting upon the crankshaft, thereby eliminating/reducing vibrations in the crankshaft.

Although somewhat effective, previously developed crankshaft balancing techniques as described above are not effective in balancing crankshafts which both rotate and orbit so as to have two axes of rotation. Rigidly attaching counterweights directly to a crankshaft which both rotates and orbits would only effectively balance the crankshaft's rotation about its own axis, and would result in increased unbalancing forces during the crankshaft's orbital movement. Thus, there exists a need for a power transfer assembly having a crankshaft which is balanced while both rotating and orbiting.

Further, crankshafts which both rotate and orbit having additional problems. The movement of the crankshaft in both a rotational and orbital manner tends to magnify misalignment issues of the rotating components of the engine. Therefore, there exits a need for a power transfer assembly capable of mitigating or absorbing misalignment of the internal rotating components, such as a crankshaft, of a combustion engine.

SUMMARY OF THE INVENTION

One embodiment of a power transfer assembly formed in accordance with the present invention for transferring energy within a combustion engine externally of the engine is disclosed. The power transfer assembly includes a crankshaft adapted to convert reciprocating motion to rotating motion and an outdrive. The outdrive is adapted to transfer the rotating motion of the crankshaft to an external device requiring power. The outdrive is non-rigidly interfaced with the crankshaft such that the crankshaft is permitted to freely rotate relative to the outdrive about at least one axis and freely move linearly in at least one direction relative to the outdrive during operation.

Another embodiment of a power transfer assembly formed in accordance with the present invention for transferring energy within a combustion engine externally of the engine is disclosed. The power transfer assembly includes a crankshaft adapted to convert reciprocating motion to rotating motion and an outdrive. The outdrive is adapted to transfer the rotating motion of the crankshaft to an external device requiring power. The power transfer assembly further includes an interface assembly for non-rigidly interfacing the crankshaft with the outdrive to facilitate the transfer of power between the crankshaft and the outdrive. The interface assembly permits the crankshaft to move freely relative to the outdrive in at least one linear direction.

Another embodiment of a power transfer assembly formed in accordance with the present invention for transferring energy within a combustion engine externally of the engine is disclosed. The power transfer assembly includes a crankshaft adapted to convert reciprocating motion to rotating motion and an outdrive. The outdrive is adapted to transfer the rotating motion of the crankshaft to an external device requiring power. The power transfer further includes an interface assembly for non-rigidly interfacing the crankshaft with the outdrive to facilitate the transfer of power between the crankshaft and the outdrive. The interface assembly directly transfers a torque from the crankshaft to the outdrive while simultaneously impeding transfer of centrifugal forces from the crankshaft to the outdrive.

Another embodiment of a power transfer assembly formed in accordance with the present invention for transferring energy within a combustion engine externally of the engine is disclosed. The power transfer assembly includes a crankshaft adapted to convert reciprocating motion to rotating motion while rotating about a first axis and orbiting about a second axis and an outdrive. The outdrive is adapted to transfer the rotating motion of the crankshaft to an external device requiring power. The power transfer assembly further includes an interface assembly for facilitating the transfer of power between the crankshaft and the outdrive. The interface assembly non-rigidly interfaces the crankshaft with the outdrive such that a centrifugal force present in the crankshaft from the orbiting of the crankshaft about the second axis is not transferred to the outdrive during rotation of the crankshaft.

Another embodiment of a power transfer assembly formed in accordance with the present invention for transferring energy within a combustion engine externally of the engine is disclosed. The power transfer assembly includes a crankshaft adapted to convert reciprocating motion to rotating motion and an outdrive. The outdrive is non-rigidly interfaced with the crankshaft and adapted to transfer the rotating motion of the crankshaft to an external device requiring power. The power transfer assembly further includes a crankshaft counterweight rotatably coupled to the crankshaft for reducing vibrations in the crankshaft during operation. The crankshaft counterweight is freely moveable along a path substantially radially oriented relative to an axis of rotation of the outdrive.

Another embodiment of a power transfer assembly formed in accordance with the present invention for transferring energy within a combustion engine externally of the engine is disclosed. The power transfer assembly includes a crankshaft adapted to convert reciprocating motion to rotating motion. The crankshaft is adapted to rotate about a center axis which in turn orbits about an orbit axis. The power transfer assembly further includes a direct outdrive interfaced with the crankshaft. An orbital movement of the crankshaft causes rotary motion of the direct outdrive at a rate substantially equal to a rate at which the crankshaft orbits about the orbit axis. The power transfer assembly further includes a reduced outdrive interfaced with the crankshaft. A rotary movement and the orbital movement of the crankshaft combine to drive the reduced outdrive at a reduced rate relative to the direct outdrive.

Another embodiment of a power transfer assembly formed in accordance with the present invention for transferring energy within a combustion engine externally of the engine is disclosed. The power transfer assembly includes a crankshaft adapted to convert reciprocating motion to rotating motion. The crankshaft is adapted to rotate about a center axis which in turn orbits about an orbit axis. The power transfer assembly includes a first direct outdrive and a second direct outdrive, each interfaced with the crankshaft at opposite ends of the crankshaft. An orbital movement of the crankshaft causes rotary motion of the first and second direct outdrives at a rate substantially equal to a rate at which the crankshaft orbits about the orbit axis. The power transfer assembly further includes a reduced outdrive interfaced with the crankshaft. A rotary movement and the orbital movement of the crankshaft combine to drive the reduced outdrive at a reduced rate relative to the first and second direct outdrives.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 12 is a perspective view of one embodiment of the crank-cam shown in FIG. 11 formed in accordance with the present invention;

FIG. 13 is a bottom view of the crank-cam shown in FIG. 12;

FIG. 14 is an elevation view of the crank-cam shown in FIG. 12;

FIG. 15 is a side view of the crank-cam shown in FIG. 14;

FIG. 16 is a diagrammatic elevation view showing the linear and rotary motion of the crank-cam with attached first and second cylinder liners; showing the first vertically oriented cylinder liner in an fully extended position and the second horizontally oriented cylinder liner in a mid-stroke position, wherein the distance between a pair of crank journals has been exaggerated to better show the movement of the cylinder liners;

FIG. 17 is a diagrammatic side view of the crank-cam with attached first and second cylinder liners depicted in FIG. 16;

FIG. 18 is a diagrammatic elevation view of the crank-cam with attached first and second cylinder liners of FIG. 17; wherein the crank-cam has rotated 30° about a first axis of rotation from the position depicted in FIG. 17, showing the first vertically oriented cylinder liner as the liner moves linearly downward and the second horizontally oriented cylinder liner as it moves linearly to the left;

FIG. 19 is a diagrammatic side view of the crank-cam with attached first and second cylinder liners depicted in FIG. 18;

FIG. 20 is a diagrammatic elevation view of the crank-cam with attached first and second cylinder liners of FIG. 16; wherein the crank-cam has rotated 90° about the first axis of rotation from the position depicted in FIG. 16, showing the first vertically oriented cylinder liner in a mid-stroke position and the second horizontally oriented cylinder liner in a fully extended position;

FIG. 21 is a diagrammatic side view of the crank-cam with attached first and second cylinder liners depicted in FIG. 20;

FIG. 22 is a diagrammatic elevation view of the crank-cam with attached first and second cylinder liners of FIG. 16; wherein the crank-cam has rotated 150° about the first axis of rotation from the position depicted in FIG. 16, showing the first vertically oriented cylinder liner as the liner moves linearly downward and the second horizontally oriented cylinder liner as it moves linearly to the right;

FIG. 23 is a diagrammatic side view of the crank-cam with attached first and second cylinder liners depicted in FIG. 22;

FIG. 24 is a diagrammatic elevation view showing the linear and rotary motion of a crank-cam with attached first and second cylinder liners; wherein the crank-cam has rotated 180° about a first axis of rotation from the position depicted in FIG. 16; showing the first vertically oriented cylinder in a fully extending position and the second horizontally oriented cylinder liner in a mid-stroke position;

FIG. 25 is a diagrammatic side view of the crank-cam with attached first and second cylinder liners depicted in FIG. 24;

FIG. 26 is a diagrammatic elevation view of the crank-cam with attached first and second cylinder liners of FIG. 16; wherein the crank-cam has rotated 210° about a first axis of rotation from the position depicted in FIG. 16, showing the first vertically oriented cylinder liner as the liner moves linearly upward and the second horizontally oriented cylinder liner as it moves linearly to the right;

FIG. 27 is a diagrammatic side view of the crank-cam with attached first and second cylinder liners depicted in FIG. 26;

FIG. 28 is a diagrammatic elevation view of the crank-cam with attached first and second cylinder liners of FIG. 16; wherein the crank-cam has rotated 270° about the first axis of rotation from the position depicted in FIG. 16; showing the first vertically oriented cylinder liner in a mid-stroke position and the second horizontally oriented cylinder liner in a fully extended position;

FIG. 29 is a diagrammatic side view of the crank-cam with attached first and second cylinder liners depicted in FIG. 28;

FIG. 30 is a diagrammatic elevation view of the crank-cam with attached first and second cylinder liners of FIG. 16; wherein the crank-cam has rotated 360° about the first axis of rotation from the position depicted in FIG. 16, showing the first vertically oriented cylinder liner in a fully extend position and the second horizontally oriented cylinder liner in a mid-stroke position;

FIG. 31 is a diagrammatic side view of the crank-cam with attached first and second cylinder liners depicted in FIG. 30;

FIG. 39 is a planar end view of a direct outdrive and a gliding block formed in accordance with the present invention;

FIG. 40 is an exploded top view of the direct outdrive and the gliding block shown in FIG. 39;

FIG. 41 is an exploded side view of the direct outdrive and the gliding block shown in FIG. 39, and in addition showing a direct outdrive adapter;

FIGS. 52A–52H are cross-sectional views taken substantially through Section 52A—52A of FIG. 46, depicting the crankshaft assembly and direct outdrive assembly sequentially as the crankshaft assembly and direct outdrive assembly rotate through one cycle;

FIGS. 53A–53H are cross-sectional views taken substantially through Section 53A—53A of FIG. 46, depicting the crankshaft assembly and a direct and reduction outdrive assembly sequentially as the crankshaft assembly and the direct and reduction outdrive assembly rotate through one cycle;

DETAILED DESCRIPTION OF THE PREFERRED EMBODIMENT

Figure 1:
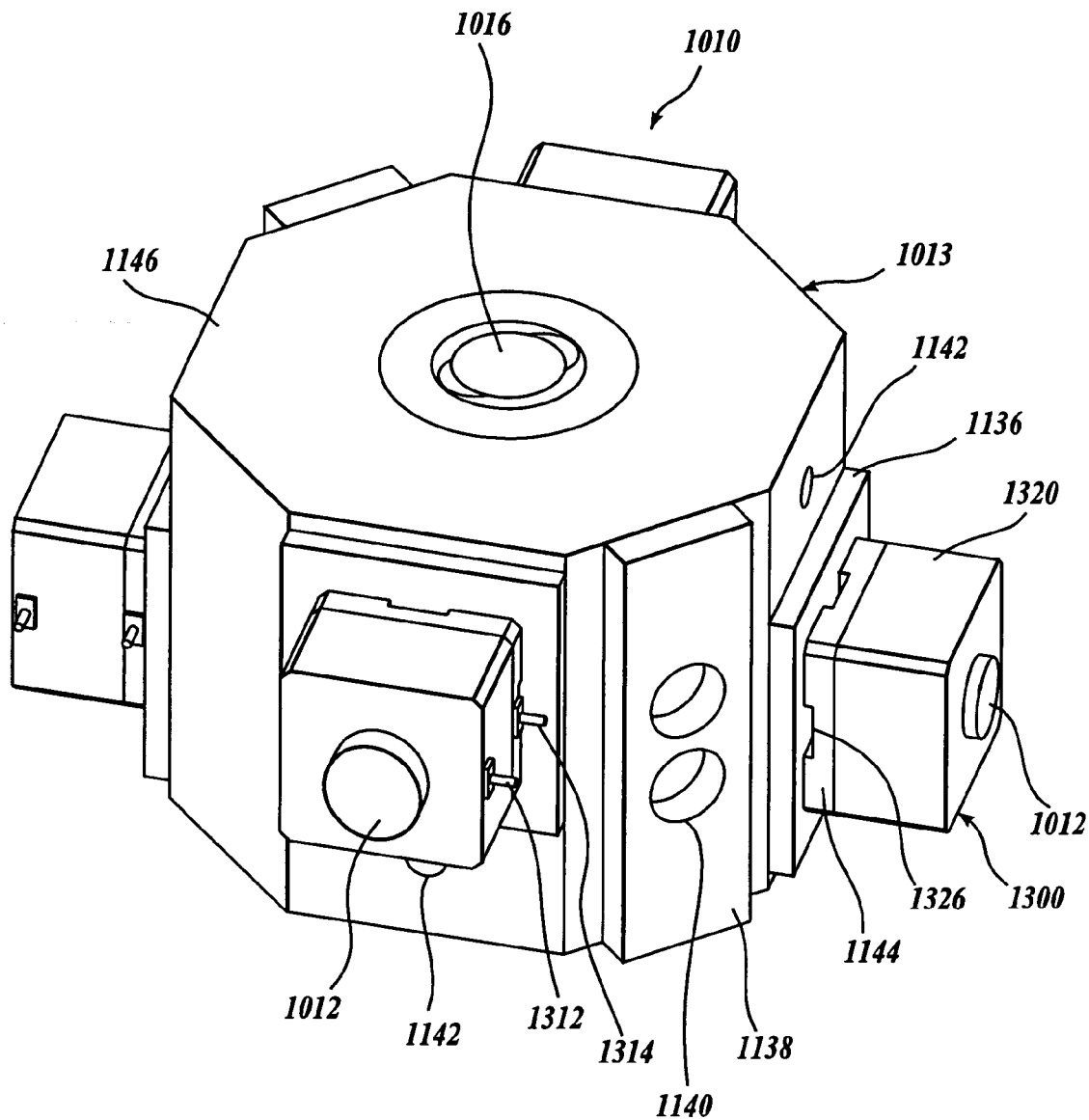
FIG. 1 is a perspective view of one embodiment of a reciprocating internal combustion engine formed in accordance with the present invention, showing an engine block and related components, such as a control plate housing and an intake manifold, attached thereto.

FIGS. 1–45 illustrate one embodiment of a reciprocating internal combustion engine 1010 formed in accordance with the present invention. The engine 1010 is unlike conventional reciprocating internal combustion engines, in that the engine 1010 reciprocates two cylinder liners 1014a and 1014b, orthogonally oriented relative to one another, between opposing pairs of "substantially stationary" pistons 1012a and 1012b, and 1012c and 1012d respectively. As used within this detailed description, the phrase "substantially stationary" is intended to mean a part, that although may be capable of some movement, does not move in accordance with a crankshaft or analogous component of an engine, as does a piston, camshaft, connecting rod, or valve of a conventional engine. In other words, a substantially stationary part's movement is separate and independently actuatable relative to the crankshaft or analogous component of an engine. In conventional reciprocating internal combustion engines, the pistons are reciprocated within stationary cylinders.

In the embodiment illustrated in FIGS. 1–45, many of the components are identical to one another, such as the pistons 1012a, 1012b, 1012c, and 1012d and each of the two cylinder liners 1014a and 1014b. Therefore, a numbering scheme has been adopted in which components of identical structure are assigned a common reference numeral followed by a selected letter to distinguish them from their identical counterpart. Where the context permits, reference in the following description to an element of one component having an identical counterpart shall be understood as also referring to the corresponding element of the identical counterpart.

Figure 2:
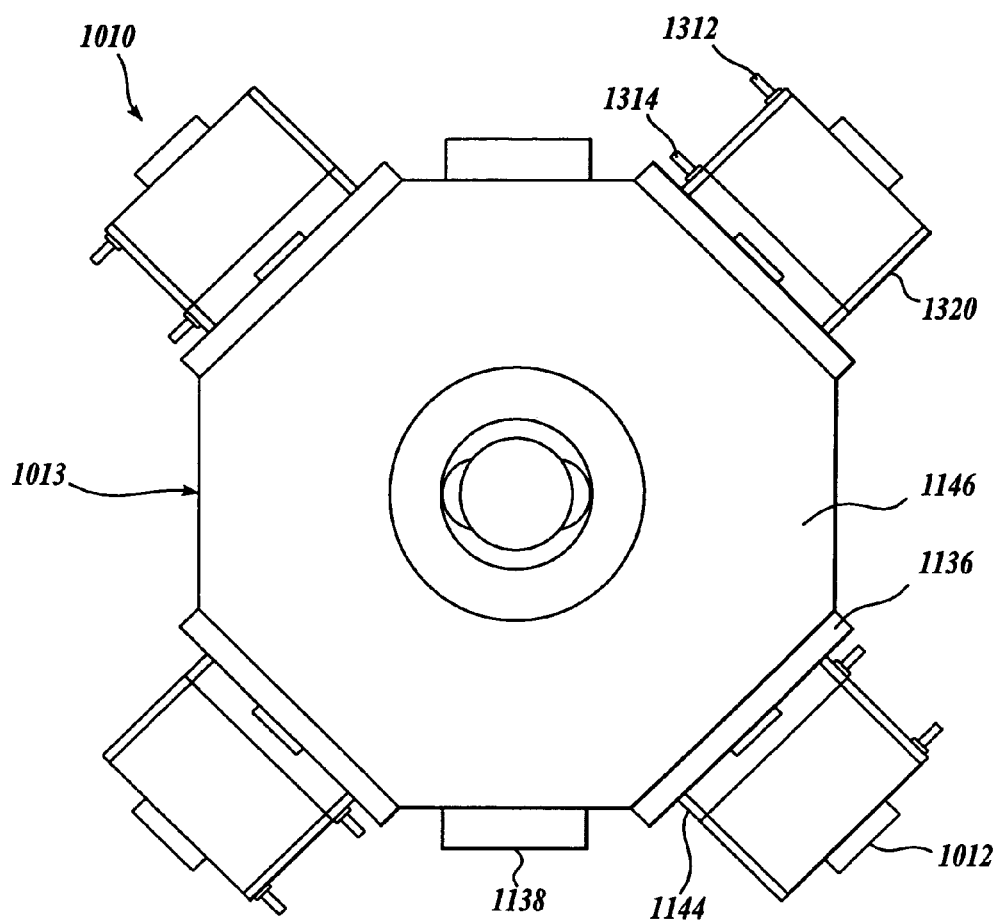
FIG. 2 is a top planar view of the internal combustion engine depicted in FIG. 1.
Figure 3:
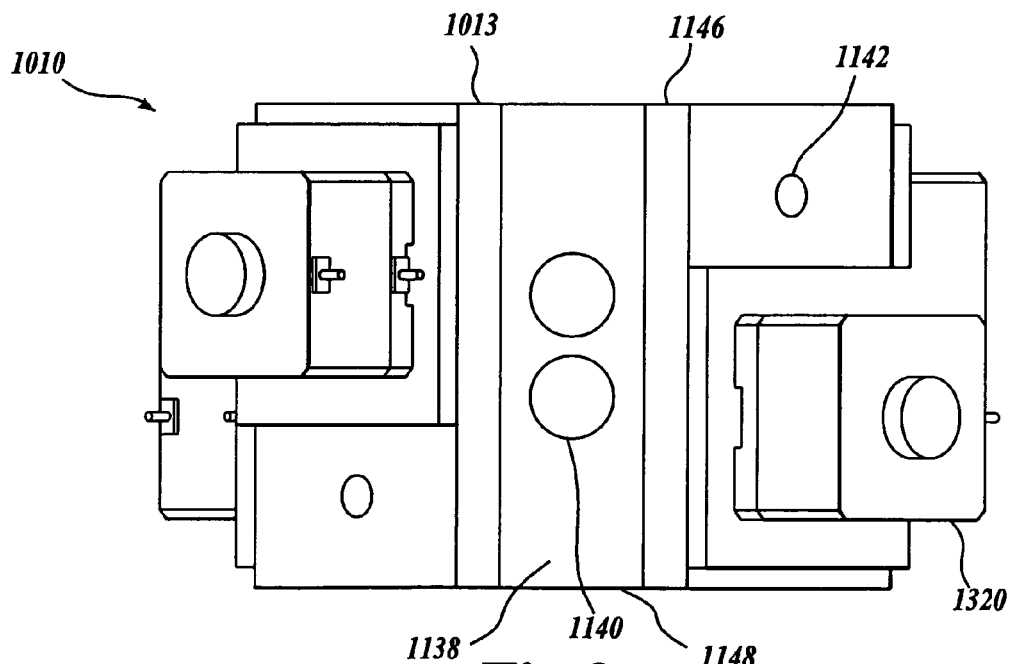
FIG. 3 is a side planar view of the internal combustion engine depicted in FIG. 1.

Referring now to FIGS. 1–3, an engine block 1013 and other related external components of one illustrated embodiment formed in accordance with the present invention will be discussed. The engine block 1013 is suitably an octagonal block structure having an upper planar end surface 1146 opposite a lower planar end surface 1148 with internal cavities for housing the pistons, cylinders, and other related components there between. The engine block 1013 is formed from a rigid material, such as steel, cast iron, or aluminum, by techniques well known in the art, such as machining and/or casting. Fastened to the sidewalls of the engine block 1013 are two intake manifolds 1138 and four square mounting plates 1136. Coupled to each of the mounting plates 1136 is a housing mounting plate 1144, upon each of which is coupled a control plate housing 1320.

Figure 4:
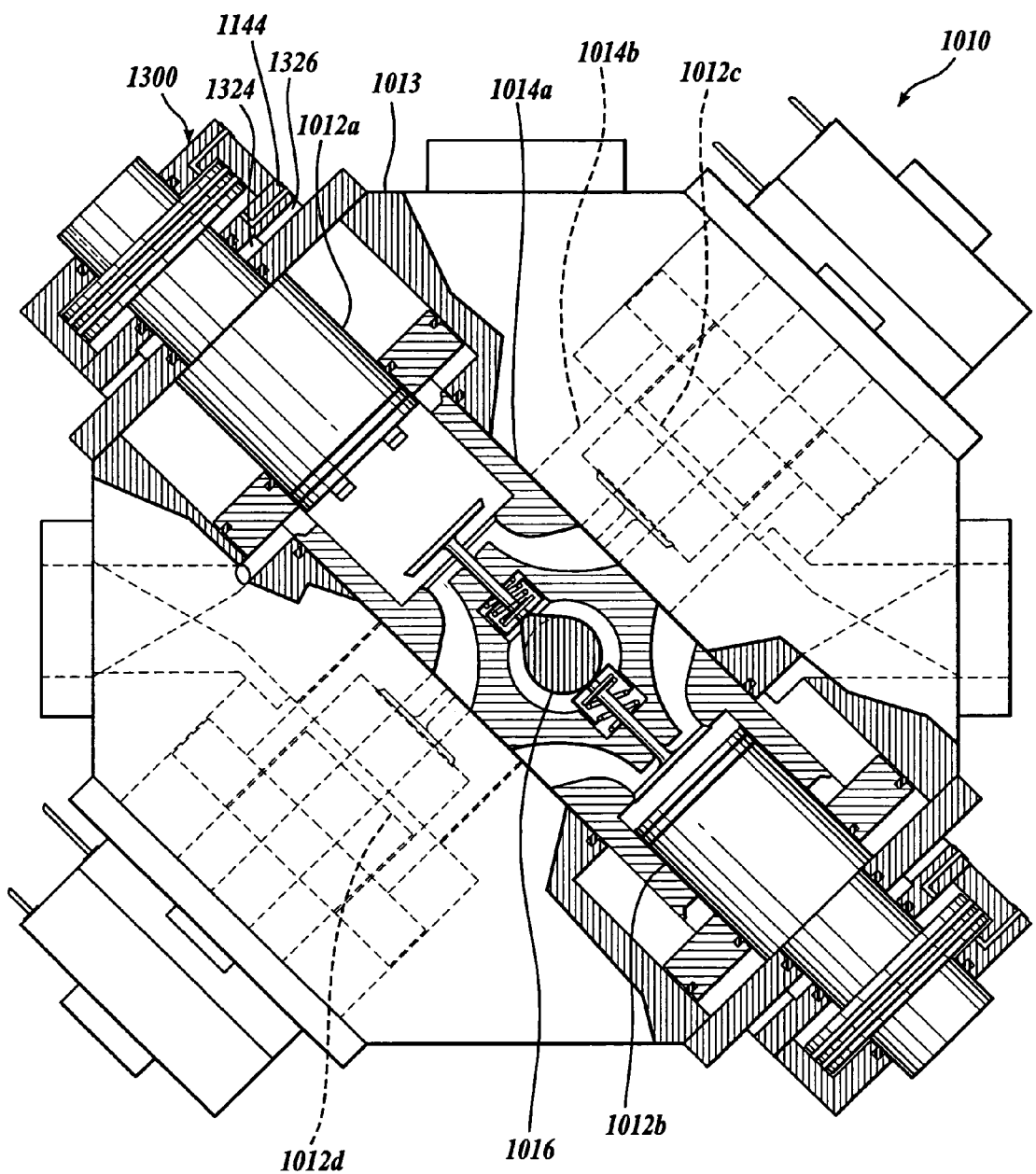
FIG. 4 is a top planar view of the internal combustion engine depicted in FIG. 1, with a portion of the engine block cut-away, showing a cross-sectional view of a reciprocating cylinder liner receiving an opposing pair of substantially stationary pistons.

Referring now to FIGS. 1 and 4, the housing mounting plate 1144 will be described. The housing mounting plate 1144 serves as an insulator, impeding the transfer of heat generated in the engine block 1013 to the various components of a compression ratio and power setting control system 1300, which will be described in further detail below. To impede heat transfer, the housing mounting plate 1144 contains an inner cavity 1324. The inner cavity 1324 impedes heat transfer by limiting the contact between components of the compression ratio and power setting control system 1300 and the mounting plate 1136. Further, the housing mounting plate 1144 includes four cooling ports 1326 in fluid communication with the inner cavity 1324 and the outer environment, to allow heated air to exchange with exterior cool air.

Referring again to FIGS. 1–3, protruding from the control plate housings 1320 are the distal ends of each of the pistons 1012 and upper chamber piping 1312 associated with the compression ratio and power setting control system 1300. Protruding from the housing mating plate 1144 is lower chamber piping 1314 also associated with the compression ratio and power setting control system 1300. Located above or below the control plate housing 1320, as the case may be, is an exhaust port 1142. The exhaust ports 1142 are in fluid communication with the exhaust gas passages 1037 (see FIG. 10) located internally in the engine block 1013, and allow the discharge of products of combustion generated in the combustion chambers of the engine 1010 to the atmosphere. Preferably, well known exhaust gas collection, treatment, and/or muffler systems (not shown) are coupled in fluid communication with the exhaust ports 1142. Each intake manifold 1138 includes two intake ports 1140. Preferably coupled to each intake port 1140 are well-known intake systems that may include such components as a carburetor and/or a filter.

Referring to FIG. 4 and focusing mainly now on the internal components of the internal combustion engine 1010, the engine 1010 includes two double cylinder liners 1014a and 1014b, each of which houses two substantially stationary opposing pistons 1012a and 1012b and 1012c and 1012d, respectively, in opposite ends of the cylinder liners 1014a and 1014b. The cylinder liners 1014a and 1014b are perpendicularly and offset mounted relative to one another within the engine block 1013. The cylinder liners 1014a and 1014b alternately reciprocate between a first extended position and a second extended position. More specifically, with reference to cylinder liner 1014a, the cylinder liner 1014a reciprocates between a first extended position wherein the cylinder liner 1014a is at a top-dead-center (TDC) position relative to a first piston 1012b and a bottom-dead-center (BDC) position relative to a second piston 1012a, as shown in FIG. 4, and a second extended position, where the cylinder liner 1014a is at a BDC position relative to the first piston 1012b and a TDC position relative to the second opposing piston 1012a. The second cylinder liner 1014b similarly reciprocates between a first extended position and a second extended position. However, the second cylinder liner 1014b reciprocates 180° out of phase of the first cylinder liner 1014a so that when the first cylinder liner 1014a is in extended position, the second cylinder liner 1014b is in a mid-stroke position. The cylinder liners 1014 are coupled to one another by a crankshaft, which will be referred to as a crank-cam 1016 for the purposes of this detail description. The crank-cam 1016 converts the linear motion of the cylinder liners 1014 to rotary motion, as will be discussed in further detail below.

Figure 5:
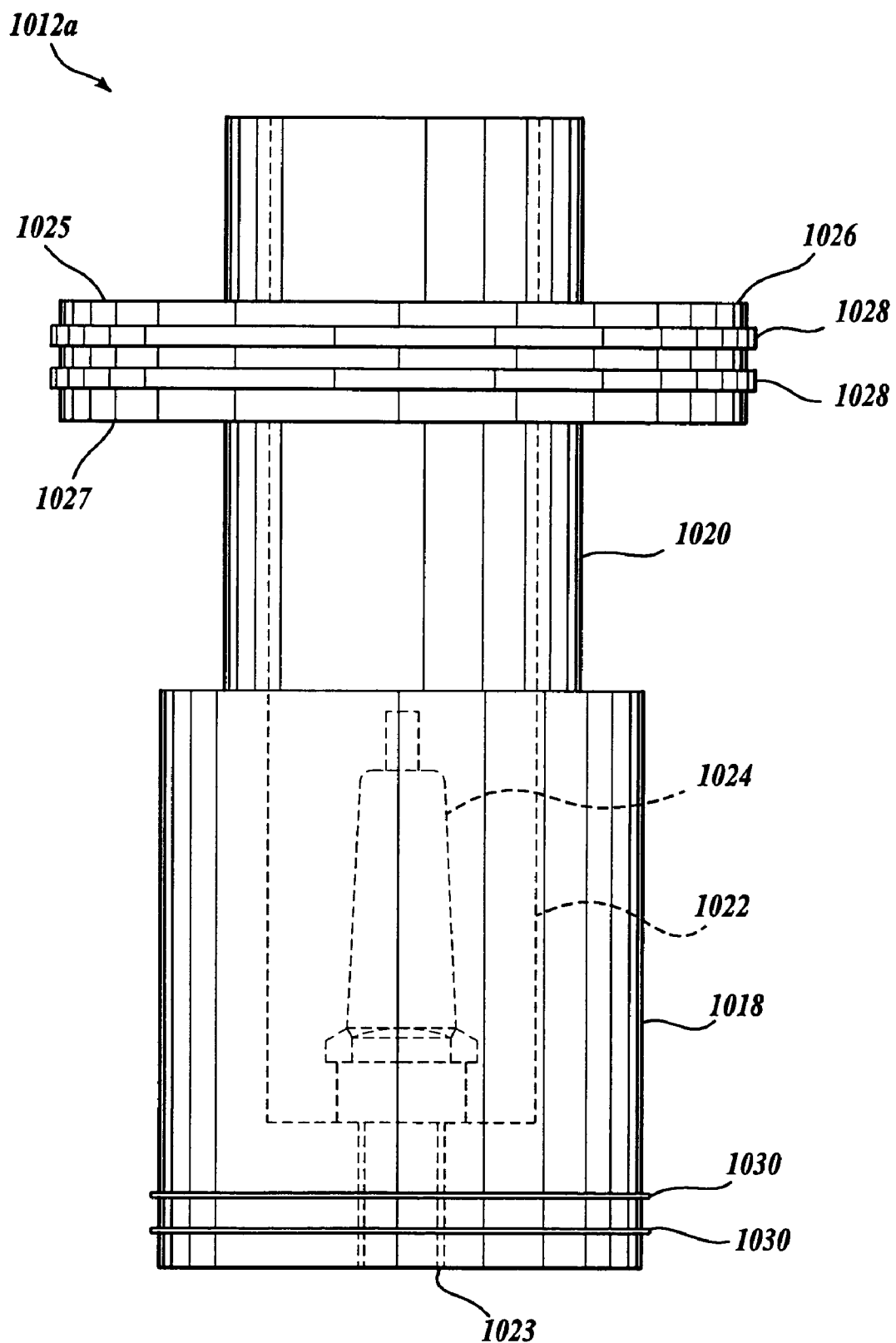
FIG. 5 is an elevation view of one embodiment of one of the substantially stationary pistons shown in FIG. 4.

Referring to FIG. 5, the physical structure of one of the four substantially stationary pistons 1012 formed in accordance with the present invention will now be described. Inasmuch as the pistons 1012 are substantially identical to one another, reference to the piston 1012a, illustrated in FIG. 5, shall be understood as also referring to the corresponding other three pistons 1012b, 1012c, and 1012d (see FIG. 4) where context permits. The piston 1012a is a hollowed, cylindrical plunger having a piston head 1018 concentrically and perpendicularly mounted to a shaft 1020. Both the piston head 1018 and shaft 1020 have aligned internal bores, forming a channel 1022 running axially through the center of the piston 1012. The channel 1022 allows a substantial reduction in the weight of the piston 1012, while also permitting access to the spark plug 1024 and/or a fuel injector (not shown) disposed within the piston head 1018. The pistons 1012 contain a spark plug or injector hole 1023 for the mounting of a spark plug 1024 and/or fuel injector therein.

Circumferentially mounted on the piston head 1018 are two compression rings 1030. As is well known in the art, the compression rings 1030 prevent the blow-by of combustion gases and products past the piston head 1018, mainly during the compression and expansion portions of the thermodynamic cycle. Although not shown, the piston head 1018 may also include an oil control ring, as is well known in the art. In proximity to the compression rings 1030, the diameter of the piston head 1018 is substantially equal to the diameter of the cylinder liner 1014. The diameter of the piston head 1018 may be tapered thereafter along the length of the piston head 1018, resulting in a portion of the piston head 1018 spaced from the compression rings having a relatively smaller diameter.

Circumferentially mounted on the shaft 1020 is a compression ratio control plate 1026. The compression ratio control plate 1026 is adaptable to receive pressurized control fluid on the upper and lower annular surfaces 1025 and 1027 of the plate 1026. By selectively providing a pressure differential across the annular surfaces 1025 and 1027, the axial position of the piston 1012a may be adjusted relative to the engine block to allow the power setting and compression ratio of the engine to be adjusted, as will be described in greater detail below. Two oil control rings 1028 are circumferentially mounted on the compression ratio control plate 1026 to prevent the leakage of any control fluid thereby.

Figure 6:
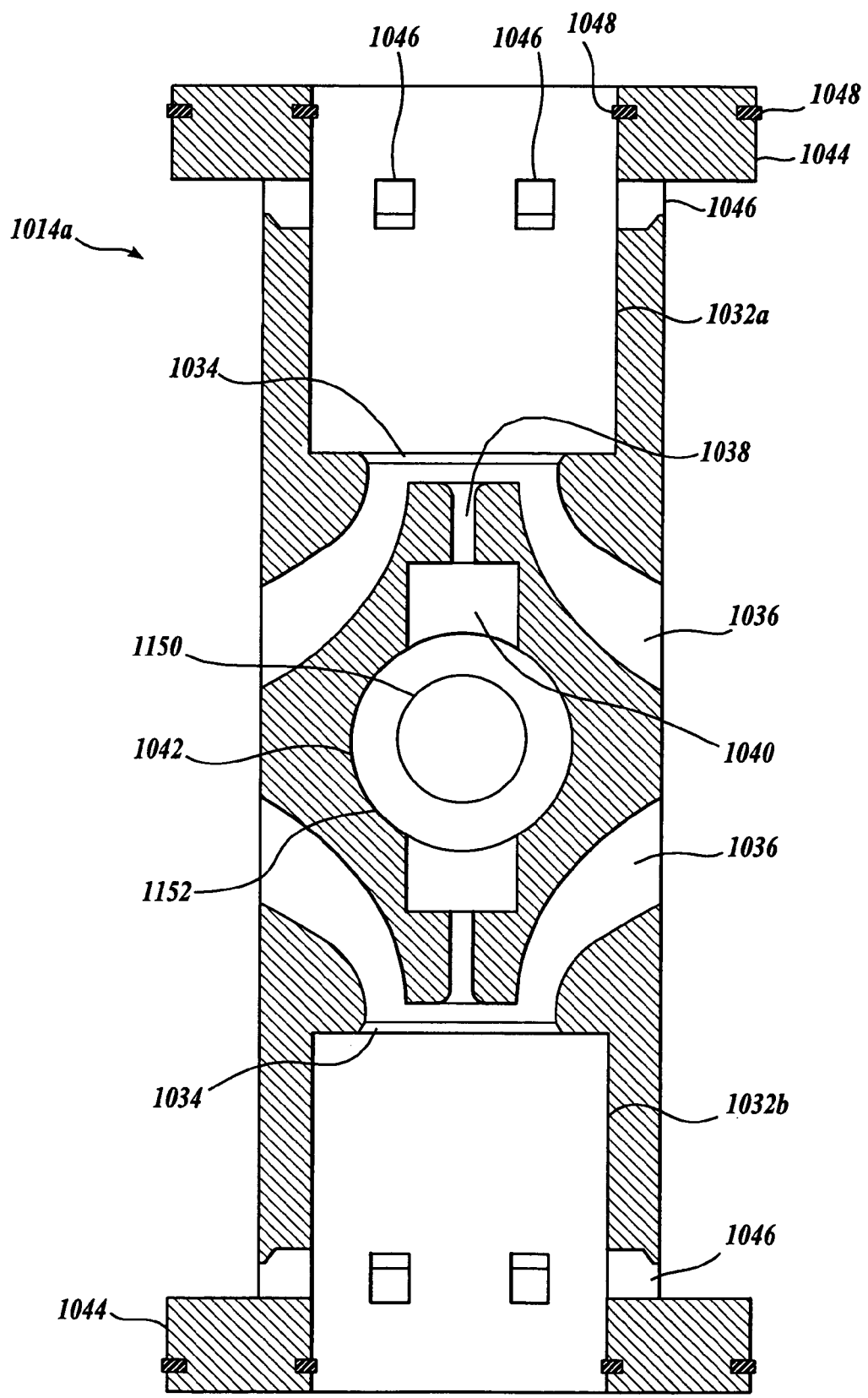
FIG. 6 is a cross-sectional view of one embodiment of the reciprocating cylinder liner shown in FIG. 4.

Referring to FIG. 6, reciprocating double cylinder liner 1014a, which operates in conjunction with two of the above-described substantially stationary pistons 1012, will now be described. Inasmuch as the double cylinder liners 1014 are substantially identical to one another, reference to the cylinder liner 1014a illustrated in FIG. 6 shall be understood as also referring to the other cylinder liner 1014b (see FIG. 4), where context permits. The double cylinder liner 1014a is a generally elongate cylindrical structure having a first axially aligned bore concentrically formed in an upper distal end of the cylinder liner 1014a, thereby forming a first cylinder 1032a for reciprocatingly receiving a piston 1012a (see FIG. 4). Located on an opposite lower distal end of the cylinder liner 1014a is a second concentrically formed, axially aligned bore in the cylinder liner 1014a, thereby forming a second cylinder 1032b for reciprocatingly receiving a second piston 1012b (see FIG. 4). The cylinders 1032a and 1032b are shaped and sized to receive the pistons 1012a and 1012b in a clearance fit relationship, as is well known in the art.

Figure 7:
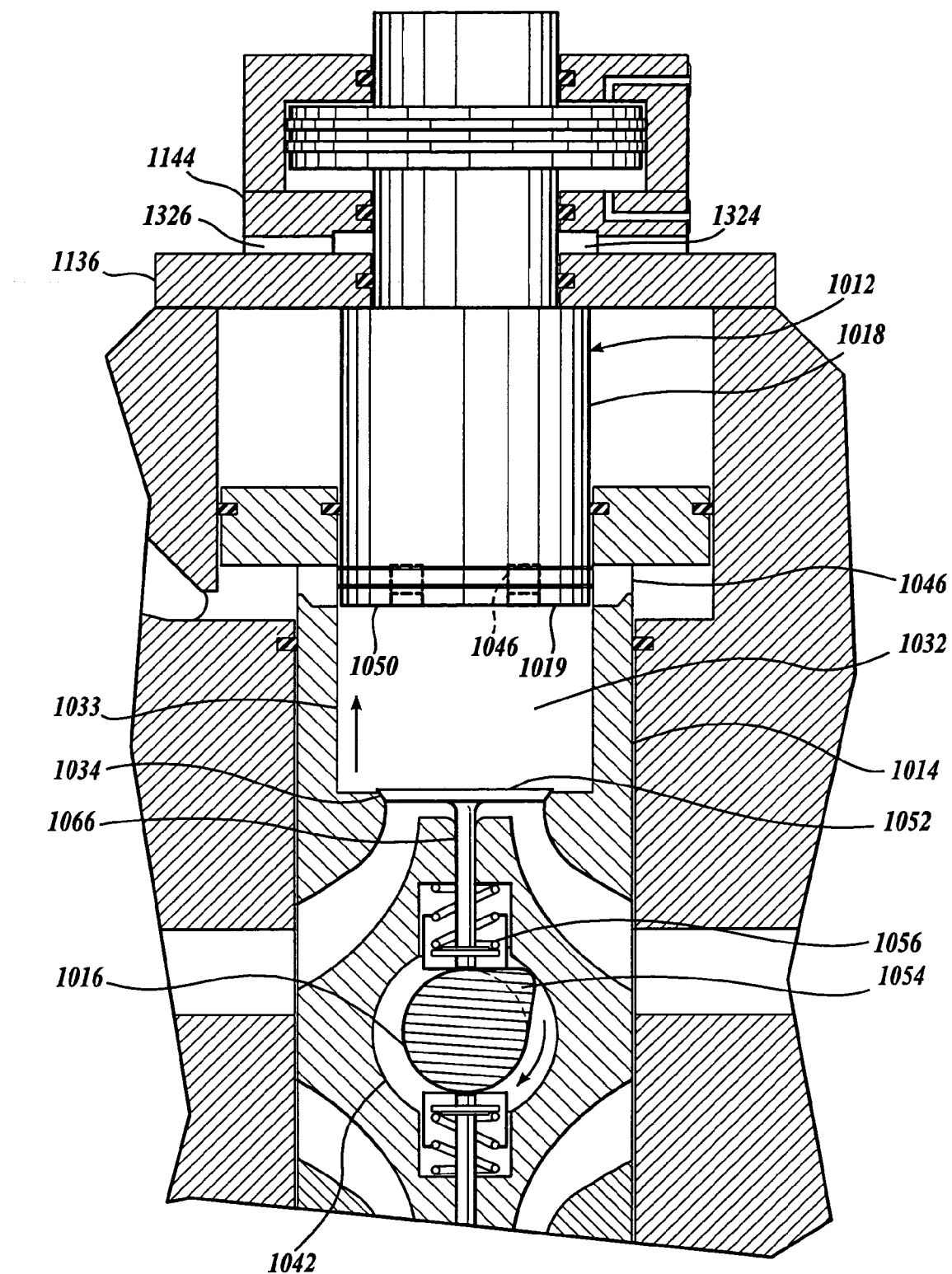
FIG. 7 is a fragmentary cross-sectional view of a portion of the reciprocating cylinder liner and related components shown in FIG. 4, illustrating the reciprocating cylinder liner as a compression portion of a thermodynamic cycle is initiated.

Referring now to FIGS. 4, 6, and 7, at the inner or bottom ends of the cylinders 1032 are exhaust valve seats 1034. The exhaust valve seats 1034 are formed by well-known techniques in the art to receive an exhaust valve there within. In fluid communication with the exhaust valve seats 1034 are four exhaust gas passages 1036 for discharging exhaust gases from the cylinders 1032. Centrally bored through the cylinder liner 1014a is a valve stem bore 1038. The valve stem bore 1038 is sized to receive a stem of the exhaust valve 1052. In communication with the valve stem bore 1038 is a valve spring housing 1040. The valve stem housing 1040 is sized and configured to house a spring for biasing the exhaust valve in the closed position. In communication with the valve spring housing 1040 is a crank-cam housing 1042. The crank-cam housing 1042 is sized and configured to house the crank-cam 1016 and allow its rotation therewithin.

Figure 11:
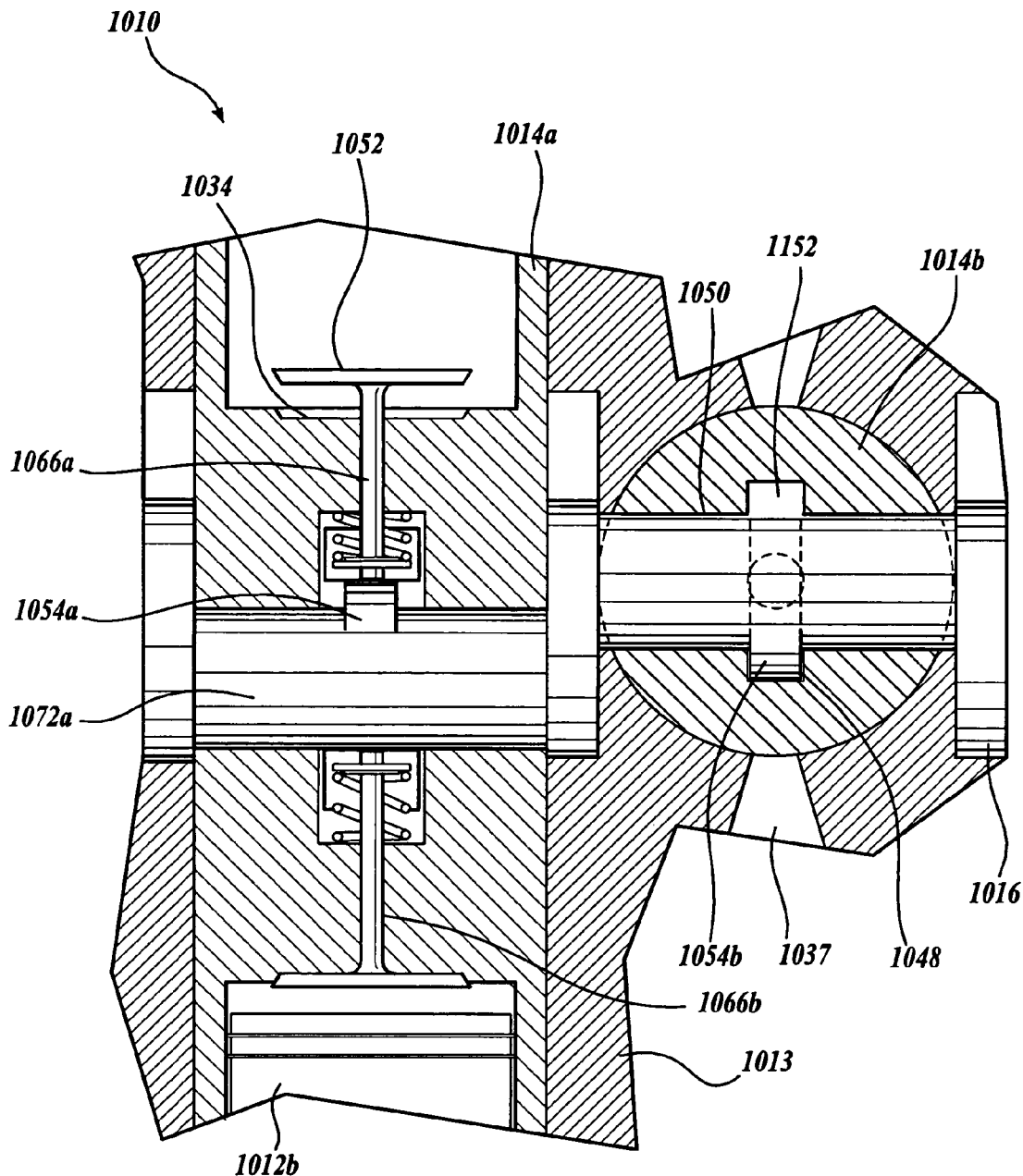
FIG. 11 is a fragmentary cross-sectional view of the reciprocating internal combustion engine of FIG. 1, the cross-sectional cut taken substantially along the centerline of a crank-cam so as to be coplanar with the centerline of a first cylinder liner and passing perpendicularly though the centerline of a second cylinder liner oriented normal to the first cylinder liner.

Referring now to FIGS. 6 and 11, the crank-cam housing 1042 is formed by a cylindrically shaped bore 1150 perpendicularly passing through the cylinder liner 1014a at a location equidistant from the ends of the cylinder liner. The radius of the bore 1150 is substantially equal to the distance measured from the centerline of the crank-cam 1016 to an outer surface of a crank-cam 1016 crank journal 1072. A radius of this dimension allows the crank journal to rotate freely within the bore 1150 of the crank-cam housing 1042 during operation. The diameter of the bore 1150 is stepped suddenly outward in the center of the bore 1150 to form a lobe clearance bore 1152. The radius of the lobe clearance bore 1152 is equal to or greater than a distance measured from a centerline of the crank-cam to the distal end or peak of the lobe 1054 of the crank-cam 1016. A radius of this dimension provides sufficient clearance for the lobe 1054 to rotate freely within the crank-cam housing 1042.

Located on opposite distal ends of the cylinder liner 1014a are annular precompression plates 1044. The annular precompression plates 1044 are utilized to compress and deliver pressurized combustion gases to the cylinders 1032, as will be discussed in more detail below. In proximity to the annular precompression plates 1044 are intake ports 1046. In the illustrated embodiment, the intake ports 1046 are spaced circumferentially about the cylinders 1032 at 60° intervals; however, it should be apparent to one skilled in the art that other configurations are suitable. The intake ports 1046 allow the entry of combustion gases into the cylinders 1032 during operation for scavenging and charging of the cylinders 1032. Located on the inner and outer surfaces of the annular precompression plates are inner and outer combustion gas/oil seals 1048. The seals 1048 prevent the passage of fluids thereby as will be described in more detail below.

Referring now to FIG. 7, in light of the above description of the reciprocating double cylinder liners 1014 and the substantially stationary pistons 1012, the relationship of these and related components to one another during significant events in a thermodynamic cycle will now be discussed. The illustrated embodiment of the reciprocating internal combustion engine 1010 of the present invention operates on a two-stroke cycle. Therefore, for every revolution of the crank-cam 1016, each piston 1012 completes the thermodynamic cycle in two strokes, a single stroke defined by movement of the cylinder liner 1014 from a TDC position to a BDC position (or vice versa) relative to the substantially stationary pistons 1012 contained within the cylinder liners 1014. Therefore, every stroke of the cylinder liner 1014 is either a power stroke, also known as an expansion stroke, or a compression stroke relative to each piston 1012. This requires the intake and exhaust functions, i.e., scavenging, to occur rapidly at the end of each power stroke and before the succeeding compression stroke. In the illustrated embodiment, each piston 1012 undergoes one power stroke for each revolution of the crank-cam 1016, resulting in twice as many power strokes as in a similarly designed four-stroke cycle engine for a given RPM.

Still referring to FIG. 7, the cylinder liner 1014 is depicted at the commencement of the compression portion of the thermodynamic cycle. More specifically, the cylinder liner 1014 is depicted as it moves upward from the cylinder liner's BDC position toward the piston 1012. As cylinder liner 1014 moves upward, the piston 1012 completely covers the intake ports 1046, thereby sealing off the cylinder 1032. In the depicted position, an exhaust lobe 1054 on the crank-cam 1016 is oriented just as the valve stem 1066 comes off of the exhaust lobe 1054, thereby allowing a valve spring 1056 to bias an exhaust valve 1052 into a closed position. In the closed position, the exhaust valve 1052 sealingly engages an exhaust valve seat 1034 in the cylinder liner 1014, thereby preventing the discharge of any combustion gases from the cylinder 1032. Configured as described, the combustion gases are sealingly contained within a combustion chamber 1033, defined by the side and bottom peripheral walls of the cylinder 1032 and the end surface, or crown 1019 of the piston head 1018.

Figure 8:
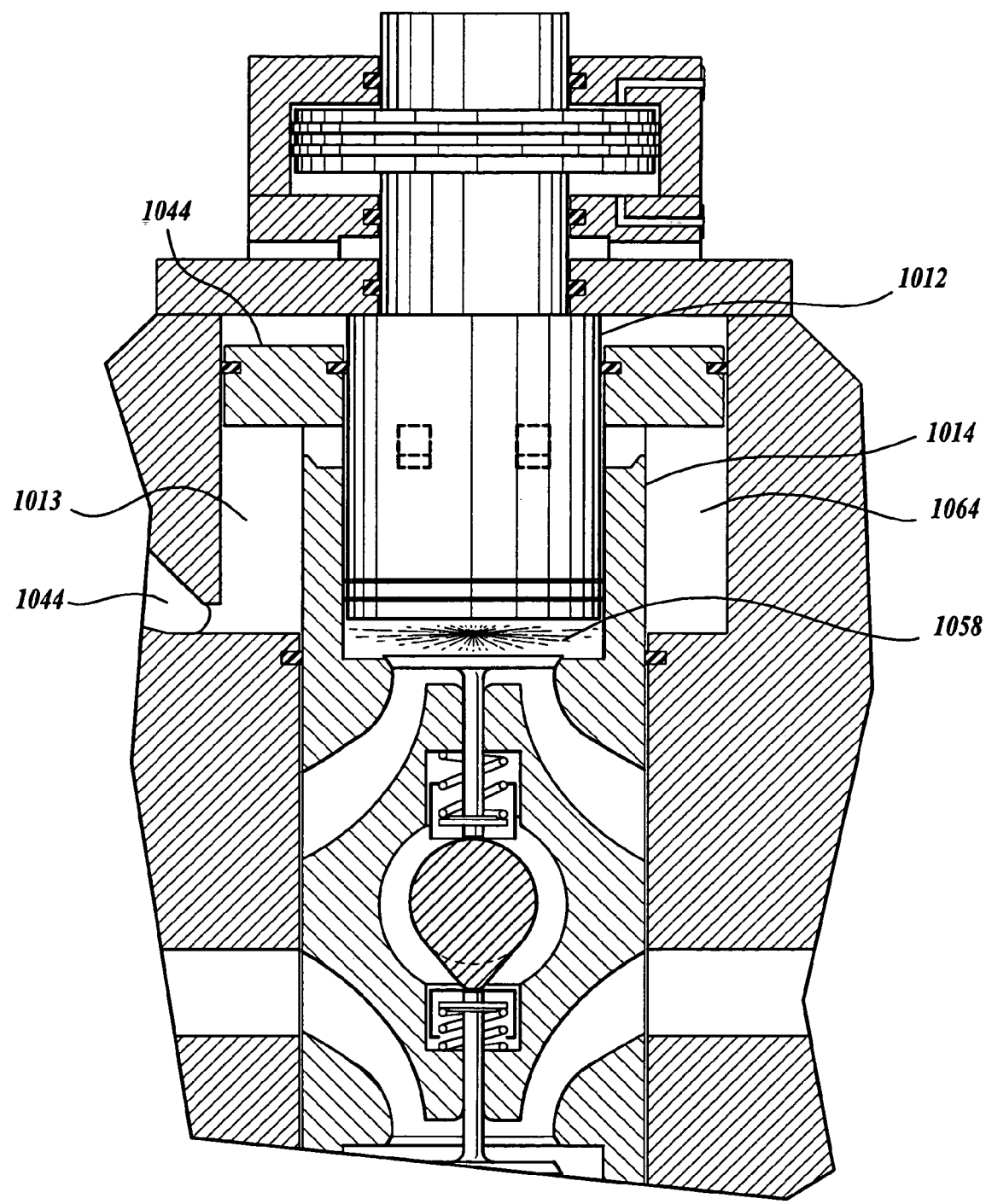
FIG. 8 is a fragmentary cross-sectional view of the reciprocating cylinder liner and related components shown in FIG. 4, illustrating the reciprocating cylinder liner in a top-dead-center (TDC) position with respect to the shown substantially stationary piston as the reciprocating cylinder liner transitions into an expansion portion of the thermodynamic cycle.
Figure 9:
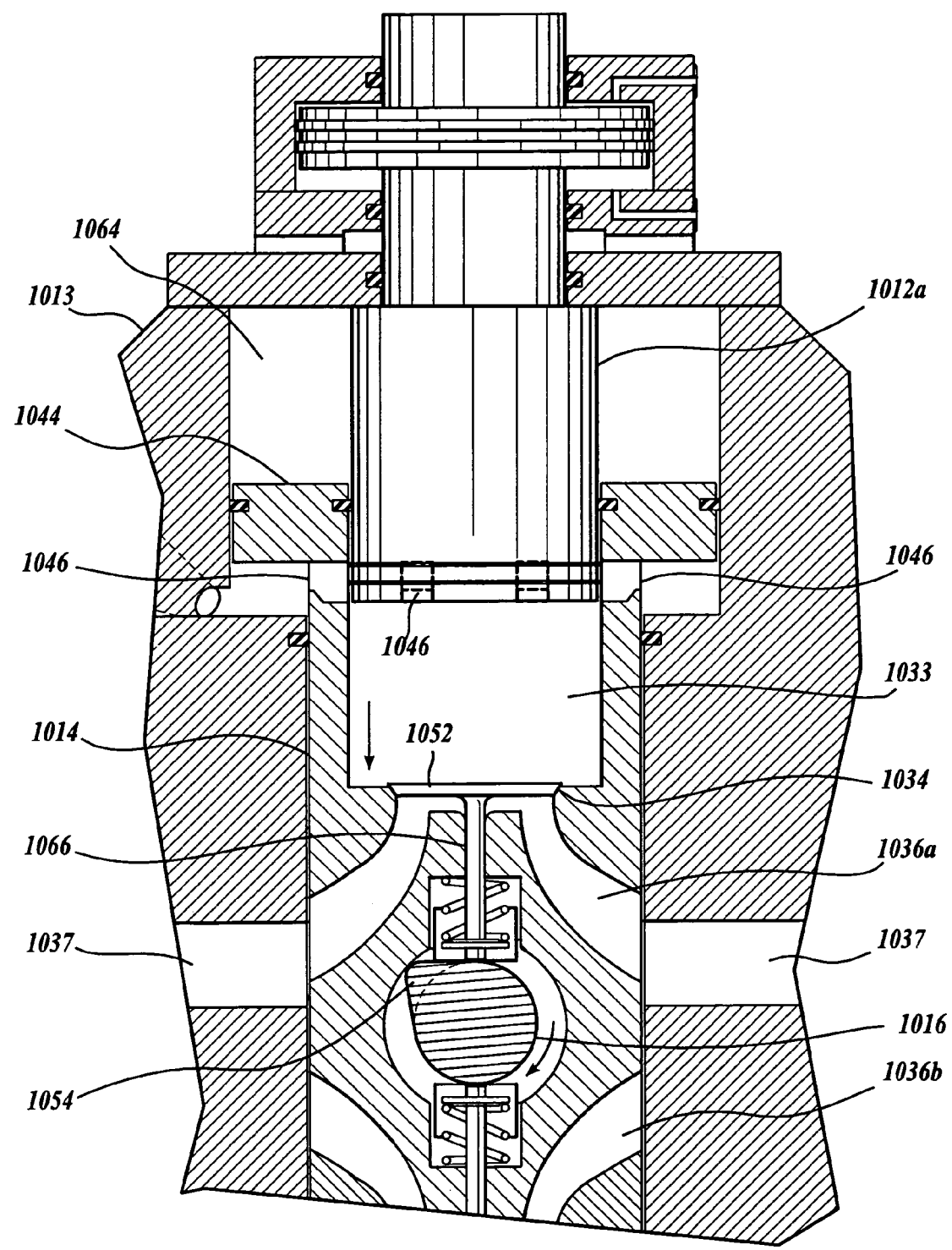
FIG. 9 is a fragmentary cross-sectional view of the reciprocating cylinder liner and related components shown in FIG. 4, illustrating the reciprocating cylinder liner as the cylinder liner transitions into a scavenging portion of the thermodynamic cycle, marked by the opening of a plurality of intake ports near a crown of the substantially stationary piston and the opening of an exhaust valve.

As the cylinder liner continues to approach the piston, departing from its BDC position and approaching its TDC position relative to the piston 1012, the volume of the combustion chamber 1033 is accordingly decreased, thereby compressing the combustion gases contained therewithin. Referring now to FIG. 8, when, or just prior to arrival of the cylinder liner 1014 at its TDC position respective to the piston 1012, a high voltage spark 1058 is discharged from the spark plug 1024 (see FIG. 5) by well-known means, thereby igniting the combustion gases. As the combustion gases burn, the resulting products of combustion expand, driving the cylinder liner 1014 away from the piston 1012. Referring now to FIG. 9, the expansion of the products of combustion continues to drive the cylinder liner 1014 down and away from the piston 1012, until the point in the cycle wherein the exhaust valve 1052 is displaced from its seat 1034 and the intake ports 1046 are uncovered, thus initiating the scavenging of the products of combustion from the combustion chamber 1033.

However, prior to scavenging the products of combustion from the combustion chamber 1033, a new volume of combustion gases is pressurized to aid in scavenging of the combustion chamber 1033. In the illustrated embodiment of the present invention, this is accomplished by the sweeping of the annular precompression plates 1044 through an intake chamber 1064. More specifically, as the cylinder liner 1014 travels upward from the position shown in FIG. 7 to the position shown in FIG. 8, the annular precompression plate 1044 is forced to sweep through the cylindrically-shaped intake chamber 1064. As the precompression plate 1044 sweeps upward through the intake chamber 1064, a vacuum is created within the intake chamber 1064, which draws new combustion gases into the intake chamber 1064. A well-known one-way reed check valve (not shown) allows the flow of the combustion gases into the intake chamber 1064, while preventing the passage of any combustion gases or products of combustion out of the intake chamber 1064.

As the cylinder liner 1014 travels downward from the position shown in FIG. 8 to the position shown in FIG. 9, i.e., from a TDC position to a BDC position, the intake chamber 1064 is a sealed pressure vessel as the intake ports 1046 are sealed off by the piston 1012 and the one-way reed check valves prevent the discharge of combustion gases out the intake chamber 1064. As the precompression plate 1044 sweeps downward through the intake chamber 1064, the combustion gases contained in the intake chamber 1064 are compressed until released into the combustion chamber 1033 by the uncovering of the intake ports 1046.

The intake chamber 1064 preferably contains a volume greater than the maximum displacement of the combustion chamber 1033. In the illustrated embodiment, the intake chamber 1064 is three times larger than the maximum displacement of the combustion chamber, although it should be apparent to one skilled in the art that other ratios of intake chamber volume to maximum combustion chamber volume are suitable for use with the present invention, such as low as 1:1 and up to 3:1 or higher. As a result of the relatively greater volume of the intake chamber 1064 relative to the combustion chamber 1033, combustion gases may be provided at an elevated pressure. Thus, by selecting the relative size of the intake chamber 1064, combustion gases at elevated pressures similar to those reached in a super-charged or turbo-charged conventional engine may be achieved. The pressurization of the combustion gases occurs even at low RPMs, unlike conventional super-charged or turbo-charged engines, which typically are unable to provide sufficient pressurization of the combustion gases at low RPM, resulting in a lag in engine performance as the engine reaches an elevated RPM able to provide sufficiently pressurized combustion gases.

Scavenging of the combustion chamber 1033 commences at the end of the power stroke. The end of the power stroke is marked by the opening of the intake ports 1046 and the exhaust valve 1052. This occurs, as depicted in FIG. 9, as the cylinder liner 1014 moves down and away from the substantially stationary piston 1012 to the point that the intake ports 1046 are initially uncovered and the exhaust valve 1052 is initially lifted from its seat 1034. As the intake ports 1046 are initially uncovered, the pressurized combustion gases contained within the intake chamber 1064 below the precompression plate 1044 are released into the combustion chamber 1033. At approximately the same time, the exhaust valve 1052 is initially lifted off the valve seat 1034 as the lobe 1054 of the crank-cam 1016 engages the valve stem 1066, thereby disposing the exhaust valve 1052 toward the substantially stationary piston 1012. Thus, the products of combustion contained in the combustion chamber 1033 begin to be swept from the combustion chamber 1033 as the pressurized combustion gases contained in the intake chamber 1064 are released from the intake chamber 1064 through the intake ports 1046 and through the combustion chamber 1033. The entrance of the pressurized combustion gases into the combustion chamber 1033 forces the products of combustion out the exhaust gas passageways 1036 in the cylinder liner 1014 as they align with the exhaust gas passageways 1037 located in the engine block 1013.

The exhaust gas passageways 1037 are centrally located in the engine block 1013 and are alternately aligned depending upon the position of the cylinder liner 1014, in fluid communication with a first pair of exhaust gas passageways 1036a and a second pair of exhaust gas passageways 1036b in the cylinder liners 1014. More specifically, when the cylinder liner 1014 is at a BDC position with respect to a first piston 1012a, the first pair of exhaust gas passageways 1036a associated with the first piston 1012a are in fluid communication with the exhaust gas passageways 1037 in the engine block 1013. When the cylinder liner moves to a BDC position with respect to a second piston opposing the first piston, the second pair of exhaust gas passageways 1036b associated with the second piston will be in fluid communication with the exhaust gas passageways 1037 in the engine block 1013.

Figure 10:
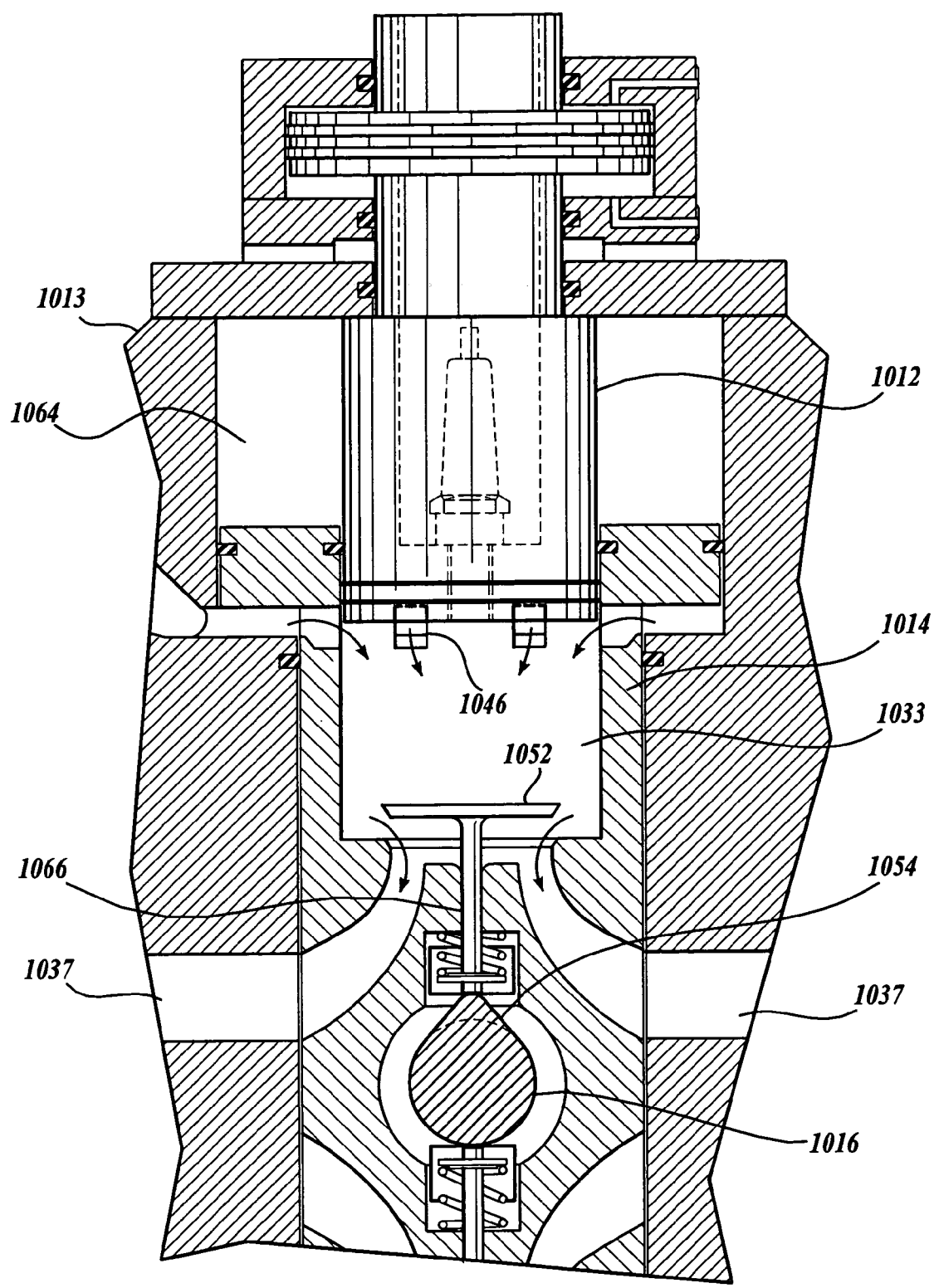
FIG. 10 is a fragmentary cross-sectional view of the reciprocating cylinder liner and related components shown in FIG. 4, illustrating the reciprocating cylinder liner in a bottom-dead-center (BDC) position with respect to the shown substantially stationary piston as the reciprocating cylinder liner undergoes scavenging with the intake ports fully open and the exhaust valve fully open.

Returning now to the operation of the engine, the cylinder liner 1014 continues to move away from the substantially stationary piston 1012a until the cylinder liner 1014 reaches BDC. At BDC, as depicted in FIG. 10, the intake ports 1046 and exhaust valve 1052 are fully open. At this point, the pressurized combustion gases are flowing into the combustion chamber 1033 at a high rate, thus purging the combustion chamber 1033 of the products of combustion and recharging the combustion chamber 1033 with fresh combustion gases. As the crank-cam 1016 continues to rotate clockwise past the BDC position, the exhaust valve 1052 retracts into a closed position as the lobe 1054 disengages from the valve stem 1066 and the cylinder liner 1014 moves toward the substantially stationary piston 1012, thereby closing off the intake ports 1046. Thus, the combustion chamber 1033 is completely sealed and the combustion gases contained therewithin begin to be compressed, thus returning the cycle to the position depicted in FIG. 7.

Referring to FIGS. 12–15, the crank-cam 1016 of the illustrated embodiment will now be described in further detail. The crank-cam 1016 serves both the functions of a crankshaft and a camshaft in a conventional reciprocating internal combustion engine. The crank-cam 16 includes three circular crank webs 1070, two crank journals 1072a and 1072b, and two crank-cam lobes 1054. The crank-cam 1016 may be of steel or other suitably rigid material, forged in one piece, or may be built up, such as by shrink-fitting separately forged crank journals 1072 to cast crank webs 1070. Although the crank webs 1070 are concentrically aligned relative to one another, the crank journals 1072 are offset relative to one another by a distance equal to one half of the stroke length and are also offset relative to the centerline 1074 of the crank webs 1070.

Referring now to FIGS. 4 and 12–15, the crank journals 1072a and 1072b are disposed relative to one another so that when a first cylinder liner 1014a is in a TDC relationship relative to one piston 1012b and at a BDC relationship to a second opposing piston 1012a, the second cylinder liner 1014b is equidistant from its opposing pistons 1012c and 1012d. Likewise, the crank-cam lobes 1054 of each respective crank journal 1072 face in opposite directions, so that when the first crank-cam lobe 1054a has positioned an exhaust valve 1052 in its fully open position relative to a piston 1012a, the other crank-cam lobe 1054b is equidistant from the opposing substantially stationary pistons 1012c and 1012d, and therefore does not engage the valve stems of either exhaust valve, thus placing the respective exhaust valves in a closed position.

As should be apparent to one skilled in the art, the force to compress the combustion gases associated with a first piston 1012a is provided by the expansion of the gases related to the opposing piston 1012b. Therefore, as should be apparent to one skilled in the art, the force exerted upon the crank journal 1072a is a resultant force of an expansion force generated by the expansion of the combustion gases minus a compression force required to compress the combustion gases related to the opposing piston. Further, inasmuch as the compression force and the expansion force are collinear, a moment is not created upon the crank-cam 1016 by the simultaneous application of the expansion and compression forces. Thus, the crank-cam 1016 of the present invention may be reduced in size relative to a crankshaft of a conventional engine that does not counter the expansion force with a collinear compression force.

Referring now to FIGS. 12–15 and 16–31, the relationship between the cylinder liners 1014a and 1014b relative to the crank-cam 1016 during operation will now be described. Referring to FIGS. 16 and 17, wherein FIG. 17 is a side view of the components depicted in FIG. 16, a first cylinder liner 1014a is mounted vertically on a first crank journal 1072a. A second cylinder liner 1014b is perpendicularly, and thus horizontally, mounted relative to the first cylinder liner 1014a on a second crank journal 1072b. The first cylinder liner 1014a is restricted to a vertical reciprocating path of travel by the engine block represented by the line identified by the reference numeral 1100. Likewise, the second cylinder liner 1014b is restricted by the engine block to a horizontal-reciprocating path of travel represented by the line identified by the reference numeral 1098.

The reciprocating linear motion of the cylinder liners 1014a and 1014b is translated into rotary motion via the crank-cam 1016. More specifically, the crank-cam 1016 rotates on two axes of rotation. The first axis of rotation 1074 is about the centerline of the crank-cam 1016. More specifically, the first axis of rotation 1074 is defined by a line coplanar, parallel, and equidistant from the centerline 1076a and 1076b of each crank journal 1072a and 1072b. During operation, the crank-cam 1016 rotates about the first axis of rotation 1074, while the first axis of rotation 1074 is further rotated in a circular orbit 1080 around a second axis of rotation 1078. The second axis of rotation 1078 is defined as a line normal to both the centerline of the first cylinder liner 1014a and the second cylinder liner 1014b that bisects the midpoint of the strokes of each cylinder liner 1014a and 1014b. The radius of the circular orbit 1080 from the second axis of rotation 1078 is equal to one-quarter of the stroke length.

Still referring to FIGS. 16 and 17, cylinder liner 1014a is depicted in an extended position, where the cylinder liner 1014a is in a TDC and a BDC position relative to its two opposing pistons, while cylinder liner 1014b is depicted in a midpoint position, where the cylinder liner 1014b is equidistant from its respective opposing pistons. In this configuration, the second axis of rotation 1078 is collinear with the centerline of the crank journal 1072b and bisects the midpoint of the stroke length of cylinder liner 1014b. As the crank-cam rotates clockwise about the first axis of rotation 1074 while the first axis of rotation 1074 simultaneously rotates counter clockwise along the circular orbit 1080 centered around the second axis of rotation 1078, crank-journal 1072b and its related cylinder liner 1014b move linearly to the left along the horizontal path of travel 1098 of the cylinder liner 1014b. Likewise, crank-journal 1072a and its related cylinder liner 1014a move linearly downward along the vertical path of travel 100 of its related cylinder liner 1014a to the configuration shown in FIGS. 18 and 19.

Referring to FIGS. 18 and 19, the crank-cam with attached cylinder liners 1014a and 1014b are shown after the crank-cam has rotated 30° about the first axis of rotation 1074. Thus, cylinder liner 1014a is depicted as it moves linearly downward and away from its extended position depicted in FIGS. 16 and 17 and cylinder liner 1014b is depicted as it travels left from the midpoint position depicted in FIGS. 18 and 19. As the crank-cam rotates clockwise about the first axis of rotation 1074 while the first axis of rotation 1074 simultaneously rotates counter clockwise along the circular orbit 1080 centered around the second axis of rotation 1078, crank-journal 1072b and its related cylinder liner 1014b move linearly to the left along the horizontal path of travel 1098 of the cylinder liner 1014b. Likewise, crank-journal 1072a and its related cylinder liner 1014a move linearly downward along the vertical path of travel 1100 of its related cylinder liner 1014a to the configuration shown in FIGS. 20 and 21.

Referring now to FIGS. 20 and 21, the crank-cam with attached cylinder liners 1014a and 1014b are shown after the crank-cam has rotated 90° about the first axis of rotation 1074. Thus, cylinder liner 1014b is depicted in an extended position relative to its two opposing pistons, while cylinder liner 1014a is depicted in a midpoint position, where the cylinder liner 1014a is equidistant from its respective opposing pistons. In this configuration, the second axis of rotation 1078 is collinear with the centerline 1076a of the crank journal 1072a and bisects the midpoint of the stroke length of cylinder liner 1014*a*. As the crank-cam continues to rotate clockwise about the first axis of rotation 1074 while the first axis of rotation 1074 simultaneously rotates counter clockwise along the circular orbit 1080 centered around the second axis of rotation 1078, crank-journal 1072*b* and its related cylinder liner 1014*b* change direction and now move linearly to the right along the horizontal path of travel 1098 of the cylinder liner 1014*b*. Crank-journal 1072*a* and its related cylinder liner 1014*a* continue to move linearly downward along the vertical path of travel 1100 of its related cylinder liner 1014*a* to the configuration shown in FIGS. 22 and 23.

Referring now to FIGS. 22 and 23, the crank-cam with attached cylinder liners 1014*a* and 1014*b* are shown after the crank-cam has rotated 150° about the first axis of rotation 1074. Thus, cylinder liner 1014*a* is depicted as it moves linearly downward from its midway position depicted in FIGS. 20 and 21 and cylinder liner 1014*b* is shown as the cylinder liner 1014*b* travels right from its extended position depicted in FIGS. 20 and 21. As the crank-cam rotates clockwise about the first axis of rotation 1074 while the first axis of rotation 1074 simultaneously rotates counterclockwise along the circular orbit 1080 centered around the second axis of rotation 1078, crank-journal 1072*b* and its related cylinder liner 1014*b* moves linearly to the right along the horizontal path of travel 1098 of the cylinder liner 1014*b* to its midpoint position. Likewise, crank-journal 1072*a* and its related cylinder liner 1014*a* move linearly downward along the vertical path of travel 1100 of its related cylinder liner 1014*a* to the configuration shown in FIGS. 24 and 25.

Referring to FIGS. 24 and 25, cylinder liner 1014*a* is depicted in a extended position, where the cylinder liner 1014*a* is in a TDC and BDC position relative to its two opposing pistons, while cylinder liner 1014*b* is depicted in a midpoint position, where the cylinder liner 1014*b* is equidistant from its respective opposing pistons. In this configuration, the second axis of rotation 1078 is collinear with the centerline of the crank journal of the cylinder liner 1014*b* and bisects the midpoint of the stroke length of cylinder liner 1014*b*. As the crank-cam rotates clockwise about the first axis of rotation 1074 while the first axis of rotation 1074 simultaneously rotates counter clockwise along the circular orbit 1080 centered around the second axis of rotation 1078, crank-journal 1072*b* and its related cylinder liner 1014*b* move linearly to the right along the horizontal path of travel 1098 of the cylinder liner 1014*b*. Likewise, crank-journal 1072*a* and its related cylinder liner 1014*a* move linearly upward along the vertical path of travel 100 of its related cylinder liner 1014*a* to the configuration shown in FIGS. 26 and 27.

Referring to FIGS. 26 and 27, the crank-cam with attached cylinder liners 1014*a* and 1014*b* are shown after the crank-cam has rotated 210° about the first axis of rotation 1074. Thus, cylinder liner 1014*a* is depicted as it moves linearly upward and away from its extended position depicted in FIGS. 24 and 25 and cylinder liner 1014*b* is depicted as it travels right from the equidistant position depicted in FIGS. 24 and 25. As the crank-cam rotates clockwise about the first axis of rotation 1074 while the first axis of rotation 1074 simultaneously rotates counter clockwise along the circular orbit 1080 centered around the second axis of rotation 1078, crank-journal 1072*b* and its related cylinder liner 1014*b* move linearly to the right along the horizontal path of travel 1098 of the cylinder liner 1014*b*. Likewise, crank-journal 1072*a* and its related cylinder liner 1014*a* move linearly upward along the vertical path of travel 1100 of its related cylinder liner 1014*a* to the configuration shown in FIGS. 28 and 29.

Referring now to FIGS. 28 and 29, the crank-cam with attached cylinder liners 1014*a* and 1014*b* are shown after the crank-cam has rotated 270° about the first axis of rotation 1074. Thus, cylinder liner 1014*b* is depicted in an extended position relative to its two opposing pistons, while cylinder liner 1014*a* is depicted in a midpoint position, where the cylinder liner 1014*b* is equidistant from its respective opposing pistons. In this configuration, the second axis of rotation 1078 is collinear with the centerline of the crank journal 1072*b* and bisects the midpoint of the stroke length of cylinder liner 1014*b*. As the crank-cam continues to rotate clockwise about the first axis of rotation 1074 while the first axis of rotation 1074 simultaneously rotates counter clockwise along the circular orbit 1080 centered around the second axis of rotation 1078, crank-journal 1072*b* and its related cylinder liner 1014*b* change direction and now move linearly to the left along the horizontal path of travel 1098 of the cylinder liner 1014*b*. Crank-journal 1072*a* and its related cylinder liner 1014*a* continue to move linearly upward along the vertical path of travel 1100 of its related cylinder liner 1014*a* to the configuration shown in FIGS. 30 and 31, thus returning the engine to the configuration depicted in FIGS. 16 and 17, marking the completion of a single thermodynamic cycle relative to each piston.

Referring now to FIG. 11, the interrelationship between the crank-cam 1016 and the cylinder liners 1014*a* and 1014*b* will now be described in further detail. FIG. 11 depicts a fragmentary cross-section of a reciprocating internal combustion engine 1010 formed in accordance with the present invention. The cross-section is taken substantially along the longitudinal length of the crank-cam 1016. With the cross-section taken as such, the vertically oriented-cylinder liner 1014*a* is sectioned along the centerline of the cylinder liner 1014*a*. Inasmuch as cylinder liner 1014*b* is orientated normal to cylinder liner 1014*a*, and thus in a horizontal orientation, the cross-section passes laterally through cylinder liner 1014*b* midway between the ends of the cylinder liner 1014*b*. Cylinder liner 1014*a* is shown in a BDC configuration relative to piston 1012*a* (not shown) and in a TDC relationship relative to piston 1012*b*.

Cylinder liner 1014*b* is shown equidistant from its opposing pistons. With the crank-cam 1016 configured as such, the lobe 1054*a* associated with the crank journal 1072*a* has engaged the valve stem 1066*a* of the exhaust valve 1052 associated with piston 1012*a*, lifting the valve 1052 off of its seat 1034. The lobe 1054*b* associated with the crank journal 1072*b* of cylinder liner 1014*b* is shown equidistant between the valve stems of the opposing substantially stationary pistons. Inasmuch as cylinder liner 1014*b* is midpoint between the opposing pistons associated with the cylinder liner 1014*b*, the cylinder liner 1014*b* is not currently undergoing scavenging. Accordingly, the exhaust gas passageways 1037 in the engine block 1013 are not yet configured in fluid communication with the exhaust gas passageways 1036 (see FIG. 6) of the cylinder liner 1014*b*.

Figure 32:
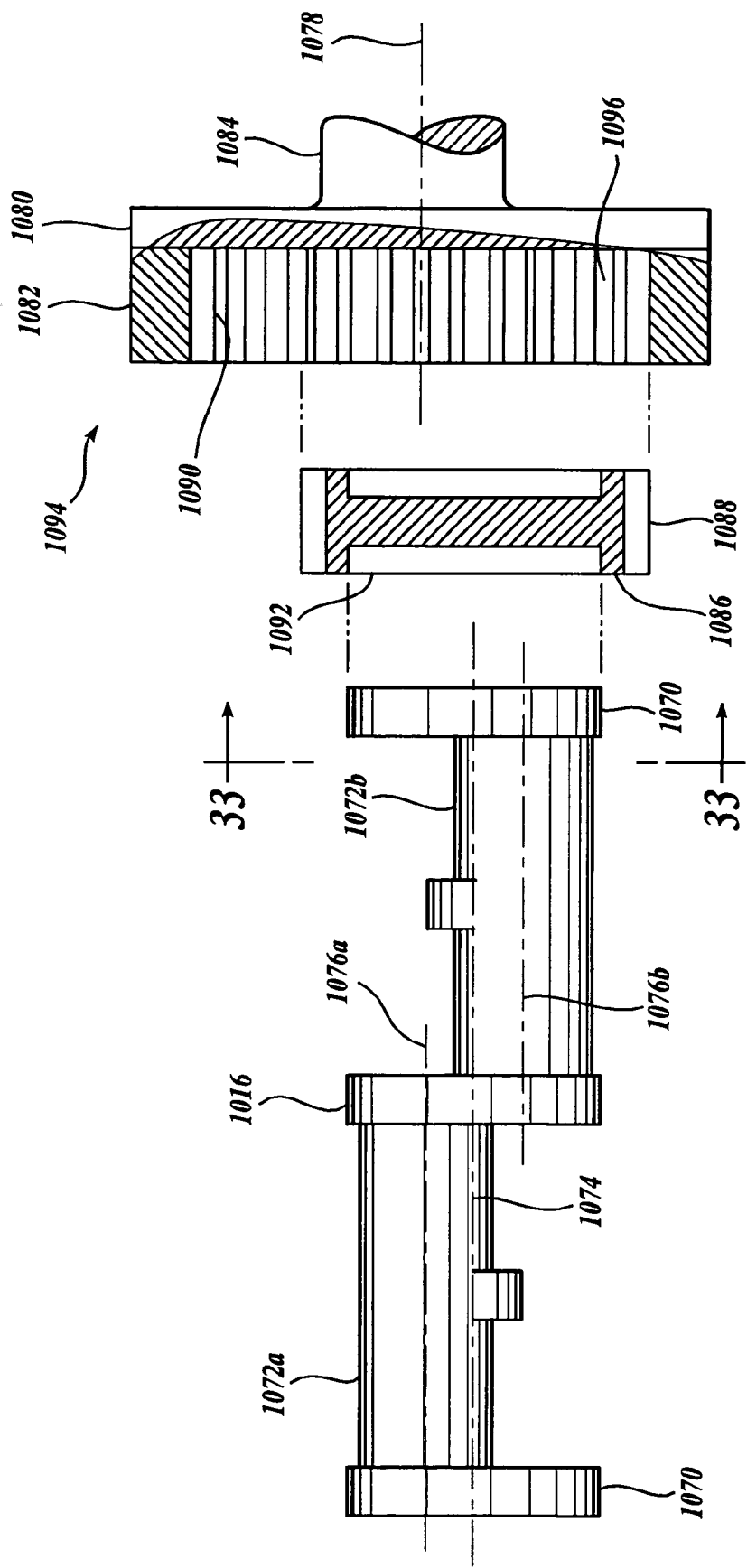
FIG. 32 is an exploded view of a crank-cam, outdrive gear, outdrive reduction gear, and power take-off flange, suitable for use with the illustrated embodiment of the present invention, wherein the outdrive gear is shown in cross-section and the outdrive reduction gear is shown with a partial cut-away.

Referring now to FIG. 32, the components of a reduction outdrive system 1094 will now be described. The reduction outdrive system 1094 translates the reciprocating and rotational motion of the crank-cam 1016 to rotational motion about a centerline of a power take-off shaft 1084. The reduction outdrive system 1094 includes an outdrive reduction gear 1082 and an outdrive gear 1086. The outdrive reduction gear 1082 further includes internal gear teeth 1090 disposed along the peripheral cylindrical wall of an outdrive gear receiving recess 1096. The outdrive reduction gear 1082 is rigidly coupled to a power take-off drive flange 1080 by well-known means, such as fasteners. The power take-off shaft 1084 is perpendicularly and concentrically attached to the power take-off drive flange 1080. The centerline of the power take-off shaft 1084 is collinear with the second axis of rotation 1078. The outdrive gear 1086 has external gear teeth 1088 shaped and dimensioned to communicate with the internal gear teeth 1090 of the outdrive reduction gear 1082. The outdrive gear 1086 has a crank web 1070 receiving recess 1092 shaped and dimensioned to receive the circular shaped crank web 1070. The crank web 1070 is rigidly coupled to the receiving recess 1092 of the outdrive gear 1086 by means well known in the art, such as by fasteners.

In light of the above description of the components of the reduction outdrive system 1094, the operation of the reduction outdrive system 1094 will now be described. Referring to FIGS. 33–38, a letter A is used as an arbitrarily selected reference point on the outdrive gear 1086 and a letter B is used as an arbitrarily selected reference point on the outdrive reduction gear 1082. A reference letter C marks the center point of crank journal 1072b, and thus the cylinder liner 1014b (not shown), and reference letter D marks the center point of the crank journal 1072a and thus the cylinder liner 1014a (not shown).

Figure 33:
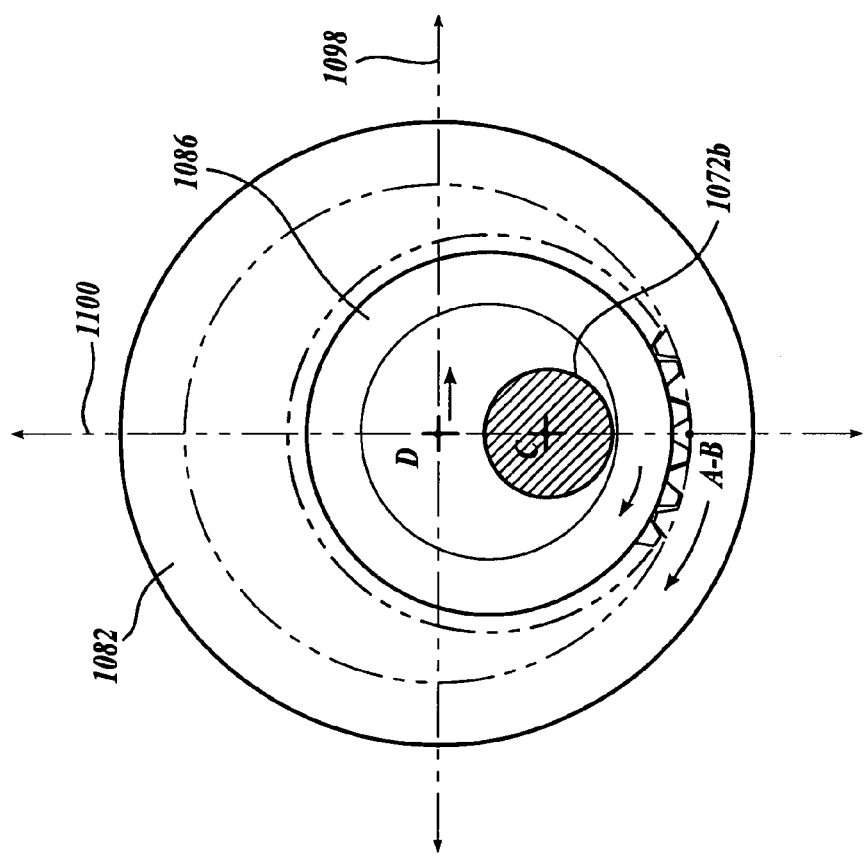
FIG. 33 is a planar cross-sectional end view of the outdrive gear, outdrive reduction gear, power take-off flange, and crank-cam shown in FIG. 32, taken substantially through section 33—33 of FIG. 32.

Referring now to FIG. 33, the outdrive gear 1086 is disposed within the outdrive reduction gear 1082, so that the external gear teeth 1088 of the outdrive gear 1086 intermesh with the internal gear teeth 1090 of the outdrive reduction gear 1082. As the outdrive reduction gear 1082 and the outdrive gear 1086 rotate clockwise while intermeshing, reference point D on the outdrive gear 1086 reciprocates along a horizontal reference line 1098. The reference line 1098 represents the linear path of the cylinder liner 1014b (not shown) and is the same reference line depicted in FIGS. 16–31. Likewise, reference point C reciprocates along a vertical reference line 1100. Vertical reference line 1100 represents the linear path of the cylinder liner 1014a (not shown) and is the same reference line depicted in FIGS. 16–31. As the outdrive reduction gear 1082 and outdrive gear 1086 rotate clockwise, reference point D moves to the right and reference point C moves upward, along their reference lines 1098 and 1100, respectively.

Figure 34:
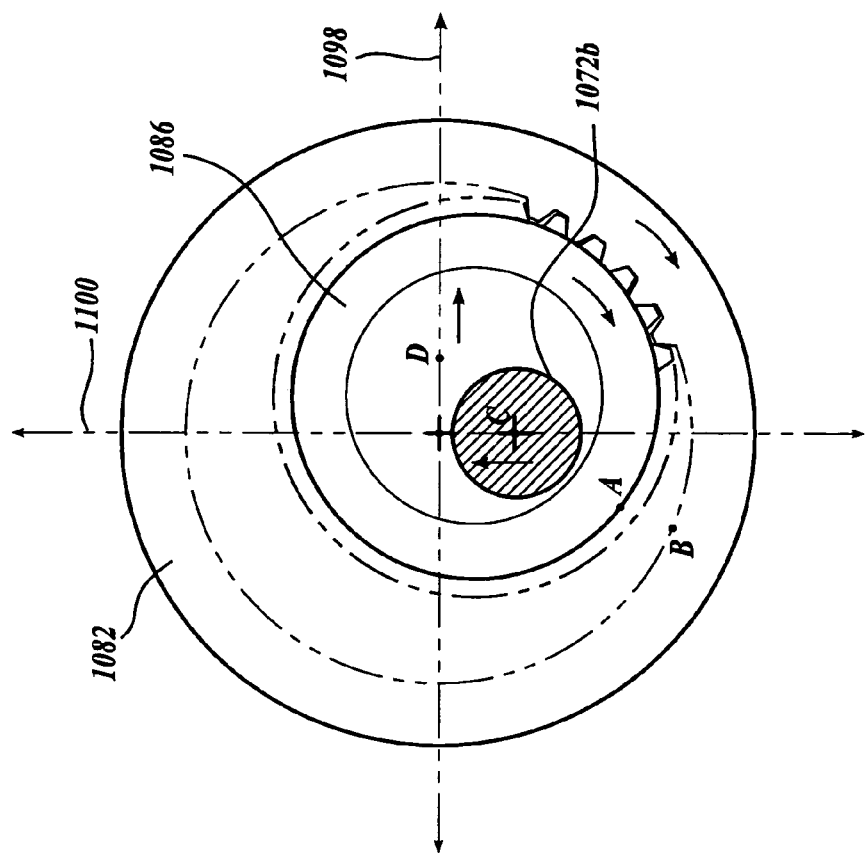
FIG. 34 is a planar end view of the crank-cam, outdrive gear, outdrive reduction gear, and power take-off flange shown in FIG. 32, wherein the outdrive reduction gear has rotated 1/16 of a turn from its position depicted in FIG. 32.

Referring now to FIG. 34, the outdrive gear 1086 has rotated one-eighth of a turn clockwise while the outdrive reduction gear 1082 has rotated one-sixteenth of a turn clockwise from the configuration depicted in FIG. 33. As is apparent from reference to FIG. 34, reference points C and D still lie upon their respective reference lines 1100 and 1098, thereby maintaining the linear path of travel of the centers of the crank journals and, thus, their attached cylinder liners.

Figure 35:
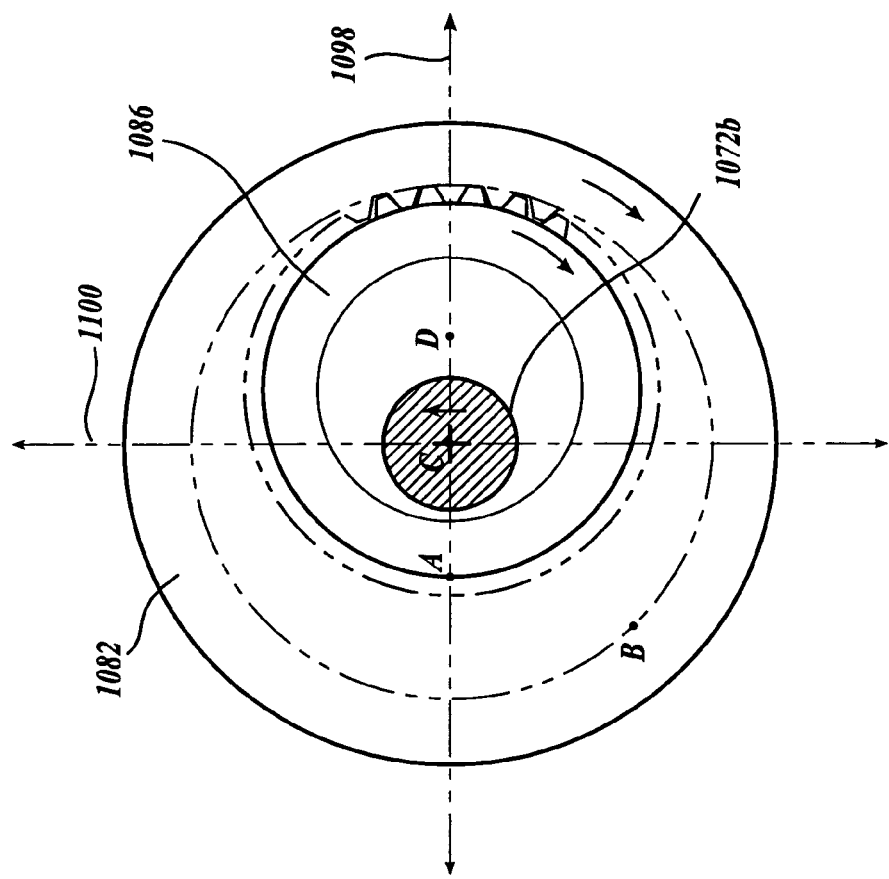
FIG. 35 is a planar end view of the crank-cam, outdrive gear, outdrive reduction gear, and power take-off flange shown in FIG. 32, wherein the outdrive reduction gear has rotated 1/8 of a turn from its position depicted in FIG. 32.

Referring to FIG. 35, the outdrive gear 1086 has now rotated one-quarter of a turn clockwise, while the outdrive reduction gear 1082 has rotated one-eighth of a turn clockwise from the configuration depicted in FIG. 33. By referring to FIG. 35, it is apparent that reference point C has moved vertically upward along the linear reference line 1100, while reference point D has moved horizontally to the right along the horizontal reference line 1098 from their respective positions depicted in FIG. 34. Reference point D is currently at its "zenith"; therefore, the respective cylinder liner is in an extended position, with the cylinder liner at a TDC and BDC position with reference to the substantially stationary opposing pistons associated with the cylinder liner. As the outdrive gear 1082 is rotated further clockwise, reference point D transitions from a rightward direction of travel to a leftward direction of travel along the reference line 1098.

Figure 36:
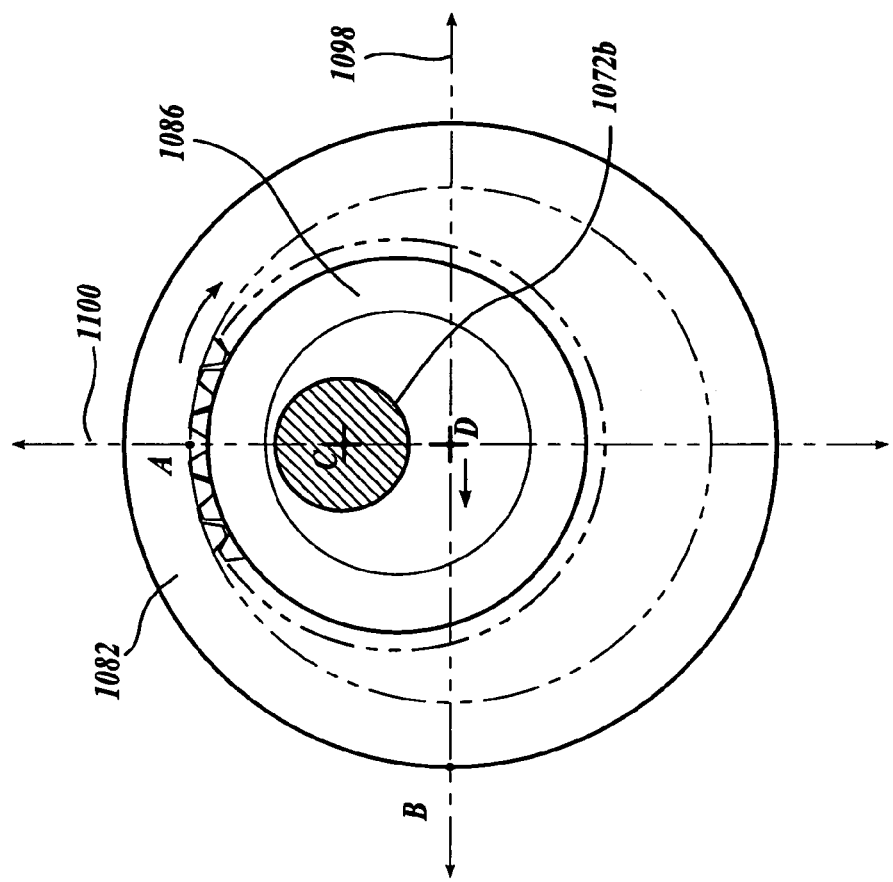
FIG. 36 is a planar end view of the crank-cam, outdrive gear, outdrive reduction gear, and power take-off flange shown in FIG. 32, wherein the outdrive reduction gear has rotated 1/4 of a turn from its position depicted in FIG. 32.

Referring now to FIG. 36, the outdrive gear 1086 has rotated one-half turn and the outdrive reduction gear 1082 has rotated one-quarter turn. Reference point C is now at its zenith; therefore, the corresponding cylinder liner is in an extended position with the cylinder liner at its TDC and BDC position with respect to the two substantially stationary opposing pistons associated with the cylinder liner. As the outdrive gear 1082 is rotated further clockwise, reference point C transitions from a upward direction of travel to a downward direction of travel along the reference line 1100.

Figure 37:
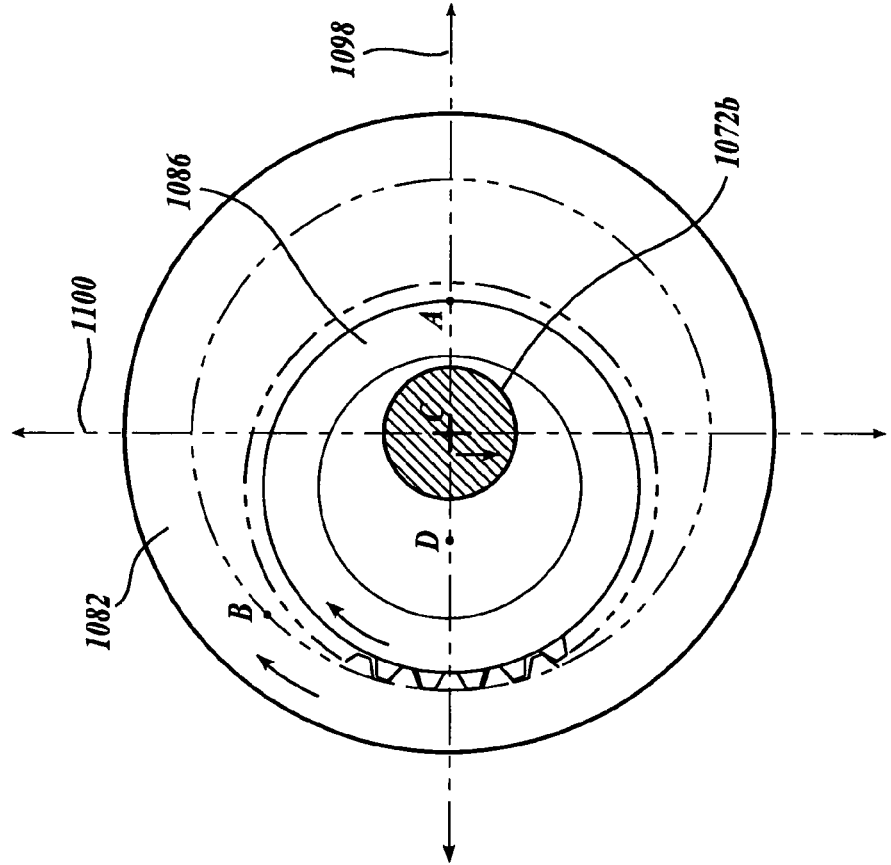
FIG. 37 is a planar end view of the crank-cam, outdrive gear, outdrive reduction gear, and power take-off flange shown in FIG. 32, wherein the outdrive reduction gear has rotated 3/8 of a turn from its position depicted in FIG. 32.

Referring now to FIG. 37, the outdrive gear 1086 has rotated three-quarters of a turn. The outdrive reduction gear 1082 has rotated three-eighths of a turn. Reference point C is now at the center of the reference path 1100. This center position indicates that the cylinder liner associated with reference point C is now equidistant from the substantially stationary pistons associated with the cylinder liner. Correspondingly, reference point D is now at a zenith. Therefore, the cylinder liner associated with reference point D is at an extended position and thus, at a TDC and BDC position with regard to the substantially stationary opposing pistons associated with the cylinder liner.

Figure 38:
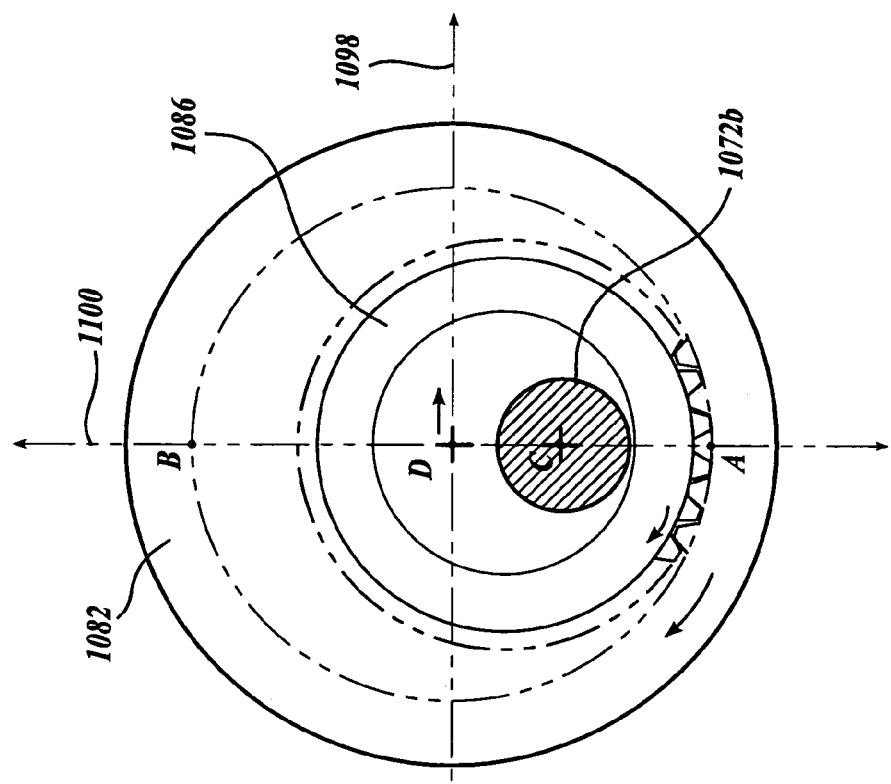
FIG. 38 is a planar end view of the crank-cam, outdrive gear, outdrive reduction gear, and power take-off flange shown in FIG. 32, wherein the outdrive reduction gear has rotated 1/2 of a turn from its position depicted in FIG. 32.

Referring now to FIG. 38, the outdrive gear 1086 has rotated one full turn while the outdrive reduction gear 1082 has rotated one-half turn, as indicated by the relative positions of the reference points A and B. In one full rotation of the outdrive gear 1086, each individual piston has gone through one complete thermodynamic cycle. Through the manipulation of diameters and the possible amount of gear teeth involved, different reduction ratios of engine RPM to power take-off shaft 1084 RPM are possible as should be apparent to one skilled in the art. In the illustrated embodiment depicted in FIGS. 33–38, the outdrive gear 1086 has 30 teeth and the outdrive reduction gear 1082 has 40 teeth. In one 360° rotation of the outdrive gear 1086, the outdrive gear 1086 cams 60 teeth of the outdrive reduction gear 1082. The outdrive reduction gear 1082 has 40 teeth; therefore, it rotates in the process the distance of 20 teeth, which results in a 180° rotation of the outdrive reduction gear 1082 and attached shaft. Thereby a ratio of 2:1 reduction in RPM is accomplished.

Often it is desirable to have a direct outdrive shaft that rotates at the same RPM as the engine or more specifically, at the crank-cam RPM. The direct outdrive shaft may be used to drive accessories, such as a distributor. Referring to FIGS. 39–41, a direct outdrive system 1102 formed in accordance with and suitable for use with the present invention is illustrated. The direct outdrive system 1102 includes a direct outdrive adapter 1104, a direct outdrive 1106, a direct outdrive shaft 1108, and a gliding block 1110. These components work in combination to convert the rotating and reciprocating motion of the crank-cam to a rotational movement in the direct outdrive output shaft 1108.

The configuration of the direct outdrive adapter 1104 will now be discussed. The direct outdrive adapter 1104 is a disk-shaped member having inner (facing the engine) and outer (facing away from the engine) annular surfaces 1114 and 1116, respectively. Formed adjacent to the inner annular surface 1114 is a crank web receiving recess 1118 where one of the crank webs 1070 (see FIG. 14) is received and rigidly fastened there within. Perpendicularly and concentrically mounted relative to the outer annular surface 1116 is a drive shaft 1112. The drive shaft 1112 is received within a bore 1120 located within the gliding block 1110.

The configuration of the gliding block 1110 will now be discussed. The gliding block 1110 is generally a rectangular-shaped block structure having arcuate ends 1122 formed to match the outer circular circumference of the direct outdrive 1106. The length and width of the gliding block 1110 is selected to match the length and width of a channel 1124 formed in the direct outdrive 1106, thereby allowing the gliding block 1110 to be received within the channel 1124. Preferably, a polished finish is applied to the contact surfaces of both the gliding block 1110 and the channel 1124 of the direct outdrive 1116 of which it rides within, to reduce friction and wear.

The direct outdrive 1106 is a disk-shaped member having inner (facing the engine) and outer (facing away from the engine) circular planar surfaces 1126 and 1128, respectively. The channel 1124 for receiving the gliding block 1110 is formed on the inner planar surface 1126. A direct drive output shaft 1108 is perpendicularly and concentrically mounted on the outer planar surface 1128.

Figures 42, 43:
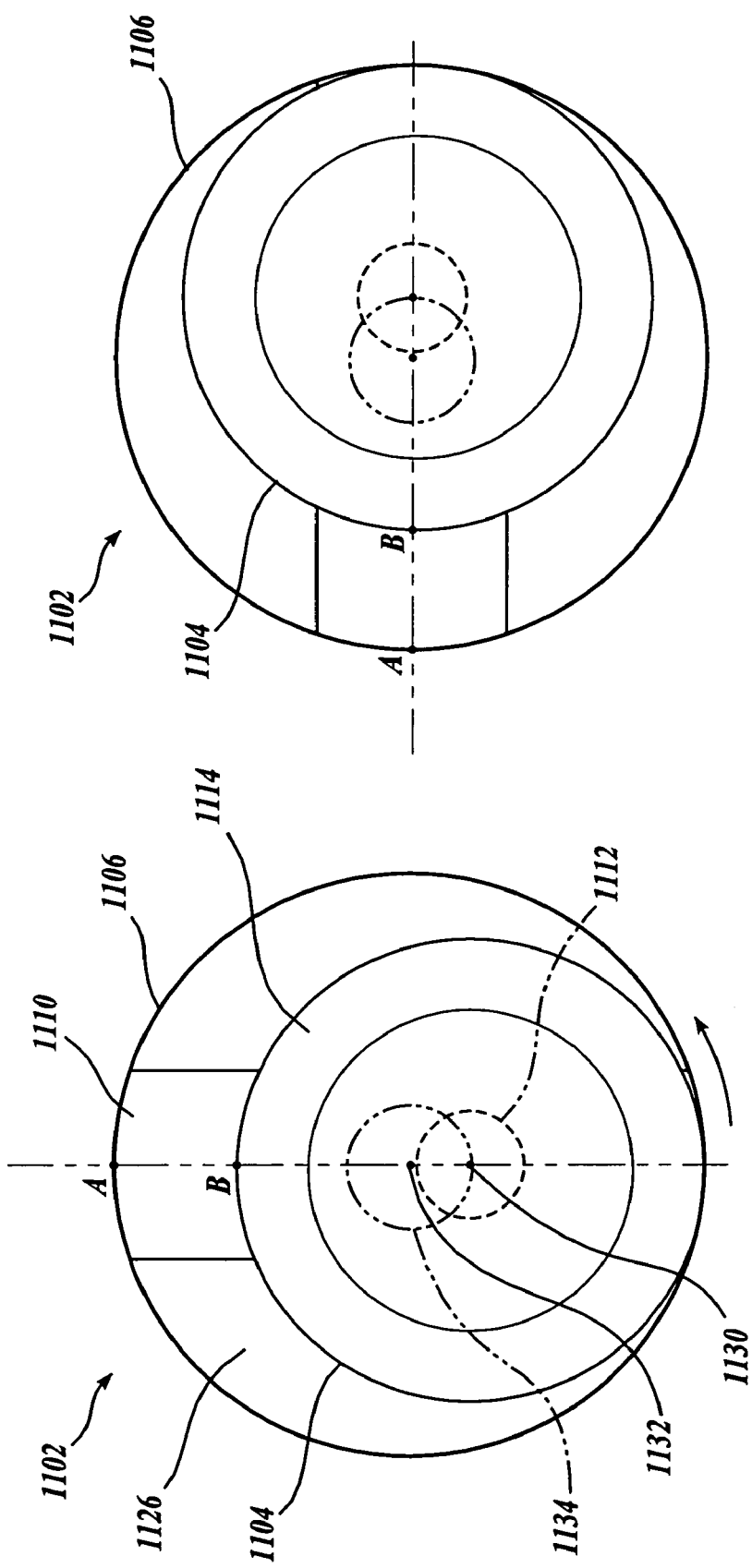
FIG. 42 is a planar end view of the direct outdrive, gliding block, and direct outdrive adapter shown in FIG. 41.
FIG. 43 is a planar end view of the direct outdrive, gliding block, and outdrive adapter shown in FIG. 42, where the direct outdrive has rotated 90° from its position depicted in FIG. 42.

The operation of the direct outdrive system 1102 will now be described in reference to FIGS. 42–45. Referring now to FIG. 42, a planar end view of the direct outdrive system 1102 is shown, depicting the inner planar surface 1114 of the direct outdrive adapter 1104 with the crank-cam removed and the inner circular planar surface 1126 of the direct outdrive 1106. The drive shaft 1112 of the adapter 1104 is shown in phantom. The gliding block 1110 is shown; however the majority of the gliding block 1110 is obscured by the adapter 1104. The letter A is an arbitrarily selected reference point on the outer circumference of the direct outdrive 1106, and the letter B is an arbitrarily selected reference point on the direct outdrive adapter 1104.

Still referring to FIG. 42, the center of the direct outdrive adapter 1104 is indicated by reference numeral 1130. The center of the direct outdrive 1106 is indicated by reference numeral 1132. The direct outdrive adapter 1104 rotates about its center 1130, while also revolving around the center 1132 of the direct outdrive 1106 along a circular orbit 1134, the circular orbit 1134 having a radius equal to ¼ of the stroke length.

Figure 45:
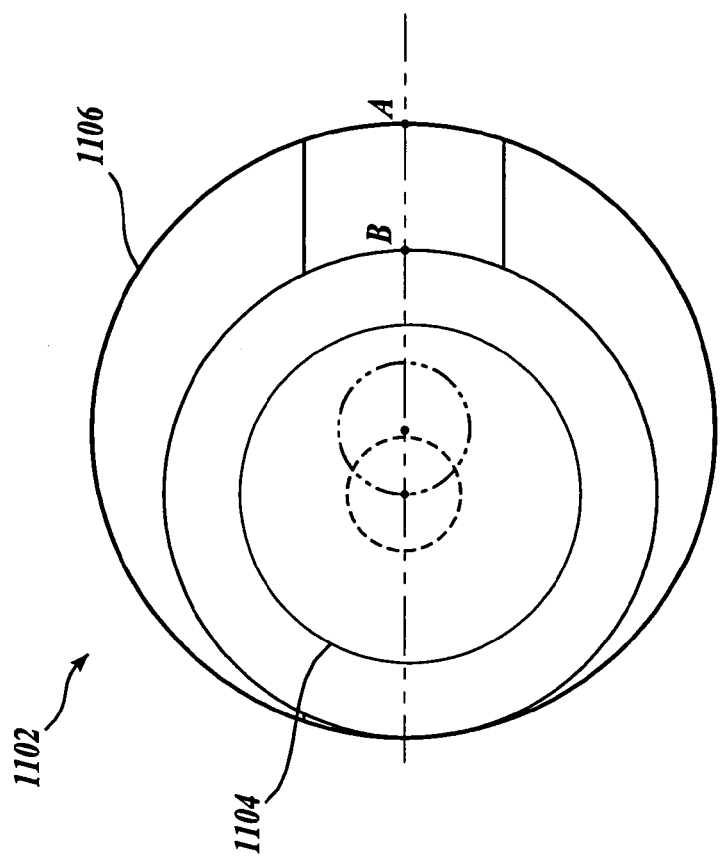
FIG. 45 is a planar end view of the direct outdrive, gliding block, and outdrive adapter shown in FIG. 42, where the direct outdrive has rotated 270° from its position depicted in FIG. 42.
Figure 44:
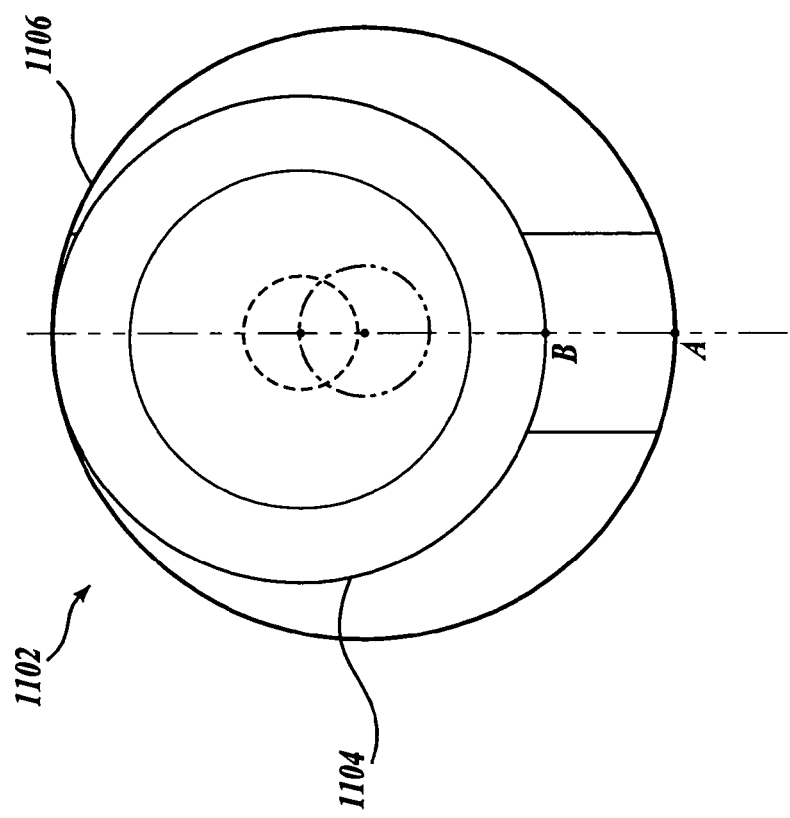
FIG. 44 is a planar end view of the direct outdrive, gliding block, and outdrive adapter shown in FIG. 42, where the direct outdrive has rotated 180° from its position depicted in FIG. 42.

FIG. 43 shows the direct outdrive system 1102 rotated ¼ of a turn counterclockwise from that depicted in FIG. 42. FIG. 44 shows the direct outdrive system 1102 rotated ½ of a turn counterclockwise from that depicted in FIG. 42. FIG. 45 shows the direct outdrive system 1102 rotated ¾ of a turn counterclockwise from that depicted in FIG. 42. In as much as the reference letters A and B remain radially aligned during the rotation of the direct outdrive adapter 1104 and direct outdrive 1106, as shown in FIGS. 42–45, it should be apparent to one skilled in the art that both the adapter 1104 and the direct outdrive 1106 rotate at the same rate. Therefore, the direct outdrive output shaft 1108 (see FIG. 41) may be used to drive components requiring rotary input rotating at engine RPM.

From examination of FIGS. 42–45, it appears that the sliding block 1110 does not move during operation. This would be true if the parts of the engine were constructed so as to have zero tolerances, i.e., if all parts were perfectly made exactly to specification. However, in the event the parts are constructed or wear so as to be within certain selected tolerances (i.e., plus or minus 10 thousands of an inch from a selected dimension), as is typically the case, the sliding block 1110 would undergo slight movements within the channel 1124, thereby "absorbing" the tolerances of the parts, mitigating vibration and reducing the potential of the parts' binding.

Like all internal combustion engines, the illustrated reciprocating internal combustion engine 1010 produces large amounts of heat during operation, most of it as a result of the combustion process, additional heat being generated by the compression of the gases within the cylinder liners and the friction between the moving parts of the engine 1010. Temperatures within the engine 1010 are kept under control by a cooling system that circulates coolant through passages in the engine block and around critical parts to remove excess heat and to equalize stresses produced by heating. Inasmuch as the design and components of internal combustion engine cooling systems are well known in the art, the cooling passages in the engine and cooling system components are not shown for the purpose of clarity.

Referring to FIGS. 46–53, one embodiment of a power transfer assembly 2000 formed in accordance with the present invention and suitable for use in transferring power generated in an internal combustion engine externally of the engine for use is provided. The illustrated embodiment, although illustrated and described for use with the combustion engine depicted in and described with reference to FIGS. 1–45, may also be used in all types of combustion engines, including those with stationary pistons, such as disclosed in U.S. Pat. Nos. 6,598,567 and 6,032,622, the disclosures of which are hereby expressly incorporated by reference, and more conventional engine designs having stationary cylinders and moving pistons, as should be apparent to those skilled in the art.

Figure 46:
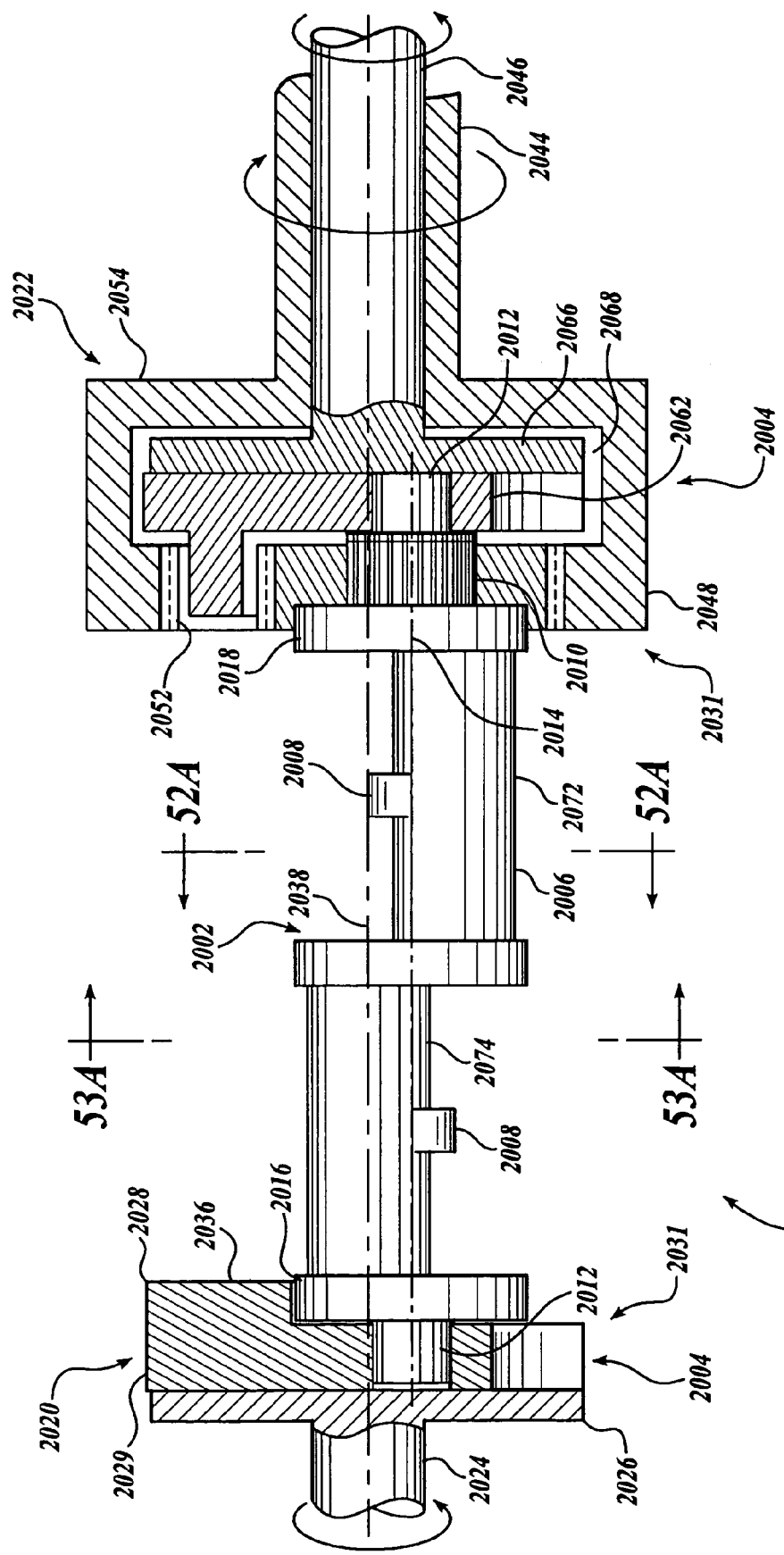
FIG. 46 is a partial cross-sectional view of an alternate embodiment of a power transfer assembly formed in accordance with the present invention and suitable for use with the reciprocating internal combustion engine of FIGS. 1–45.

Turning to FIG. 46, generally stated, the power transfer assembly 2000 converts the linear motion of the cylinders (or pistons in more conventionally designed combustion engines) to rotary motion, and permits the transfer of the power generated by the combustion of fuel in the engine externally of the engine for use, such as providing power to drive the wheels of a vehicle.

The power transfer assembly 2000 of FIGS. 46–53 includes two subassemblies; a crankshaft assembly 2002 and an outdrive assembly 2004. The crankshaft assembly 2002 is substantially similar to the crank-cam 1016 depicted in FIGS. 12–15 with a couple of exceptions which will be described in more detail below. The outdrive assembly 2004 is substantially similar to the reduction outdrive system 1094 and direct outdrive system 1102 depicted in FIGS. 32–45, with the exception that the outdrive assembly 2004 includes means for improved balancing of vibrations in the power transfer assembly 2000 and provides the ability to provide both reduced and direct power output on one side of the engine. Inasmuch as the components and operation of the power transfer assembly 2000 of FIGS. 46–53 are substantially similar to the corresponding components of the embodiment described in relation to FIGS. 1–45, for the sake of brevity, this detailed description will focus only upon those aspects of structure and operation which depart from the embodiment described above.

Still referring to FIG. 46, and as stated above, the power transfer assembly 2000 includes a crankshaft assembly 2002. The crankshaft assembly 2002 includes a crankshaft 2006, which in the illustrated embodiment, is in the form of a "crank-cam," labeled as such since the crankshaft 2006 includes a pair of cams 2008 disposed on the crankshaft for valve actuating as discussed above. The crankshaft 2006 of this embodiment is substantially similar to the crank-cam 1016 of FIGS. 1–45 with the exception that the crankshaft 2006 includes a power transfer device, such as a power transfer gear 2010, and a rotation connection assembly for permitting a crankshaft counterweight to be rotatably coupled to the crankshaft, the rotation connection assembly of the illustrated embodiment being in the form of a pair of stub shafts 2012 which rotatingly receive a pair of crankshaft counterweights. The gear 2010 and stub shafts 2012 are concentrically located relative to a rotational axis 2014 of the crankshaft 2006. One of the stub shafts 2012 extends outward from the right most crank web 2018 and outward of the gear 2010. The other stub shaft 2012 extends outward from the left most crank web 2016. The stub shafts 2012 and the gear 2010 assist in transfer of power from the crankshaft 2006 to the outdrive assembly 2004 as will be described in further detail below.

Still referring to FIG. 46, the outdrive assembly 2004 includes two subassemblies; a direct outdrive assembly 2020 and a direct and reduction outdrive assembly 2022. Focusing on the direct outdrive assembly 2020, the direct outdrive assembly 2020 converts the rotating and reciprocating motion of the crankshaft 2006 to rotary motion in a direct outdrive output shaft 2024. The direct outdrive output shaft 2024 rotates at the same RPM as the engine or more specifically, at the same RPM that the crankshaft 2006 orbits about an axis of rotation 2038 of the outdrive assembly 2004. The direct outdrive output shaft 2024 may be used to drive items located externally of the engine, such as accessories, one suitable example being a distributor. The direct outdrive assembly 2020 includes a direct outdrive 2026, the direct outdrive shaft 2024, and a balancing gliding block 2028.

Figure 47:
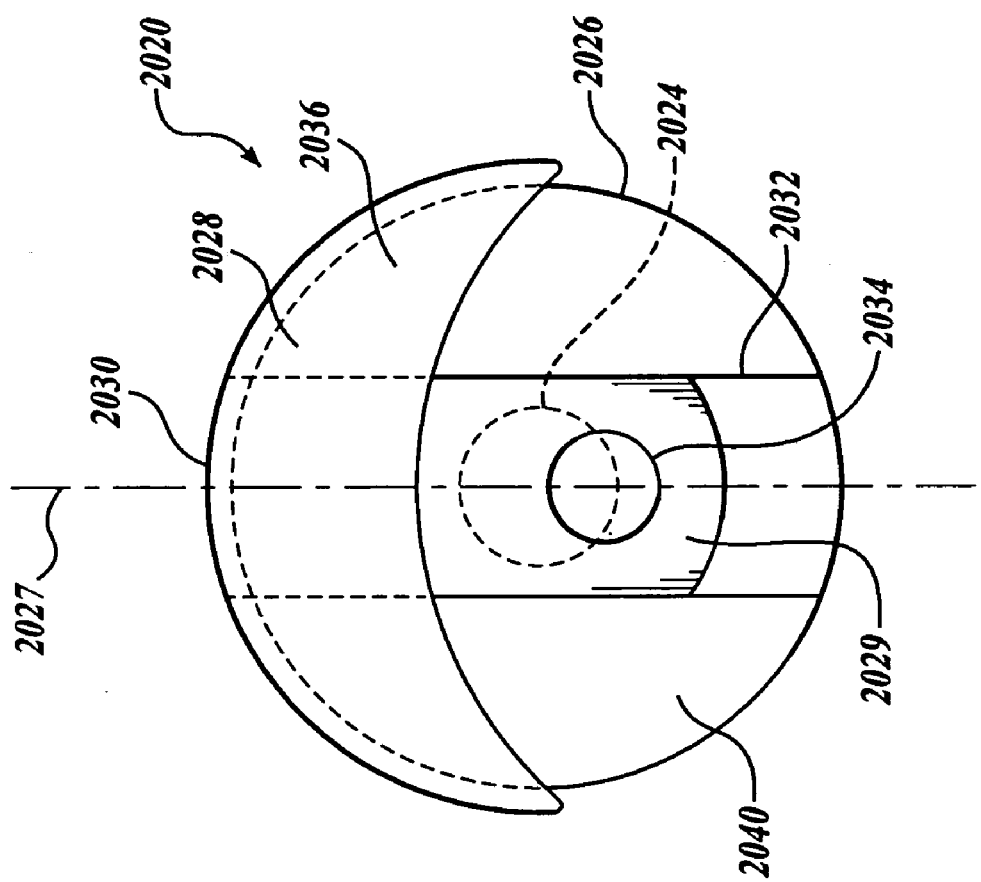
FIG. 47 is an end view of a direct outdrive assembly shown in FIG. 46.
Figure 48:
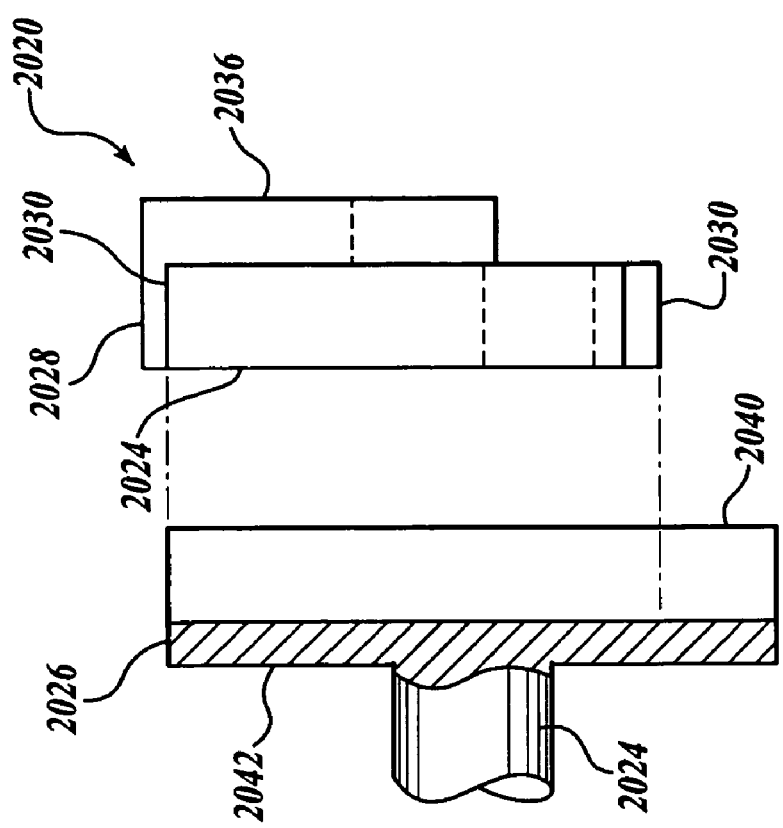
FIG. 48 is an exploded elevation view of the direct outdrive assembly shown in FIG. 47.

Turning to FIGS. 46–48, the configuration of the balancing gliding block 2028 will now be discussed. The balancing gliding block 2028 includes a follower 2029 that is generally a rectangular-shaped block structure having arcuate ends 2030 formed to match the outer circular circumference of the direct outdrive 2026. The width of the follower 2029 is selected to match the width of a guide or channel 2032 formed in the direct outdrive 2026, thereby allowing the follower 2029 to be slidably received within the channel 2032. Preferably, a polished finish is applied to the contact surfaces where the follower 2029 and the channel 2032 contact each other to reduce friction and wear.

The follower 2029 in combination with the channel 2032 form a slide assembly, which is part of an interface assembly 2031. The interface assembly 2031 is used for non-rigidly interfacing the crankshaft 2006 with a pair of output shafts 2024 and 2046 to facilitate the direct transfer of torque between the crankshaft 2006 and the output shafts 2024 and 2046 while still permitting the crankshaft 2006 to move relative to the output shafts 2024 and 2046 to absorb any misalignment of the crankshaft 2006. Moreover, the crankshaft 2006 is able to rotate relative to the direct outdrive 2026 or 2066 about at least one axis (i.e. axis 2014 going through the stub shafts 2012) and move freely relative to the outdtrive 2026 or 2066 in at least one direction, one suitable direction being linearly outward from a center axis of the direct outdrive 2026 such as indicated by axis 2027 in FIG. 47. Of note, axis 2027 is oriented to always pass through the center axis 2014 of the crankshaft 2006 and the center axis 2038 of the outdrive assembly 2004. This arrangement permits a torque to be directly transferred from the crankshaft 2006 to the output shafts 2024 and 2046 without a centrifugal force present in the crankshaft 2006 (from its orbital movement) and/or counterblance weight 2036 being transferred from the crankshaft 2006 and/or counterblance weight 2036 to the output shafts 2024 and 2066 since the crankshaft 2006 and counterbalance weight 2036 are free to slide radially outward relative to the direct outdrive 2026 along axis 2027.

The balancing gliding block 2028 further includes a bore 2034 disposed perpendicularly through the follower 2029. The bore 2034 is sized and positioned to rotatingly receive one of the stub shafts 2012 of the crankshaft 2006. The balancing gliding block 2028 still further includes a counterbalance weight 2036. The counterbalance weight 2036 is sized and positioned to counterbalance the crankshaft 2006 as the crankshaft 2006 orbits about the axis of rotation 2038 of the outdrive assembly 2004 as will be described in more detail below.

The direct outdrive 2026 is a disk-shaped member having inner (facing the engine) and outer (facing away from the engine) circular planar surfaces 2040 and 2042, respectively. The channel 2032 for receiving the follower 2029 of the balancing gliding block 2028 is formed on the inner planar surface 2040. A direct drive output shaft 2024 is perpendicularly and concentrically mounted on the outer planar surface 2042.

Figure 49:
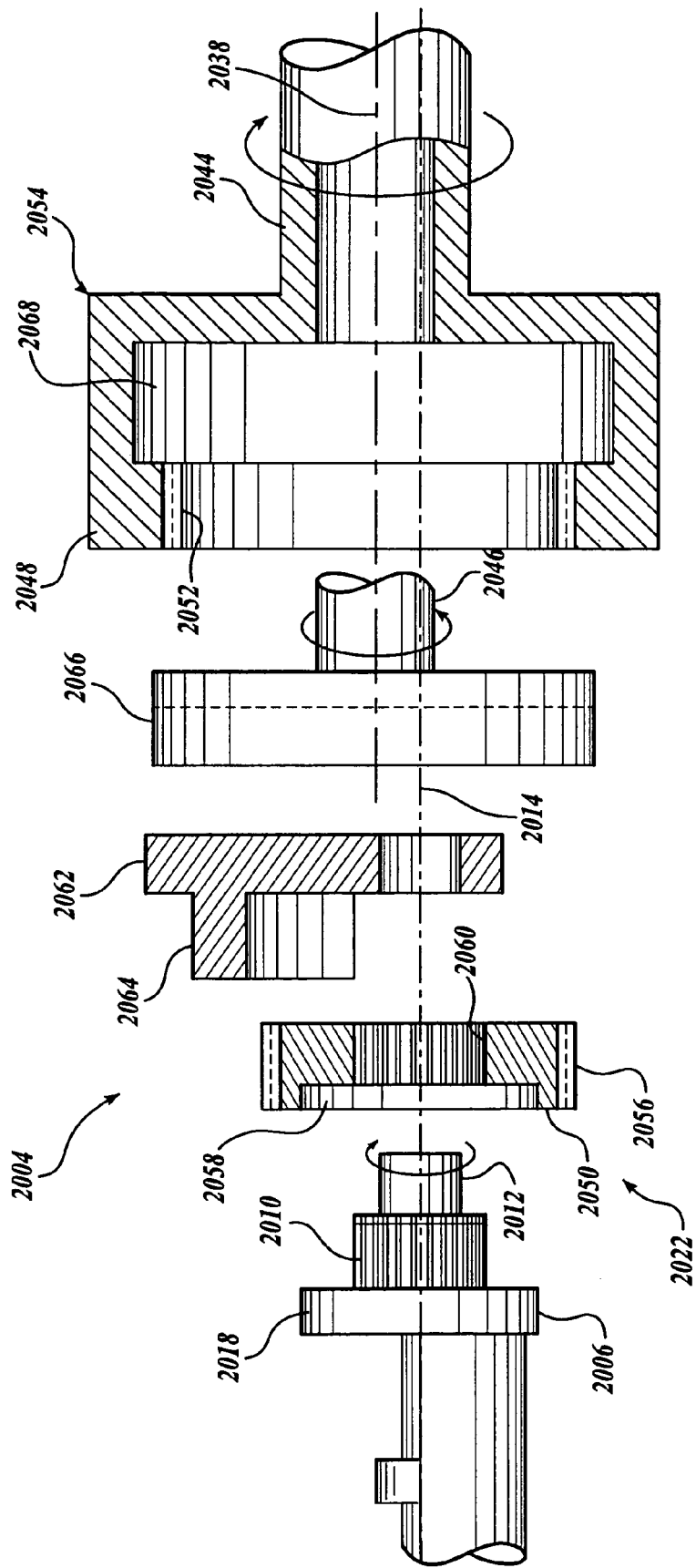
FIG. 49 is an exploded view of a portion of the power transfer assembly depicted in FIG. 46.
Figure 51:
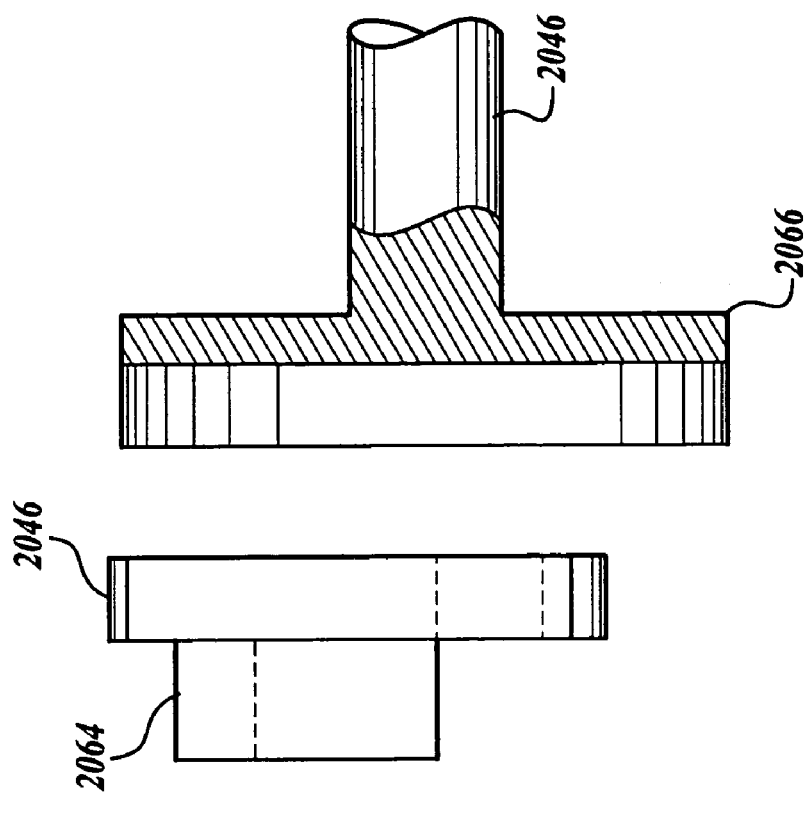
FIG. 51 is an exploded elevation view of the direct outdrive assembly portion shown in FIG. 50.
Figure 50:
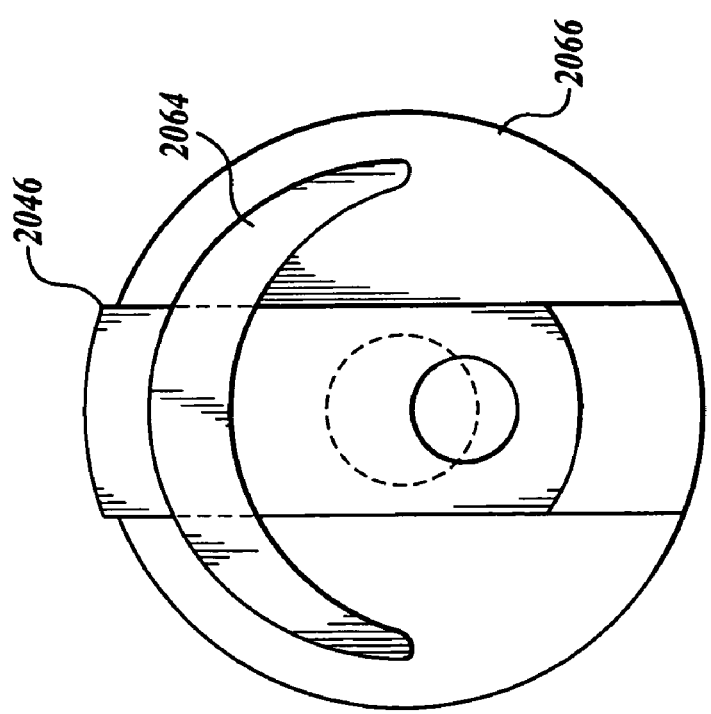
FIG. 50 is an end view of a direct outdrive assembly portion of a direct and reduction outdrive assembly shown in FIG. 46.

Turning now to FIGS. 49–51, the components of the direct and reduction outdrive assembly 2022 will now be described. The direct and reduction outdrive assembly 2022 converts the rotating and reciprocating motion of the crankshaft 2006 to rotary motion in a pair of concentrically disposed output shafts 2044 and 2046. One of the output shafts, which will be referenced as a reduction output shaft 2044, rotates at a reduced RPM relative to the engine or more specifically, relative to the RPM that the crankshaft 2006 orbits about the axis of rotation 2038 of the outdrive assembly 2004. The reduction output shaft 2044 may be used to drive items external of the engine, such as a drive wheel of a vehicle. The direct and reduction outdrive assembly 2022 also includes a direct output shaft 2046 concentrically located within the reduction output shaft 2044. The direct output shaft 2046 rotates at the same RPM as the engine, or more specifically, at the same RPM that the crankshaft 2006 orbits about the axis of rotation 2038 of the outdrive assembly 2004. Thus, the direct and reduction outdrive assembly 2022 provides both a reduced RPM output shaft 2044 and a direct output shaft 2046 on one side of the engine. Of note, the output shafts 2044 and 2046 rotate in opposite directions relative to one another.

The direct and reduction outdrive assembly 2022 includes an outdrive reduction gear 2048 and an outdrive gear 2050. The outdrive reduction gear 2048 further includes internal gear teeth 2052 disposed along the inner peripheral cylindrical wall of an outdrive hub 2054. The outdrive hub 2054 is rigidly coupled or integrally formed with the reduction output shaft 2044. The reduction output shaft 2044 is perpendicularly and concentrically attached to the outdrive hub 2054 and reduction gear 2048. The centerline of the outdrive hub 2054 is collinear with the axis of rotation 2038 of the outdrive assembly 2004. The outdrive hub 2054 includes a cavity 2068 shaped and sized to permit a balancing gliding block 2062 and direct outdrive 2066 to rotate freely therein.

The outdrive gear 2050 has external gear teeth 2056 shaped and dimensioned to communicate with the internal gear teeth 2052 of the outdrive reduction gear 2048. The outdrive gear 2050 has a crank web 2018 receiving recess 2058 shaped and dimensioned to receive the circular shaped crank web 2018. The outdrive gear 2050 further includes internal gear teeth 2060 shaped and dimensioned to communicate with the external gear teeth of the gear 2010 disposed on the crankshaft 2006 such that any rotation of the crankshaft 2006 about its axis of rotation 2014 will result in a corresponding rotation of the outdrive gear 2050. The size of and the number of teeth of the outdrive reduction gear 2048 and the outdrive gear 2050 may be selected to determine the amount of reduction desired. In the illustrated embodiment, the size and number of teeth are selected for a 2:1 reduction ratio. Although a specific reduction gear ratio is illustrated and described, it should be apparent to those skilled in the art that other reduction gear ratios, either higher or lower than described above, are suitable for use with and within the spirit and scope of the present invention. Of note, the backlash of gears 2048 and 2050 is selected to absorb any misalignment of crankshaft 2006 in a manner well known in the art.

The direct and reduction outdrive assembly 2022 further includes a balancing gliding block 2062 formed substantially as described above with reference to the balancing gliding block 2028 of the direct outdrive 2020 (see FIGS. 46–48), with the exception of the shape of the counterbalance weight 2064, which has been made thinner and wider to be more compact.

The direct and reduction outdrive assembly 2022 further includes a direct outdrive 2066 which is substantially identical to the direct outdrive 2026 of FIGS. 46–48. The direct outdrive 2066 interfaces with the balancing gliding block 2062 and crankshaft 2006 in the same manner that the direct outdrive 2026 and balancing gliding block 2028 of FIGS. 46–48 do.

In light of the above description of the components of the power transfer assembly 2000 and turning to FIGS. 46 and 52A, the operation of the power transfer assembly 2000 will now be described. FIG. 52A is a cross-sectional view of the power transfer assembly 2000 of FIG. 46, the cross-sectional cut taken substantially through Section 52A—52A of FIG. 46. FIG. 52A shows the balancing glide block 2028, direct outdrive 2026, the crankshaft rotational axis 2014 about which the crankshaft 2006 rotates, the orbital path 2070 of the crankshaft rotational axis 2014 about the axis of rotation 2038 of the outdrive assembly 2004, and a first crank journal 2072 (shown in cross-hatching) and a second crank journal 2074 (shown in phantom).

During operation, the first crank journal 2072 reciprocates (first towards the top of the page and subsequently towards the bottom of the page) along a vertical axis 2076 moving a cylinder (not shown) there along while the second crank journal 2074 reciprocates (first to the right of the page and subsequently towards the left of the page) along a horizontal axis 2078 moving a second cylinder (not shown) there along. The direct outdrive 2026 and balancing gliding block 2028 rotate in a counterclockwise direction at the same rate as each other. The crankshaft 2006 rotates about the crankshaft rotational axis 2014 in a clockwise direction while the crankshaft rotational axis 2014 (and thus the crankshaft 2006) orbits about the axis of rotation 2038 of the outdrive assembly 2004 in a counterclockwise manner along the orbital path 2070.

One of the crankshaft 2006 stub shafts 2012 is rotatingly interfaced with the crankshaft counter weight such that the stub shaft 2012 is permitted to freely rotate within the balancing glide block 2028. This permits the crankshaft 2006 to rotate about the crankshaft rotation axis 2014 during operation. Further, the channel 2032 is oriented in a linear path located radial outward from the axis of rotation 2038 of the outdrive assembly 2004. This permits the crankshaft 2006 and counterbalance weight 3036 to move radially outward from the axis of rotation 2038 of the outdrive assembly 2004 during operation. This permits any misalignments in the crankshaft 2006 orientation or associated components to be "absorbed" such that binding of the engine is impeded. Of note, the crankshaft 2006 and counterbalance weight 2036 are interfaced with the outdrive assembly 2004 such that they are permitted to move "freely" in a selected direction, the selected direction being radially outward in the illustrated embodiment. The term "freely" meaning, for the purposes of this detailed description, that the crankshaft and/or crankshaft counterweight are not biased or restricted from moving in the selected direction. Thus, it can be seen from the above that the crankshaft 2006 and counterweight 2036 are non-rigidly interfaced with the outdrive assembly 2004 such that the crankshaft 2006 is permitted to freely rotate relative to the direct outdrive 2026 in at least one direction and freely move radially relative to the direct outdrive 2026 during operation in at least one direction.

During operation, the counterbalance weight 2036 is always disposed directly opposite the crankshaft rotation axis 2014 to counterbalance the centrifugal forces produced by the mass of the crankshaft 2006 being offset from the axis of rotation 2038 of the outdrive assembly 2004 as the crankshaft 2006 orbits along the orbital path 2070. Referring to FIG. 52B, the weight of the counterbalance weight 2036 and the location of the center of mass 2015 of the counterbalance weight 2036 is oriented relative to the crankshaft rotational axis 2014 such that when the crankshaft is rotated the centrifugal force associated with the counterbalance weight 2036 balances the orbital centrifugal force of the crankshaft 2006. More specifically, during operation, the center of mass 2015 of the counterbalance weight 2036 is preferably oriented along an axis 2027 oriented to pass through both the center axis 2014 about which the crankshaft 2006 rotates and through the axis 2038 about which the crankshaft 2006 orbits. In this configuration, the mass of the counterbalance weight 2036 is able to balance the centrifugal forces generate by the orbiting of the crankshaft 2006 about axis 2038.

The interrelationship of the parts of the power transfer assembly 2000, and more specifically of the direct outdrive assembly 2020, is best understood by examination of FIGS. 52A–52H. FIGS. 52A–52H show the direct outdrive assembly 2020 as the direct outdrive 2026 rotates through one cycle. More specifically, FIG. 52B depicts the direct outdrive assembly 2020 as the direct outdrive 2026 rotates 45 degrees counterclockwise from the position of the direct outdrive 2026 shown in FIG. 52A. FIG. 52C depicts the direct outdrive assembly 2020 as the direct outdrive 2026 rotates 45 degrees counterclockwise from the position of the direct outdrive 2026 shown in FIG. 52B. FIG. 52D depicts the direct outdrive assembly 2020 as the direct outdrive 2026 rotates 45 degrees counterclockwise from the position of the direct outdrive 2026 shown in FIG. 52C. FIG. 52E depicts the direct outdrive assembly 2020 as the direct outdrive 2026 rotates 45 degrees counterclockwise from the position of the direct outdrive 2026 shown in FIG. 52D. FIG. 52F depicts the direct outdrive assembly 2020 as the direct outdrive 2026 rotates 45 degrees counterclockwise from the position of the direct outdrive 2026 shown in FIG. 52E. FIG. 52G depicts the direct outdrive assembly 2020 as the direct outdrive 2026 rotates 45 degrees counterclockwise from the position of the direct outdrive 2026 shown in FIG. 52F. FIG. 52H depicts the direct outdrive assembly 2020 as the direct outdrive 2026 rotates 45 degrees counterclockwise from the position of the direct outdrive 2026 shown in FIG. 52G. Once the direct outdrive 2026 has been rotated 45 degrees counterclockwise from the position shown in FIG. 52H, the direct outdrive 2026 has completed one full revolution, returning to the position shown in FIG. 52A.

Referring to FIGS. 52A–52H, during one cycle of the power transfer assembly 2000, it can be seen, among other things, that the following occurs: 1) the direct outdrive 2026 rotates once in the counterclockwise direction; 2) the crankshaft 2006 rotates once in the clockwise direction about the crankshaft rotational axis 2014; 3) the crankshaft 2006 orbits once in the counterclockwise direction about the axis of rotation 2038 of the outdrive assembly 2004 about the orbital path 2070; 4) the crank journals 2072 and 2074 move along linear paths 2076 and 2078 perpendicular to one another; 5) the stroke length of the cylinders is defined by the distance moved by the "vertical" crank journal 2072 when moved from the bottom of the page to the top of the page, or by the distance moved by the "horizontal" crank journal 2074 when moved from the right most position on the page to the crank journal's 2074 left most position; 6) the counterbalance weight 2036 is rotatingly coupled to the crankshaft 2006; 7) the counterbalance weight 2036 is slideable along a path (defined by the channel 2032 in the direct outdrive 2026) oriented radially relative to an axis of rotation 2038 of the outdrive assembly 2004; 8) the orbital direction of rotation of the crankshaft 2006 is the same direction of rotation of the direct outrdrive 2026; 9) the crankshaft 2006 is not rigidly attached nor attached in a biased manner to the direct outdrive 2026; 10) the centerline of the crankshaft 2006 is located a ¼ of a stroke length outward from the centerline of the direct outdrive 2026; and 11) the Revolutions Per Minute (RPM) of the crankshaft 2006 about its own axis is the same as the RPM of the orbital movement of the crankshaft 2006; 12) the counterbalance weight 2036 rotates at an RPM equal to both the RPM of the crankshaft 2006 about its own centerline and at the same RPM as the orbital movement of the crankshaft 2006 about the centerline of the direct outdrive 2026; 13) the counterbalance weight 2036 rotates in the same rotary direction as the orbital movement of the crankshaft 2006 about the centerline of the direct outdrive 2026; and 14) the counterbalance weight 2036 rotates in the opposite rotary direction relative to the rotary movement of the crankshaft 2006 about its own centerline.

FIG. 53A is a cross-sectional view of the power transfer assembly 2000 of FIG. 46, the cross-sectional cut taken substantially through Section 53A—53A of FIG. 46. FIG. 53A shows the balancing glide block 2062, crank web 2018, outdrive gear 2050, direct outdrive 2066, the crankshaft rotational axis 2014 about which the crankshaft 2006 rotates, the orbital path 2070 of the crankshaft rotational axis 2014 about the axis of rotation 2038 of the outdrive assembly 2004, and a first crank journal 2072 (shown in phantom) and a second crank journal 2074 (shown in cross-hatching).

During operation, the first crank journal 2072 reciprocates (first towards the top of the page and subsequently towards the bottom of the page) along a vertical axis 2076 moving a cylinder (not shown) there along while the second crank journal 2074 reciprocates (first to the left of the page and subsequently towards the right of the page) along a horizontal axis 2078 moving a second cylinder (not shown) there along. The direct outdrive 2066 (see FIG. 46) and balancing gliding block 2062 rotate in a clockwise direction at the same rate as each other. The crankshaft 2006 rotates about the crankshaft rotational axis 2014 in a counterclockwise direction while the crankshaft rotational axis 2014 (and thus the crankshaft 2006) orbits about the axis of rotation 2038 of the outdrive assembly 2004 in a clockwise manner along the orbital path 2070. During operation, the counterbalance weight 2064 is always disposed directly opposite the crankshaft rotation axis 2014 to counterbalance the centrifugal forces produced by the mass of the crankshaft 2006 being offset from the axis of rotation 2038 of the outdrive assembly 2004 as the crankshaft 2006 orbits about the orbital path 2070 in the same manner as described above for the outdrive assembly 2004.

The interrelationship of the parts of the power transfer assembly 2000 is best understood by examination of FIGS. 53A–53H. FIGS. 53A–53H show the power transfer assembly 2000 as the direct outdrive 2066 of the direct and reduction outdrive assembly 2022 rotates through one cycle. More specifically, FIG. 53B depicts the power transfer assembly 2000 as the direct outdrive 2066 rotates 45 degrees clockwise from the position of the direct outdrive 2066 shown in FIG. 53A as best shown by examining the change in position of the reference point "C" marked on the direct outdrive 2066. While the direct outdrive 2066 rotates 45 degrees to the clockwise, outdrive gear 2050 rotates 45 degrees counterclockwise about the crankshaft rotational axis 2014. The 45 degree rotation of the outdrive gear 2050 on the crankshaft 2006 causes the outdrive reduction gear 2048 to rotate 22.5 degrees counterclockwise. As should be apparent to those skilled in the art, the relative movement of the gears 2050 and 2048 relative to one another, i.e., the reduction ratio, may be adjusted through adjusting the number of teeth on the gears 2050 and 2048. The relative movement of the outdrive gears 2050 relative to the outdrive reduction gear 2048 is best shown by examining the change in position of reference points "A" and "B" marked on the gears 2050 and 2048 respectively in FIGS. 53A–53H.

FIG. 53C depicts the power transfer assembly 2000 as the direct outdrive 2066 rotates 45 degrees clockwise from the position of the direct outdrive 2066 shown in FIG. 53B as best shown by examining the change in position of the reference point "C" marked on the direct outdrive 2066. While the direct outdrive 2066 rotates 45 degrees to the clockwise, outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the 2050 and 2048.

FIG. 53D depicts the power transfer assembly 2000 as the direct outdrive 2066 rotates 45 degrees clockwise from the position of the direct outdrive 2066 shown in FIG. 53C as best shown by examining the change in position of the reference point "C" marked on the direct outdrive 2066. While the direct outdrive 2066 rotates 45 degrees to the clockwise, the outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the gears 2050 and 2048.

FIG. 53E depicts the power transfer assembly 2000 as the direct outdrive 2066 rotates 45 degrees clockwise from the position of the direct outdrive 2066 shown in FIG. 53D as best shown by examining the change in position of the reference point "C" marked on the direct outdrive 2066. While the direct outdrive 2066 rotates 45 degrees to the clockwise, the outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the gears 2050 and 2048.

FIG. 53F depicts the power transfer assembly 2000 as the direct outdrive 2066 rotates 45 degrees clockwise from the position of the direct outdrive 2066 shown in FIG. 53E as best shown by examining the change in position of the reference point "C" marked on the direct outdrive 2066. While the direct outdrive 2066 rotates 45 degrees to the clockwise, the outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the gears 2050 and 2048.

FIG. 53G depicts the power transfer assembly 2000 as the direct outdrive 2066 rotates 45 degrees clockwise from the position of the direct outdrive 2066 shown in FIG. 53F as best shown by examining the change in position of the reference point "C" marked on the direct outdrive 2066. While the direct outdrive 2066 rotates 45 degrees to the clockwise, the outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the gears 2050 and 2048.

FIG. 53H depicts the power transfer assembly 2000 as the direct outdrive 2066 rotates 45 degrees clockwise from the position of the direct outdrive 2066 shown in FIG. 53G as best shown by examining the change in position of the reference point "C" marked on the direct outdrive 2066. While the direct outdrive 2066 rotates 45 degrees to the clockwise, the outdrive gear 2050 rotates 45 degrees counterclockwise about the crankshaft rotational axis 2014. The 45 degree rotation of the outdrive gear 2050 causes the outdrive reduction gear 2048 to rotate 22.5 degrees counterclockwise as best shown by examining the change in position of reference points "A" and "B" marked on the gears 2050 and 2048. Once the direct outdrive 2066 has been rotated 45 degrees clockwise from the position shown in FIG. 53H, the direct outdrive 2066 has completed one full revolution in the clockwise direction, returning to the position shown in FIG. 53A. The outdrive reduction gear 2048 will have rotated one half revolution in the counterclockwise direction.

Referring to FIGS. 53A–53H, during one cycle of the power transfer assembly 2000, it can be seen, among other things, that the following occurs: 1) the direct outdrive 2026 rotates once in the clockwise direction; 2) the crankshaft 2006 rotates once in the counterclockwise direction about the crankshaft rotational axis 2014; 3) the crankshaft 2006 orbits once in the clockwise direction about the axis of rotation 2038 of the outdrive assembly 2004 about the orbital path 2070; 4) the crank journals 2072 and 2074 move along linear paths 2076 and 2078 perpendicular to one another; 5) the stroke length of the cylinders is defined by the distance moved by the "vertical" crank journal 2072 when moved from the bottom of the page to the top of the page, or by the distance moved by the "horizontal" crank journal 2074 when moved from the left most position on the page to the crank journal's 2074 right most position; 6) the counterbalance weight 2064 is rotatingly coupled to the crankshaft 2006; and 7) the counterbalance weight 2064 is slideable along a path oriented radially relative to an axis of rotation 2038 of the outdrive assembly 2004; 8) the orbital direction of rotation of the crankshaft 2006 is the same direction of rotation of the direct outdrive 2066; 9) the crankshaft 2006 is not rigidly attached nor attached in a biased maimer to the direct outdrive 2066; 10) the centerline of the crankshaft 2006 is located at ¼ of a stroke length outward from the centerline of the direct outdrive 2066; 11) the Revolutions Per Minute (RPM) of the crankshaft 2006 about its own axis is the same as the RPM of the orbital movement of the crankshaft 2006; 12) the counterbalance weight 2064 rotates at an RPM equal to both the RPM of the crankshaft 2006 about its own centerline and at the same RPM as the orbital movement of the crankshaft 2006 about the centerline of the direct outdrive 2066; 13) the counterbalance weight 2064 rotates in the same rotary direction as the orbital movement of the crankshaft 2006 about the centerline of the direct outdrive 2066; 14) the counterbalance weight 2064 rotates in the opposite rotary direction relative to the rotary movement of the crankshaft 2006 about its own centerline; 15) the output shafts 2038 rotate opposite one another, with the reduced output shaft 2038 rotating opposite the orbital movement of the crankshaft 2006 and in the same direction as the rotation of the crankshaft 2006 about its own centerline; and 16) the rotary and orbital movement of the crankshaft 2006 combine to drive the reduced output shaft 2038 at a reduced RPM relative to the direct output shaft 2046.

Figure 54:
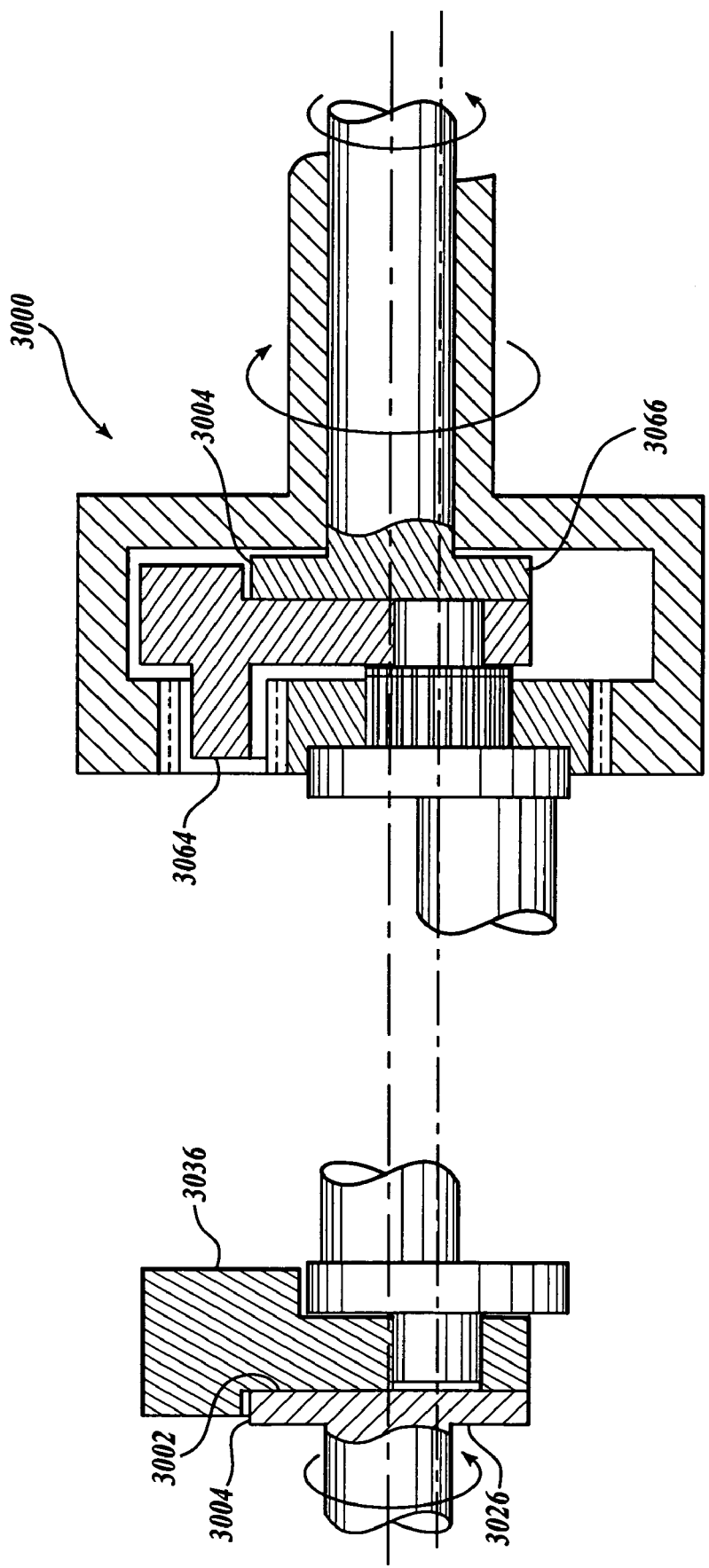
FIG. 54 is an alternate embodiment of the power transfer assembly depicted in FIG. 46, wherein a pair of direct outdrives are reduced in size to permit enlargement of a pair of counterbalance weights.

Referring to FIG. 54, an alternate embodiment of a power transfer assembly 3000 formed in accordance with the present invention is shown. The power transfer assembly 3000 of FIG. 54 is substantially similar in structure and operation to the power transfer assembly 2000 of FIGS. 46–53. Therefore, for the sake of brevity, this detailed description will focus only upon the aspects of the alternate embodiment which depart from the embodiment illustrated and described above.

That said, the power transfer assembly 3000 departs from that described above in that the diameter of the direct outdrives 2026 and 2066 of the previously described power transfer assembly 2000, best shown in FIG. 46, have been reduced. The reduction in diameter of the direct outdrives 3026 and 3066 of the power transfer assembly 3000 of FIG. 54 permits the counterbalance weights 3036 and 3064 to be increased in size by extending radially outward of the direct outdrives 3026 and 3066 so as to overlap the outer edges 3004 of the direct outdrives 3026 and 3066.

Figure 56:
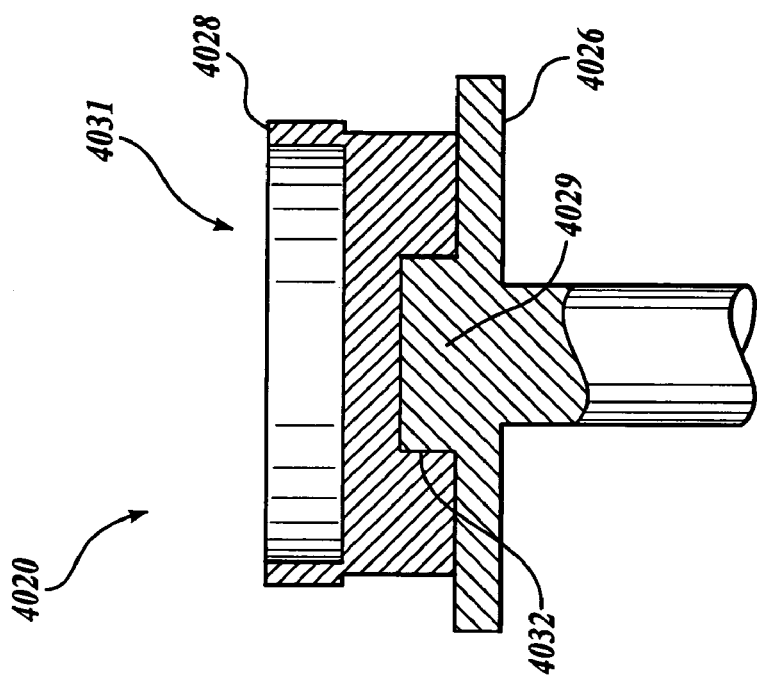
FIG. 56 is a cross-section view of the direct outdrive assembly of FIG. 55 taken substantially through Section 56—56 of FIG. 55.
Figure 55:
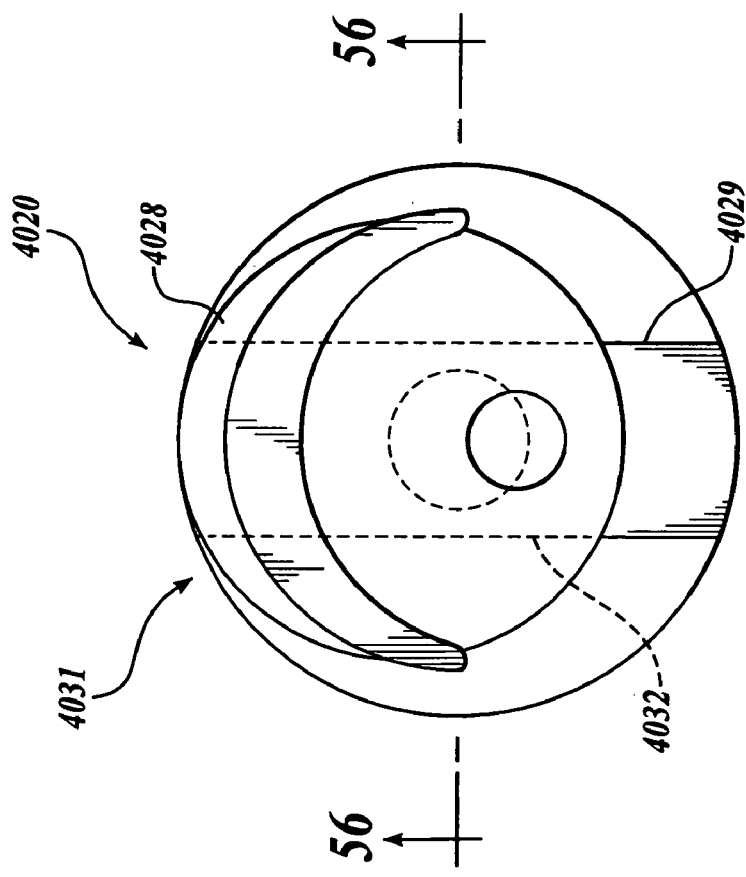
FIG. 55 is an alternate embodiment of the direct outdrive assembly shown in FIGS. 50 and 51.

Referring to FIGS. 55 and 56, an alternate embodiment of a direct outdrive assembly 4020 formed in accordance with the present invention is shown. The direct outdrive assembly 4020 is substantially similar in structure and operation to the direct outdrive assembly 2020 of FIGS. 47 and 48. Therefore, for the sake of brevity, this detailed description will focus only upon the aspects of the alternate embodiment which depart from the embodiment illustrated and described above.

That said, the direct outdrive assembly 4020 departs from that described above in that the follower 4029 of the interface assembly 4031 is now located on the direct outdrive 4026 and the channel 4032 for slidingly receiving the follower 4029 is now located on the balancing gliding block 4028. Thus, the positions of the follower 4029 and the channel 4032 have been swapped. It should be apparent to those skilled in the art that the swapping of the locations of the follower and channel is also suitable for the direct outdrive components of the direct and reduction outdrive assembly 2022, best shown in FIGS. 46, 50, and 51.

Referring to FIG. 46, although the above described embodiment is illustrated and described as having a pair of stub shafts 2012 coupled to the crankshaft 2006, it should be apparent to those skilled in the art that the stubshafts 2012 are optional components and an engine formed in accordance with the present invention may operate without the use of one or more of the stubshafts 2012. For instance, in the embodiment depicted in FIG. 32, the crankshaft does not utilize stubshafts. Further, referring to FIG. 41, if a stubshaft 1112 is desired, an adapter 1102 may be coupled to the crankshaft to provide a stubshaft. Thus, it should be apparent to those skilled in the art that a crankshaft having one stubshaft, or no stubshafts, or one that uses adapters to provide one or more stubshafts, are also within the spirit and scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A power transfer assembly comprising:
   (a) a crankshaft adapted to rotate about a rotation axis and to orbit about an orbit axis, the rotation axis being offset from the orbit axis; and
   (b) a first direct outdrive assembly drivably coupled to the crankshaft such that the orbital motion of the crankshaft drives the first direct outdrive assembly to rotate about the orbit axis.

2. The power transfer assembly of claim 1, wherein the first direct outdrive assembly comprises an output shaft, a disk portion fixed to the output shaft, and a gliding block having an aperture adapted to retain the crankshaft, wherein the gliding block is slidably retained by the disk portion.

3. The power transfer assembly of claim 2, wherein the disk portion includes a radial slot that is sized to slidably receive the glide block.

4. The power transfer assembly of claim 2, wherein the gliding block includes an outboard counterbalance weight portion.

5. The power transfer assembly of claim 2, further comprising a reduction outdrive assembly that is drivably coupled to the crankshaft.

6. The power transfer assembly of claim 5, wherein the reduction outdrive assembly includes an outdrive gear fixed to the crankshaft, and an outdrive reduction gear fixed to a reduction drive output shaft, wherein the outdrive gear drivably engages the outdrive reduction gear.

7. The power transfer assembly of claim 6, wherein the reduction drive output shaft comprises a cylindrical tubular shaft, and the first direct outdrive assembly output shaft is disposed coaxially through the tubular shaft.

8. The power transfer assembly of claim 7, further comprising a second direct outdrive assembly disposed opposite the first outdrive assembly.

9. A power transfer assembly according to claim 1, wherein the outdrive is interfaced with the crankshaft such that the crankshaft is rotatable relative to the outdrive about at least one axis and the first end of the crankshaft is linearly movable in at least one direction relative to the outdrive during operation.

10. The power transfer assembly of claim 9, further including a counterweight rotatingly coupled to the crankshaft.

11. The power transfer assembly of claim 10, further including a slide mechanism including a guide and a follower, the guide oriented in the at least one direction to guide movement of the crankshaft in the at least one direction, wherein one of the guide and the follower is coupled to the counterweight and the other of the guide and the follower is coupled to the outdrive.

12. A power transfer assembly according to claim 1 and further comprising an interface assembly for non-rigidly interfacing the crankshaft with the outdrive, wherein the interface assembly permits the crankshaft first end to move relative to the outdrive in at least one linear direction.

13. The power transfer assembly of claim 12, further including a counterweight rotatingly coupled to the crankshaft.

14. The power transfer assembly of claim 13, further including a slide mechanism including a guide and a follower, the guide oriented in the at least one linear direction to guide movement of the crankshaft in the at least one linear direction, wherein the guide or the follower is coupled to the counterweight and the other of the guide or the follower is coupled to the outdrive.

15. The power transfer assembly of claim 12, wherein the interface assembly further includes a slide mechanism, the slide mechanism including a guide and a follower adapted to interface with the guide, the guide oriented in the at least one linear direction to guide movement of the crankshaft in the at least one linear direction.

16. The power transfer assembly of claim 15, wherein the at least one linear direction is oriented radially outward from a centerline of the outdrive.

17. The power transfer assembly of claim 15, wherein the crankshaft is rotatably interfaced with the slide mechanism such that the crankshaft may rotate relative to the slide mechanism during operation.

* * * * *